US012238033B2

(12) United States Patent
MolavianJazi et al.

(10) Patent No.: US 12,238,033 B2
(45) Date of Patent: Feb. 25, 2025

(54) BEAM MANAGEMENT AND COVERAGE ENHANCEMENTS FOR SEMI-PERSISTENT AND CONFIGURED GRANT TRANSMISSIONS

(71) Applicant: Samsung Electronics Co., Ltd., Suwon-si (KR)

(72) Inventors: Ebrahim MolavianJazi, Santa Clara, CA (US); Aris Papasakellariou, Houston, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/170,483

(22) Filed: Feb. 16, 2023

(65) Prior Publication Data

US 2023/0208592 A1 Jun. 29, 2023

Related U.S. Application Data

(63) Continuation of application No. 17/247,390, filed on Dec. 9, 2020, now Pat. No. 11,588,602.
(Continued)

(51) Int. Cl.
*H04L 5/00* (2006.01)
*H04W 72/044* (2023.01)
(Continued)

(52) U.S. Cl.
CPC ......... *H04L 5/0051* (2013.01); *H04W 72/044* (2013.01); *H04W 72/23* (2023.01); *H04W 72/51* (2023.01)

(58) Field of Classification Search
CPC ..... H04L 5/0051; H04L 1/189; H04L 1/1896; H04L 1/1822; H04L 1/0041;
(Continued)

(56) References Cited

U.S. PATENT DOCUMENTS

2011/0268028 A1* 11/2011 Stern-Berkowitz ..........................
H04L 5/0048
370/328
2015/0016312 A1 1/2015 Li
(Continued)

FOREIGN PATENT DOCUMENTS

CN 110380834 A 10/2019
CN 110536452 A 12/2019
(Continued)

OTHER PUBLICATIONS

Notification of Transmittal of the International Search Report and Written Opinion of the International Searching Authority in connection with International Application No. PCT/KR2020/018197 dated Mar. 16, 2021, 9 pages.
(Continued)

*Primary Examiner* — Kiet Tang

(57) ABSTRACT

Apparatuses and methods for transmitting or receiving a signal or a channel. A method for operating a user equipment (UE) to receive the signal or the channel includes receiving a configuration for spatial filters, determining first and second spatial filters from the spatial filters, and determining first and second numbers of repetitions. The spatial filters correspond to spatial relations with reference signals (RSs), respectively. The first and second spatial filters are different. The first and second numbers of repetitions are different. The method further includes transmitting the signal or the channel using the first spatial filter for the first number of
(Continued)

repetitions and using the second spatial filter for the second number of repetitions. The second number of repetitions is transmitted after the first number of repetitions.

20 Claims, 21 Drawing Sheets

Related U.S. Application Data

(60) Provisional application No. 62/947,543, filed on Dec. 13, 2019.

(51) Int. Cl.
*H04W 72/23* (2023.01)
*H04W 72/51* (2023.01)

(58) Field of Classification Search
CPC ..... H04L 1/0045; H04L 5/0044; H04L 5/001; H04L 5/0023; H04L 5/0053; H04L 5/0048; H04L 1/08; H04W 72/044; H04W 72/23; H04W 72/51; H04B 7/06952; H04B 7/0413
See application file for complete search history.

(56) References Cited

U.S. PATENT DOCUMENTS

| | | | |
|---|---|---|---|
| 2018/0083680 | A1 | 3/2018 | Guo et al. |
| 2019/0082456 | A1 | 3/2019 | Kim |
| 2019/0215086 | A1 | 7/2019 | Kwak et al. |
| 2019/0223205 | A1 | 7/2019 | Papasakellariou |
| 2019/0253918 | A1* | 8/2019 | Liu .................. H04W 28/0268 |
| 2019/0313342 | A1 | 10/2019 | Papasakellariou |
| 2019/0320469 | A1 | 10/2019 | Huang et al. |
| 2020/0305088 | A1 | 9/2020 | Nory |
| 2020/0367208 | A1* | 11/2020 | Khoshnevisan ...... H04L 5/0048 |
| 2022/0116167 | A1 | 4/2022 | Wang |
| 2022/0330221 | A1 | 10/2022 | Pan et al. |

FOREIGN PATENT DOCUMENTS

| | | |
|---|---|---|
| WO | 2019135597 A1 | 7/2019 |
| WO | 2019195528 A1 | 10/2019 |

OTHER PUBLICATIONS

NTT Docomo, Inc., "Discussion on multi-beam enhancement", 3GPP TSG RAN WG1 #97, R1-1906225, Reno, USA, May 13-17, 2019, 24 pages.
CATT, "Considerations on multi-TRP/panel transmission", 3GPP TSG RAN WG1 #98bis, R1-1910349, Chongqing, China, Oct. 14-20, 2019, 25 pages.
Qualcomm Incorporated, "Enhancement to configured grants in NR unlicensed", 3GPP TSG RAN WG1 Meeting #98bis, R1-1911100, Chongqing, China, Oct. 14-20, 2019, 14 pages.
"5G; NR; Physical channelsand modulation (3GPP TS 38.211 version 15.7.0 Release 15)", ETSI TS 138 211 V15.7.0, Oct. 2019, 100 pages.
"5G; NR; Multiplexing and channel coding (3GPP TS 38.212 version 15.7.0 Release 15)", ETSI TS 138 212 V15.7.0, Oct. 2019, 106 pages.
"5G; NR; Physical layer procedures for control (3GPP TS 38.213 version 15.7.0 Release 15)", ETSI TS 138 213 V15.7.0, Oct. 2019, 112 pages.
"5G; NR; Physical layer procedures for data (3GPP TS 38.214 version 15.7.0 Release 15)", ETSI TS 138 214 V15.7.0, Oct. 2019, 108 pages.
"5G; NR; Medium Access Control (MAC) protocol specification (3GPP TS 38.321 version 15.7.0 Release 15)", ETSI TS 138 321 V15.7.0, Oct. 2019, 80 pages.
"5G; NR; Radio Resource Control (RRC); Protocol specification (3GPP TS 38.331 version 15.7.0 Release 15)", ETSI TS 138 331 V15.7.0, Oct. 2019, 523 pages.
Extended European Search Report issued May 15, 2023 regarding Application No. 20900030.6, 12 pages.
LG Electronics, "Feature lead summary#3 of Enhancements on Multi-beam Operations", 3GPP TSG RAN WG1 Meeting #97, R1-1907860, May 2019, 35 pages.
Samsung, "New WID: Further enhancements on MIMO for NR", 3GPP TSG RAN Meeting #86, RP-193133, Dec. 2019, 5 pages.
Chinese National Intellectual Property Administration, First Office Action issued May 25, 2024 regarding Application No. 202080086512.8, 13 pages.

* cited by examiner

BEAM MANAGEMENT AND COVERAGE ENHANCEMENTS FOR SEMI-PERSISTENT AND CONFIGURED GRANT TRANSMISSIONS

CROSS-REFERENCE TO RELATED APPLICATIONS AND CLAIM OF PRIORITY

This application is a continuation of U.S. patent application Ser. No. 17/247,390, filed on Dec. 9, 2020, which claims priority to U.S. Provisional Patent Application No. 62/947,543, filed on Dec. 13, 2019. The content of the above-identified patent document is incorporated herein by reference.

TECHNICAL FIELD

The present disclosure relates generally to wireless communication systems and, more specifically, the present disclosure relates to beam management and coverage enhancements for semi-persistent and configured grant transmissions.

BACKGROUND

5th generation (5G) or new radio (NR) mobile communications is recently gathering increased momentum with all the worldwide technical activities on the various candidate technologies from industry and academia. The candidate enablers for the 5G/NR mobile communications include massive antenna technologies, from legacy cellular frequency bands up to high frequencies, to provide beamforming gain and support increased capacity, new waveform (e.g., a new radio access technology (RAT)) to flexibly accommodate various services/applications with different requirements, new multiple access schemes to support massive connections, and so on.

SUMMARY

The present disclosure relates to wireless communication systems and, more specifically, the present disclosure relates to beam management and coverage enhancements for semi-persistent and configured grant transmissions.

In one embodiment, method to transmit a signal or a channel is provided. The method includes receiving a configuration for spatial filters, determining first and second spatial filters from the spatial filters, and determining first and second numbers of repetitions. The spatial filters correspond to spatial relations with reference signals (RSs), respectively. The first and second spatial filters are different. The first and second numbers of repetitions are different. The method further includes transmitting the signal or the channel using the first spatial filter for the first number of repetitions and using the second spatial filter for the second number of repetitions. The second number of repetitions is transmitted after the first number of repetitions.

In another embodiment, a user equipment (UE) is provided. The UE includes a transceiver configured to receive a configuration for spatial filters. The spatial filters correspond to spatial relations with reference signals (RSs), respectively. The UE further includes a processor, operably connected to the transceiver. The processor is configured to determine first and second spatial filters from the spatial filters and first and second numbers of repetitions. The first and second spatial filters are different. The first and second numbers of repetitions are different. The transceiver is further configured to transmit a signal or a channel using the first spatial filter for the first number of repetitions and using the second spatial filter for the second number of repetitions. The second number of repetitions is transmitted after the first number of repetitions.

In yet another embodiment, a base station (BS) is provided. The BS includes a transceiver configured to transmit a configuration for spatial filters. The spatial filters correspond to spatial relations with reference signals (RSs), respectively. The BS further includes a processor operably connected to the transceiver. The processor is configured to determine first and second spatial filters from the spatial filters and first and second numbers of repetitions. The first and second spatial filters are different. The first and second numbers of repetitions are different. The transceiver is configured to receive the signal or the channel using the first spatial filter for the first number of repetitions and using the second spatial filter for the second number of repetitions. The second number of repetitions is received after the first number of repetitions.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIG. 1 through FIG. 22, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The following documents are hereby incorporated by reference into the present disclosure as if fully set forth herein: 3GPP TS 38.211 v15.7.0, "NR; Physical channels and modulation"; 3GPP TS 38.212 v15.7.0, "NR; Multiplexing and Channel coding"; 3GPP TS 38.213 v15.7.0, "NR; Physical Layer Procedures for Control"; 3GPP TS 38.214 v15.7.0, "NR; Physical Layer Procedures for Data"; 3GPP TS 38.321 v15.7.0, "NR; Medium Access Control (MAC) protocol specification"; and 3GPP TS 38.331 v15.7.0, "NR; Radio Resource Control (RRC) Protocol Specification."

Figure 1:
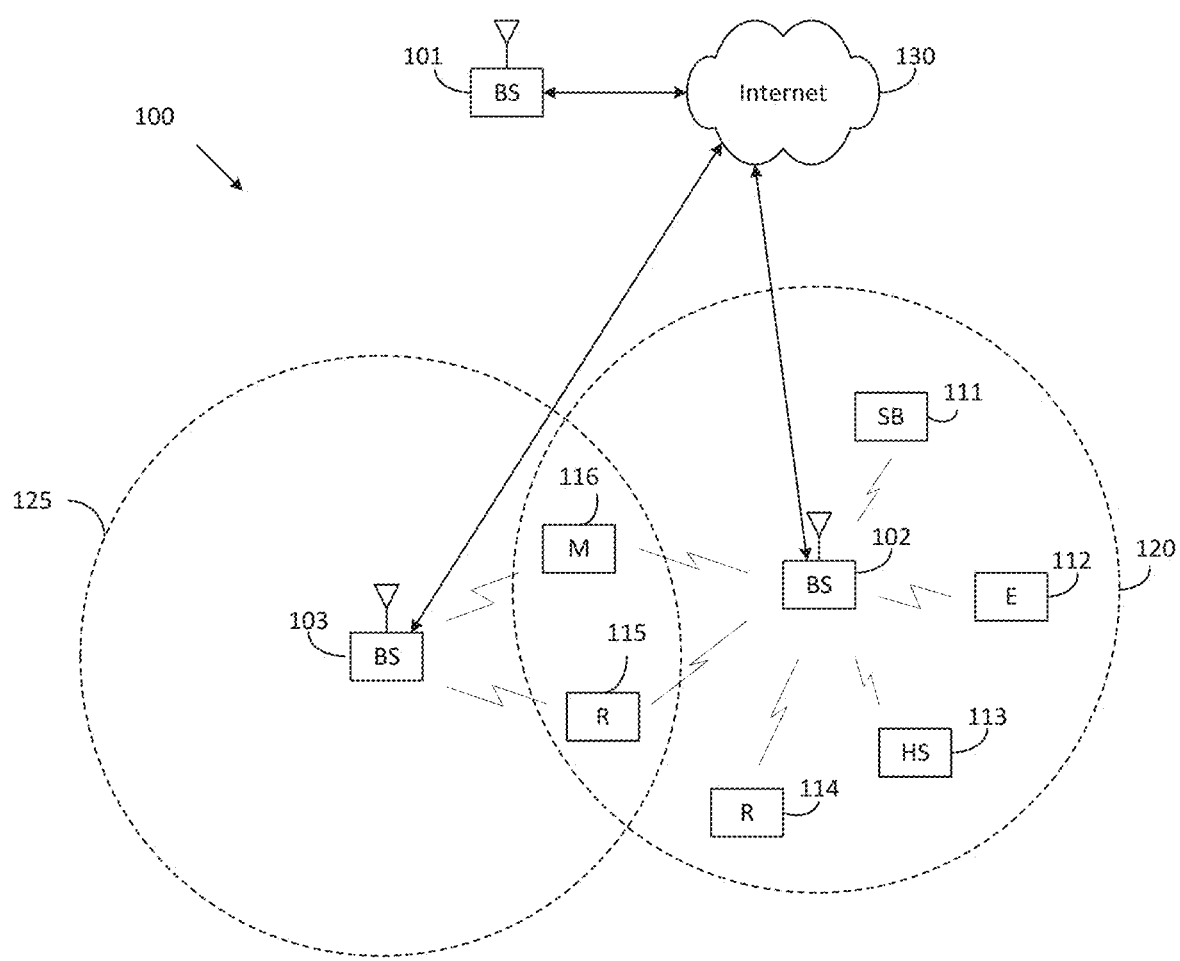
FIG. 1 illustrates an example wireless network according to embodiments of the present disclosure.
Figure 2:
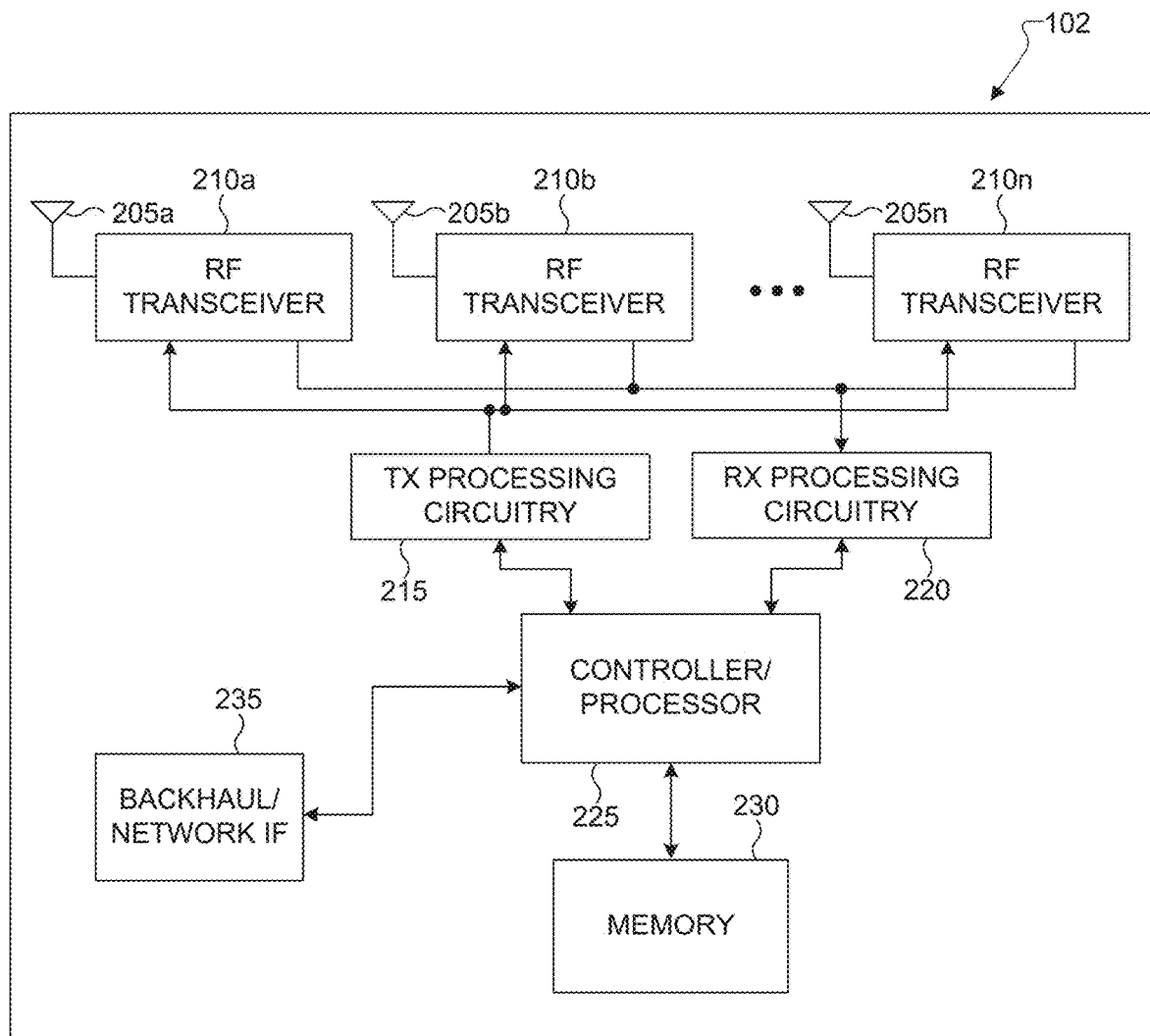
FIG. 2 illustrates an example gNB according to embodiments of the present disclosure.
Figure 3:
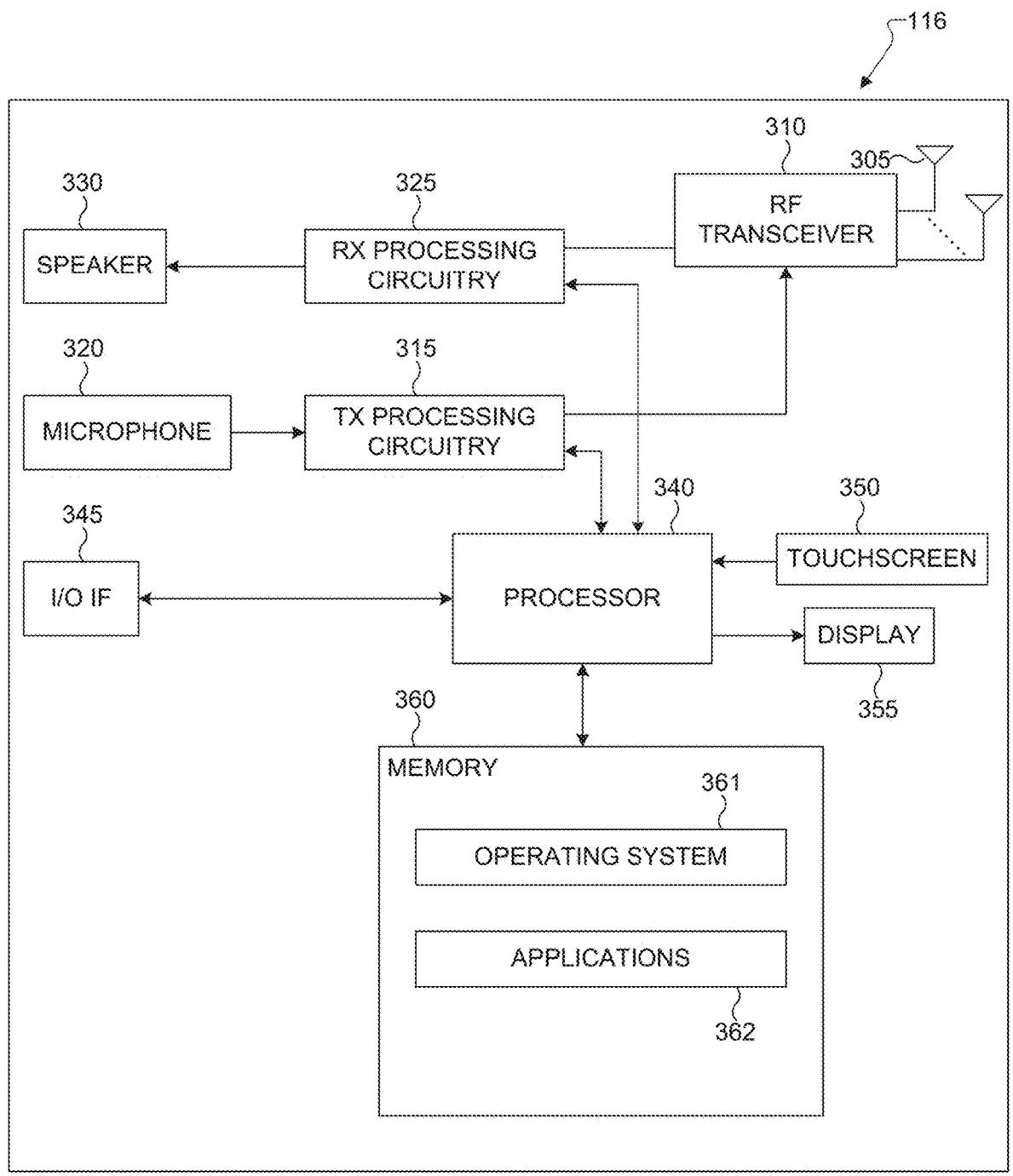
FIG. 3 illustrates an example UE according to embodiments of the present disclosure.

FIGS. 1-3 below describe various embodiments implemented in wireless communications systems and with the use of orthogonal frequency division multiplexing (OFDM) or orthogonal frequency division multiple access (OFDMA) communication techniques. The descriptions of FIGS. 1-3 are not meant to imply physical or architectural limitations to the manner in which different embodiments may be implemented. Different embodiments of the present disclosure may be implemented in any suitably-arranged communications system.

FIG. 1 illustrates an example wireless network according to embodiments of the present disclosure. The embodiment of the wireless network shown in FIG. 1 is for illustration only. Other embodiments of the wireless network 100 could be used without departing from the scope of this disclosure.

As shown in FIG. 1, the wireless network includes a gNB 101 (e.g., base station, BS), a gNB 102, and a gNB 103. The gNB 101 communicates with the gNB 102 and the gNB 103. The gNB 101 also communicates with at least one network 130, such as the Internet, a proprietary Internet Protocol (IP) network, or other data network.

The gNB 102 provides wireless broadband access to the network 130 for a first plurality of user equipments (UEs) within a coverage area 120 of the gNB 102. The first plurality of UEs includes a UE 111, which may be located in a small business; a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M), such as a cell phone, a wireless laptop, a wireless PDA, or the like. The gNB 103 provides wireless broadband access to the network 130 for a second plurality of UEs within a coverage area 125 of the gNB 103. The second plurality of UEs includes the UE 115 and the UE 116. In some embodiments, one or more of the gNBs 101-103 may communicate with each other and with the UEs 111-116 using 5G/NR, LTE, LTE-A, WiMAX, WiFi, or other wireless communication techniques.

Depending on the network type, the term "base station" or "BS" can refer to any component (or collection of components) configured to provide wireless access to a network, such as transmit point (TP), transmit-receive point (TRP), an enhanced base station (eNodeB or eNB), a 5G/NR base station (gNB), a macrocell, a femtocell, a WiFi access point (AP), or other wirelessly enabled devices. Base stations may provide wireless access in accordance with one or more wireless communication protocols, e.g., 5G/NR 3GPP NR, long term evolution (LTE), LTE advanced (LTE-A), high speed packet access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

Dotted lines show the approximate extents of the coverage areas 120 and 125, which are shown as approximately circular for the purposes of illustration and explanation only. It should be clearly understood that the coverage areas associated with gNBs, such as the coverage areas 120 and 125, may have other shapes, including irregular shapes, depending upon the configuration of the gNBs and variations in the radio environment associated with natural and man-made obstructions.

As described in more detail below, one or more of the UEs 111-116 include circuitry, programing, or a combination thereof, for beam management and coverage enhancements for semi-persistent and configured grant transmissions. In certain embodiments, and one or more of the gNBs 101-103 includes circuitry, programing, or a combination thereof, for beam management and coverage enhancements for semi-persistent and configured grant transmissions.

Although FIG. 1 illustrates one example of a wireless network, various changes may be made to FIG. 1. For example, the wireless network could include any number of gNBs and any number of UEs in any suitable arrangement. Also, the gNB 101 could communicate directly with any number of UEs and provide those UEs with wireless broadband access to the network 130. Similarly, each gNB 102-103 could communicate directly with the network 130 and provide UEs with direct wireless broadband access to the network 130. Further, the gNBs 101, 102, and/or 103 could provide access to other or additional external networks, such as external telephone networks or other types of data networks.

FIG. 2 illustrates an example gNB 102 according to embodiments of the present disclosure. The embodiment of the gNB 102 illustrated in FIG. 2 is for illustration only, and the gNBs 101 and 103 of FIG. 1 could have the same or similar configuration. However, gNBs come in a wide variety of configurations, and FIG. 2 does not limit the scope of this disclosure to any particular implementation of a gNB.

As shown in FIG. 2, the gNB 102 includes multiple antennas 205a-205n, multiple RF transceivers 210a-210n, transmit (TX) processing circuitry 215, and receive (RX) processing circuitry 220. The gNB 102 also includes a controller/processor 225, a memory 230, and a backhaul or network interface 235.

The RF transceivers 210a-210n receive, from the antennas 205a-205n, incoming RF signals, such as signals transmitted by UEs in the network 100. The RF transceivers 210a-210n down-convert the incoming RF signals to generate IF or baseband signals. The IF or baseband signals are sent to the RX processing circuitry 220, which generates processed baseband signals by filtering, decoding, and/or digitizing the baseband or IF signals. The RX processing circuitry 220 transmits the processed baseband signals to the controller/processor 225 for further processing.

The TX processing circuitry 215 receives analog or digital data (such as voice data, web data, e-mail, or interactive video game data) from the controller/processor 225. The TX processing circuitry 215 encodes, multiplexes, and/or digitizes the outgoing baseband data to generate processed baseband or IF signals. The RF transceivers 210a-210n receive the outgoing processed baseband or IF signals from the TX processing circuitry 215 and up-converts the baseband or IF signals to RF signals that are transmitted via the antennas 205a-205n.

The controller/processor 225 can include one or more processors or other processing devices that control the overall operation of the gNB 102. For example, the controller/processor 225 could control the reception of forward channel signals and the transmission of reverse channel signals by the RF transceivers 210a-210n, the RX processing circuitry 220, and the TX processing circuitry 215 in accordance with well-known principles. The controller/processor 225 could support additional functions as well, such as more advanced wireless communication functions. For instance, the controller/processor 225 could support beam forming or directional routing operations in which outgoing/incoming signals from/to multiple antennas 205a-205n are weighted differently to effectively steer the outgoing signals in a desired direction. Any of a wide variety of other functions could be supported in the gNB 102 by the controller/processor 225.

The controller/processor 225 is also capable of executing programs and other processes resident in the memory 230, such as an OS. The controller/processor 225 can move data into or out of the memory 230 as required by an executing process.

The controller/processor 225 is also coupled to the backhaul or network interface 235. The backhaul or network interface 235 allows the gNB 102 to communicate with other devices or systems over a backhaul connection or over a network. The interface 235 could support communications over any suitable wired or wireless connection(s). For example, when the gNB 102 is implemented as part of a cellular communication system (such as one supporting 5G/NR, LTE, or LTE-A), the interface 235 could allow the gNB 102 to communicate with other gNBs over a wired or wireless backhaul connection. When the gNB 102 is implemented as an access point, the interface 235 could allow the gNB 102 to communicate over a wired or wireless local area network or over a wired or wireless connection to a larger network (such as the Internet). The interface 235 includes any suitable structure supporting communications over a wired or wireless connection, such as an Ethernet or RF transceiver.

The memory 230 is coupled to the controller/processor 225. Part of the memory 230 could include a RAM, and another part of the memory 230 could include a Flash memory or other ROM.

Although FIG. 2 illustrates one example of gNB 102, various changes may be made to FIG. 2. For example, the gNB 102 could include any number of each component shown in FIG. 2. As a particular example, an access point could include a number of interfaces 235, and the controller/processor 225 could support routing functions to route data between different network addresses. As another particular example, while shown as including a single instance of TX processing circuitry 215 and a single instance of RX processing circuitry 220, the gNB 102 could include multiple instances of each (such as one per RF transceiver). Also, various components in FIG. 2 could be combined, further subdivided, or omitted and additional components could be added according to particular needs.

FIG. 3 illustrates an example UE 116 according to embodiments of the present disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, TX processing circuitry 315, a microphone 320, and receive (RX) processing circuitry 325. The UE 116 also includes a speaker 330, a processor 340, an input/output (I/O) interface (IF) 345, a touchscreen 350, a display 355, and a memory 360. The memory 360 includes an operating system (OS) 361 and one or more applications 362.

The RF transceiver 310 receives, from the antenna 305, an incoming RF signal transmitted by a gNB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the processor 340 for further processing (such as for web browsing data).

The TX processing circuitry 315 receives analog or digital voice data from the microphone 320 or other outgoing baseband data (such as web data, e-mail, or interactive video game data) from the processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The processor 340 can include one or more processors or other processing devices and execute the OS 361 stored in the memory 360 in order to control the overall operation of the UE 116. For example, the processor 340 could control the reception of forward channel signals and the transmission of reverse channel signals by the RF transceiver 310, the RX processing circuitry 325, and the TX processing circuitry 315 in accordance with well-known principles. In some embodiments, the processor 340 includes at least one microprocessor or microcontroller.

The processor 340 is also capable of executing other processes and programs resident in the memory 360, such as processes for beam management. The processor 340 can move data into or out of the memory 360 as required by an executing process. In some embodiments, the processor 340 is configured to execute the applications 362 based on the OS 361 or in response to signals received from gNBs or an operator. The processor 340 is also coupled to the I/O interface 345, which provides the UE 116 with the ability to connect to other devices, such as laptop computers and handheld computers. The I/O interface 345 is the communication path between these accessories and the processor 340.

The processor 340 is also coupled to the touchscreen 350 and the display 355. The operator of the UE 116 can use the touchscreen 350 to enter data into the UE 116. The display 355 may be a liquid crystal display, light emitting diode display, or other display capable of rendering text and/or at least limited graphics, such as from web sites.

The memory 360 is coupled to the processor 340. Part of the memory 360 could include a random access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

To meet the demand for wireless data traffic having increased since deployment of 4G communication systems and to enable various vertical applications, efforts have been made to develop and deploy an improved 5G/NR or pre-5G/NR communication system. Therefore, the 5G/NR or pre-5G/NR communication system is also called a "beyond 4G network" or a "post LTE system." The 5G/NR communication system is considered to be implemented in higher frequency (mmWave) bands, e.g., 28 GHz or 60 GHz bands, so as to accomplish higher data rates or in lower frequency bands, such as 6 GHz, to enable robust coverage and mobility support. Aspects of the present disclosure may also be applied to deployment of 5G communication system, 6G or even later release which may use terahertz (THz) bands. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G/NR communication systems.

In addition, in 5G/NR communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

A communication system includes a downlink (DL) that refers to transmissions from a base station or one or more transmission points to UEs and an uplink (UL) that refers to transmissions from UEs to a base station or to one or more reception points.

A time unit for DL signaling or for UL signaling on a cell is referred to as a slot and can include one or more symbols. A symbol can also serve as an additional time unit. A frequency (or bandwidth (BW)) unit is referred to as a resource block (RB). One RB includes a number of sub-carriers (SCs). For example, a slot can have duration of 0.5 milliseconds or 1 millisecond, include 14 symbols and an RB can include 12 SCs with inter-SC spacing of 15 KHz or 30 KHz, and so on.

DL signals include data signals conveying information content, control signals conveying DL control information (DCI), and reference signals (RS) that are also known as pilot signals. A gNB transmits data information or DCI through respective physical DL shared channels (PDSCHs) or physical DL control channels (PDCCHs). A PDSCH or a PDCCH can be transmitted over a variable number of slot symbols including one slot symbol. For brevity, a DCI format scheduling a PDSCH reception by a UE is referred to as a DL DCI format and a DCI format scheduling a physical uplink shared channel (PUSCH) transmission from a UE is referred to as an UL DCI format.

A gNB transmits one or more of multiple types of RS including channel state information RS (CSI-RS) and demodulation RS (DMRS). A CSI-RS is primarily intended for UEs to perform measurements and provide channel state information (CSI) to a gNB. For channel measurement, non-zero power CSI-RS (NZP CSI-RS) resources are used. For interference measurement reports (IMRs), CSI interference measurement (CSI-IM) resources associated with a zero power CSI-RS (ZP CSI-RS) configuration are used. A CSI process includes NZP CSI-RS and CSI-IM resources.

A UE can determine CSI-RS transmission parameters through DL control signaling or higher layer signaling, such as radio resource control (RRC) signaling, from a gNB. Transmission instances of a CSI-RS can be indicated by DL control signaling or be configured by higher layer signaling. A DMRS is transmitted only in the BW of a respective PDCCH or PDSCH and a UE can use the DMRS to demodulate data or control information.

Figure 4:
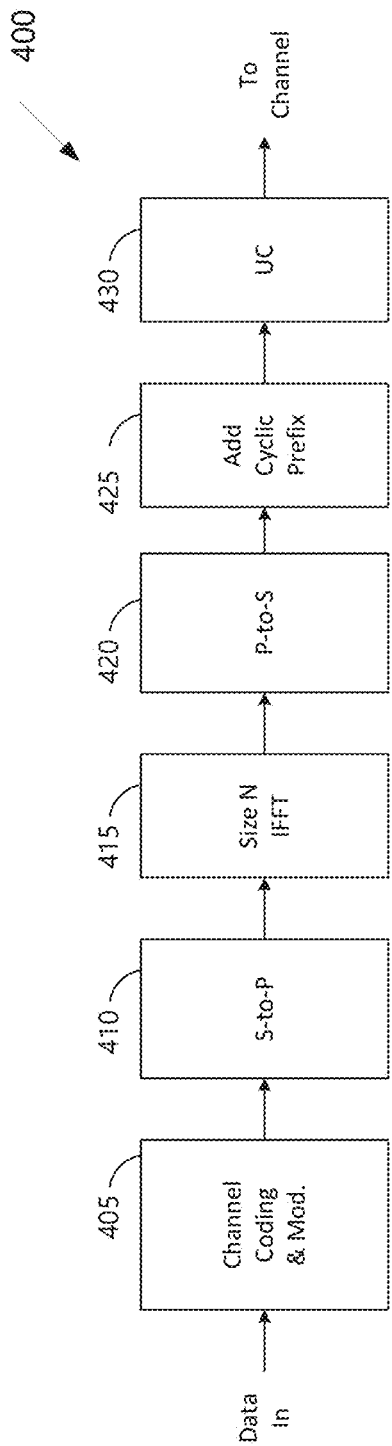
FIGS. 4 and 5 illustrate example wireless transmit and receive paths according to this disclosure.
Figure 5:
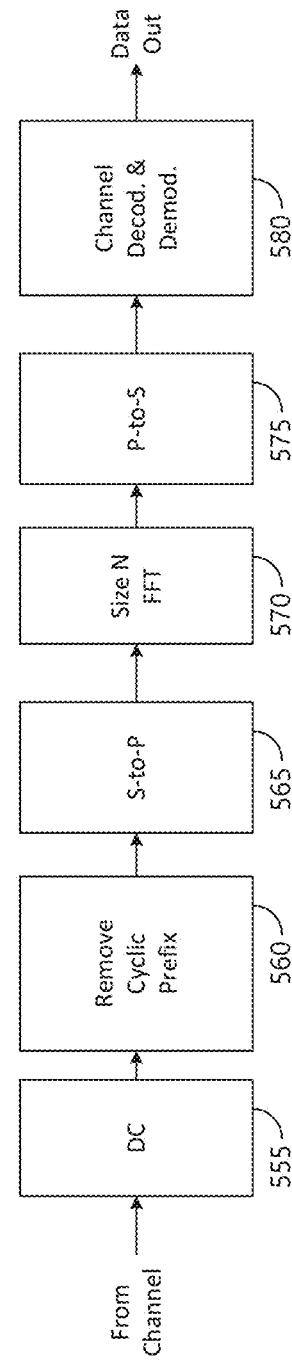

FIG. 4 and FIG. 5 illustrate example wireless transmit and receive paths according to this disclosure. In the following description, a transmit path 400 may be described as being implemented in a gNB (such as the gNB 102), while a receive path 500 may be described as being implemented in a UE (such as a UE 116). However, it may be understood that the receive path 500 can be implemented in a gNB and that the transmit path 400 can be implemented in a UE. In some embodiments, the receive path 500 is configured to support the codebook design and structure for systems having 2D antenna arrays as described in embodiments of the present disclosure.

The transmit path 400 as illustrated in FIG. 4 includes a channel coding and modulation block 405, a serial-to-parallel (S-to-P) block 410, a size N inverse fast Fourier transform (IFFT) block 415, a parallel-to-serial (P-to-S) block 420, an add cyclic prefix block 425, and an up-converter (UC) 430. The receive path 500 as illustrated in FIG. 5 includes a down-converter (DC) 555, a remove cyclic prefix block 560, a serial-to-parallel (S-to-P) block 565, a size N fast Fourier transform (FFT) block 570, a parallel-to-serial (P-to-S) block 575, and a channel decoding and demodulation block 580.

As illustrated in FIG. 400, the channel coding and modulation block 405 receives a set of information bits, applies coding (such as a low-density parity check (LDPC) coding), and modulates the input bits (such as with quadrature phase shift keying (QPSK) or quadrature amplitude modulation (QAM)) to generate a sequence of frequency-domain modulation symbols.

The serial-to-parallel block 410 converts (such as de-multiplexes) the serial modulated symbols to parallel data in order to generate N parallel symbol streams, where N is the IFFT/FFT size used in the gNB 102 and the UE 116. The size N IFFT block 415 performs an IFFT operation on the N parallel symbol streams to generate time-domain output signals. The parallel-to-serial block 420 converts (such as multiplexes) the parallel time-domain output symbols from the size N IFFT block 415 in order to generate a serial time-domain signal. The add cyclic prefix block 425 inserts a cyclic prefix to the time-domain signal. The up-converter 430 modulates (such as up-converts) the output of the add cyclic prefix block 425 to an RF frequency for transmission via a wireless channel. The signal may also be filtered at baseband before conversion to the RF frequency.

A transmitted RF signal from the gNB 102 arrives at the UE 116 after passing through the wireless channel, and reverse operations to those at the gNB 102 are performed at the UE 116.

As illustrated in FIG. 5, the down-converter 555 down-converts the received signal to a baseband frequency, and the remove cyclic prefix block 560 removes the cyclic prefix to generate a serial time-domain baseband signal. The serial-to-parallel block 565 converts the time-domain baseband signal to parallel time domain signals. The size N FFT block 570 performs an FFT algorithm to generate N parallel frequency-domain signals. The parallel-to-serial block 575 converts the parallel frequency-domain signals to a sequence of modulated data symbols. The channel decoding and demodulation block 580 demodulates and decodes the modulated symbols to recover the original input data stream.

Each of the gNBs 101-103 may implement a transmit path 400 as illustrated in FIG. 4 that is analogous to transmitting in the downlink to UEs 111-116 and may implement a receive path 500 as illustrated in FIG. 5 that is analogous to receiving in the uplink from UEs 111-116. Similarly, each of UEs 111-116 may implement the transmit path 400 for transmitting in the uplink to the gNBs 101-103 and may implement the receive path 500 for receiving in the downlink from the gNB s 101-103.

Each of the components in FIG. 4 and FIG. 5 can be implemented using only hardware or using a combination of hardware and software/firmware. As a particular example, at least some of the components in FIG. 4 and FIG. 5 may be implemented in software, while other components may be implemented by configurable hardware or a mixture of software and configurable hardware. For instance, the FFT block 570 and the IFFT block 515 may be implemented as configurable software algorithms, where the value of size N may be modified according to the implementation.

Furthermore, although described as using FFT and IFFT, this is by way of illustration only and may not be construed to limit the scope of this disclosure. Other types of transforms, such as discrete Fourier transform (DFT) and inverse discrete Fourier transform (IDFT) functions, can be used. It may be appreciated that the value of the variable N may be any integer number (such as 1, 2, 3, 4, or the like) for DFT and IDFT functions, while the value of the variable N may be any integer number that is a power of two (such as 1, 2, 4, 8, 16, or the like) for FFT and IFFT functions.

Although FIG. 4 and FIG. 5 illustrate examples of wireless transmit and receive paths, various changes may be made to FIG. 4 and FIG. 5. For example, various components in FIG. 4 and FIG. 5 can be combined, further subdivided, or omitted and additional components can be added according to particular needs. Also, FIG. 4 and FIG. 5 are meant to illustrate examples of the types of transmit and receive paths that can be used in a wireless network. Any other suitable architectures can be used to support wireless communications in a wireless network.

The present disclosure relates to a pre-5G or 5G communication system to be provided for supporting one or more of: higher data rates, lower latency, higher reliability, and massive connectivity, beyond 4G communication system such as LTE. Although the focus of this disclosure is on 3GPP 5G NR communication systems, various embodiments may apply in general to UEs operating with other RATs and/or standards, such as different releases/generations of 3GPP standards (including beyond 5G, 6G, and so on), IEEE standards (such as 802.16 WiMAX and 802.11 Wi-Fi), and so on.

This disclosure pertains to a UE or a group of UEs with reduced cost and/or complexity or, in general, reduced capability (REDCAP) UEs. For example, a REDCAP UE can have one or more of the following reduced bandwidth, reduced number of Rx and/or Tx RF chain, reduced power class compared to a legacy/baseline UE or UE group/category such as the one defined by 3GPP 5G NR Rel-15. A REDCAP UE or UE group may be recognized as a UE category (or multiple UE categories) satisfying certain predetermined/specified radio and/or service requirements and/or certain predetermined/specified UE capabilities. A REDCAP UE or UE group/category can also support certain features, such as for coverage recovery or coverage enhancement. Examples of such a REDCAP UE can include smart wearables/watches, surveillance cameras, and (mid-tier) wireless sensors. In certain scenarios and deployments, there may be a large number (e.g., tens or hundreds or more) of REDCAP UEs within a serving cell.

This disclosure also pertains any UE that benefits from/requires coverage enhancement, for example due to deployment situations that can experience large propagation loss, such as deep in building use cases, or due to a reduced number of receiver antennas, or due to a reduced power class for an amplifier of the UE transmitter.

This disclosure also pertains any UE that benefits from reduced overhead for transmissions and decreased receiver complexity, such as transmission with reduced control information, reduced PDCCH monitoring requirements, transmissions with configured grant (CG), or transmissions with semi-persistent scheduling (SPS).

Downlink semi-persistent scheduling (DL SPS) and uplink configured grant (UL CG) configurations provide efficient resource utilization means with low control signalling overhead for periodic or semi-persistent traffic.

Coverage enhancements can be provided by using a narrower transmission beam as a total transmission power can be contained in the spatial dimension rather than be uniformly spread in space such as when using an omnidirectional antenna.

Therefore, there is a need to improve beam management including beam selection and/or beam refinement for UL CG/DL SPS transmissions/receptions, especially when UE mobility needs to be supported and/or when a signal quality of beam(s) change(s) over time.

There is another need to improve coverage for UL CG/DL SPS transmission/receptions in response to variations in channel/beam quality over time.

There is a further need to develop enhancements in supporting UL CG/DL SPS transmissions/receptions such that they do not introduce (significant) additional signalling overhead to the system.

The present disclosure provides enhancements for DL SPS and/or UL CG configurations and transmissions, wherein the focus of enhancements is at least one or more of: improved channel/beam quality for UL CG/DL SPS transmissions/receptions via beam management enhancements such as beam selection, beam refinement, and beam failure recovery operations for UL CG/DL SPS transmissions based on UE autonomous decisions, or gNB guidance or indication, or a combination thereof; improved coverage for UL CG/DL SPS transmissions via enhanced repetition schemes such as dynamic and autonomous UE selection of a number of repetitions for an UL CG transmission; improved latency for a UL CG transmission by supporting a flexible start time for UL CG transmission occasion; and location-based configuration of UL CG/DL SPS to allow all UEs within a certain geographical area to use a common UL CG/DL SPS configuration.

One motivation for focusing on enhanced beam management and enhanced repetitions schemes is to improve coverage for UL CG/DL SPS transmission for use cases related to massive IoT or REDCAP UEs as well as legacy eMBB UEs requiring coverage enhancement, for example due to operation in higher carrier frequencies. The embodiments, however, are generic and can be applied to other use cases as well, such as for services requiring enhanced reliability, sidelink/V2X communications, and so on.

This disclosure addresses the above concepts and provides additional design aspects for supporting enhanced beam management mechanisms and coverage enhancement methods (including enhanced repetition schemes) for DL SPS or UL CG transmissions, and discloses novel solutions and embodiments for DL SPS/UL CG operation as summarized below and as they are subsequently fully elaborated.

In one embodiment, an enhanced beam management for UL CG is provided to provide a separate set of beam indications for UL CG compared to a dynamically scheduled/triggered UL transmission.

In one example, an enhanced timing for beam indication for UL CG is provided to support a dynamic beam change for UL CG, such that each UL CG transmission occasion follows a realization of a last UL CG beam prior to that transmission occasion, and can be potentially different from a beam realization for other UL CG transmission occasions.

In another example, UL CG PUSCH with multiple beam indication resources is provided to support a single UL CG configured with multiple beam indication RS resources so that each transmission occasion can follow a different beam indication RS resource (from the multiple resources) based on gNB indication or UE selection, such as based on UE measurements of the resources, or a combination thereof.

In one embodiment, enhanced beam management and indication for DL SPS are provided. In one embodiment, enhanced timing for beam indication for DL SPS is provided. In one embodiment, DL SPS PDSCH with multiple beam indication resources is provided, that provide for DL SPS similar beam management enhancements as described above for the case of UL CG.

In one embodiment, a beam-failure-recovery-like procedure for UL CG/DL SPS is provided that describes methods for replacing beam(s) that is/are configured/indicated for UL CG or DL SPS and is/are detected by a UE to have failed to be failing in terms of link quality, so that the UE can continue using the UL CG/DL SPS resources even after a failure of corresponding beams. According to some provided solutions, this benefit can be achieved with reduced overhead, for example, without any gNB signalling.

In one embodiment, an enhanced repetition mechanism for UL CG is provided that supports gNB indication/configuration of a set or range of valid/allowed number of repetitions for the UE to select from, such a minimum and maximum number of repetitions or, for example, a baseline number of repetitions along with a scale factor/ratio.

In one example, methods for UE-determination of a number of UL CG repetitions are provided for the UE to select an actual number of repetitions (from a set/range of allowed values) for each UL CG transmission occasion based on UE measurement of one or multiple configured/ indicated RS resources.

In another example, methods for UE-indication to the gNB regarding a UE-selected number of UL CG repetitions are provided, such as explicit indication, for example, in a CG-UCI multiplexed on the CG PUSCH, or an implicit indication, for example, using different DMRS features depending on the number of repetitions.

In another example, an enhanced repetition mechanism for DL SPS is provided that provides for DL SPS similar repetition enhancements as described above for UL CG.

In one embodiment, beam selection and beam cycling are provided for repetitions of UL CG configured with multiple beams, to transmit all repetitions of an UL CG with a same beam or to transmit repetitions in groups such that each repetition group corresponds to a potentially different beam, and each repetition group can include a same or different number of repetitions.

In one example of, beam selection and beam cycling are provided for repetitions of DL SPS configured with multiple beams that provides for DL SPS similar repetition enhancements as briefly described above for the case of UL CG.

In one embodiment, enhanced UL CG repetitions are provided for high priority traffic to allow the UE to start transmitting on a symbol/slot/repetition of an UL CG transmission occasion different from the first symbol/slot/repetition of UL CG transmission occasion, along with an indication to the gNB on the starting point. There can be a gNB-indicated threshold on how late the UE can start transmitting on an UL CG transmission occasion.

In one embodiment, a location-based configuration of UL CG/DL SPS is provided to support a configuration of transmission resources and/or parameters for UL CG/DL SPS based on geographical location parameters, such as zone-specific configuration of UL CG/DL SPS to be used for all UEs in that zone. Location or zone determination can be based on e.g., V2X zones, GPS signal, and/or positioning reference signal (PRS).

A dynamic data transmission in a downlink (DL) or an uplink (UL) of a communication system refers to an aperiodic transmission of information on a PDSCH or PUSCH that is scheduled by a DCI format in a PDCCH reception The DCI format can indicate parameters related to resource allocation, power control, and scheduling and HARQ such as: time domain resource allocation (TDRA), frequency domain resource allocation (FDRA), virtual to physical resource mapping (for the case of interleaving), modulation and coding scheme (MCS), UL frequency hopping parameters, HARQ process number (HPN), new data indicator (NDI), redundancy version (RV), and (for PUSCH) TPC for PUSCH or (for PDSCH) PUCCH resource index, TPC for PUCCH, PDSCH-to-HARQ feedback timing, and downlink assignment index (DAI).

The DCI format can additionally include parameters related to cross scheduling, MIMO operation, enhanced HARQ operation, control information multiplexing, rate matching, repetition, such as an indication for one or more of a cell/carrier/bandwidth part(BWP), an antenna port, transmission configurator indicator/sounding reference signal (SRS) resource indicator (TCI/SRI), precoding matrix indicator (PMI), CSI-RS trigger/request, SRS trigger/request, DMRS initialization, PTRS association, number of codeblock groups (CBGs), CBG flushing indicator, DAI (for multiplexing HARQ codebook on PUSCH), uplink-shared channel (UL-SCH) indicator, beta_offset, physical resource block (PRB) bundling size, rate matching indicator, number of repetitions, and so on.

The order and/or bit-width of the information fields (IEs) in the DCI format can be predetermined in system specifications and/or can be configurable.

A UE can receive a PDCCH providing a DCI format according to a UE-specific search space (USS) where a CRC of the DCI format is scrambled by a UE-specific radio network temporary identifier (RNTI) such as a cell-RNTI (C-RNTI) or a modulation coding scheme-cell-RNTI (MCS-C-RNTI). A dynamic PDSCH or PUSCH transmission can be repeated a number of times per RRC configuration or per DCI indication, wherein the repetition can be on a slot basis (a.k.a., slot aggregation or repetition Type-1) or on a shorter time scale/duration a repetition Type-2.

A UE can also receive a PDCCH providing a DCI format according to a in a common search space (CSS). DCI formats provided by PDCCH receptions according to a CSS include a DCI format providing a DL/UL slot format indication (SFI), a DCI format providing DL or UL transmission interruption/cancellation/pre-emption, DCI formats providing TPC commands for PUSCH, PUCCH, SRS, and so on.

An antenna port is defined such that the channel over which a symbol on the antenna port is conveyed can be inferred from the channel over which another symbol on the same antenna port is conveyed.

Two antenna ports are said to be quasi co-located (QCL) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters.

A UE can be configured with a list of up to M TCI-State configurations within the higher layer parameter PDSCH-Config to decode PDSCH according to a detected PDCCH with DCI intended for the UE and the given serving cell, where M depends on the UE capability maxNumberConfiguredTClstatesPerCC. Each TCI-State contains parameters for configuring a QCL relationship between one or two downlink reference signals and the DMRS ports of the PDSCH, the DMRS port of PDCCH or the CSI-RS port(s) of a CSI-RS resource.

The quasi co-location relationship is configured by the higher layer parameter qcl-Type1 for the first DL RS, and qcl-Type2 for the second DL RS (if configured). For the case of two DL RSs, the QCL types may not be the same, regardless of whether the references are to the same DL RS or different DL RSs.

The quasi co-location types corresponding to each DL RS are given by the higher layer parameter qcl-Type in QCL-Info and may take one of the following values: "QCL-TypeA": {Doppler shift, Doppler spread, average delay, delay spread}; "QCL-TypeB": {Doppler shift, Doppler spread}; "QCL-TypeC": {Doppler shift, average delay}; and "QCL-TypeD": {Spatial Rx parameter}.

A UE receives a medium access control-control element (MAC-CE) activation command to map up to N such as N=8 TCI states to the codepoints of the DCI field "Transmission Configuration Indication." When the HARQ-acknowledgement (HARQ-ACK) information corresponding to the PDSCH carrying the MAC-CE activation command is transmitted in slot n, the indicated mapping between TCI states and codepoints of the DCI field "Transmission Configuration Indication" may be applied after a MAC-CE application time, e.g., starting from the first slot that is after slot e.g. $n+3N_{slot}^{subframe,\mu}$ where $N_{slot}^{subframe,\mu}$ is a number of slot per subframe for subcarrier spacing (SCS) configuration $\mu$.

Throughout the present disclosure, the terms "transmission" and "retransmission," if not clarified, are used to refer to a transmission from UE side or a transmission from a gNB side (i.e., a reception at the UE side), which may be clear from the context. Throughout this disclosure, the term "dynamic PUSCH transmission" is used to refer to a PUSCH transmission that is scheduled by a DCI format.

Throughout the present disclosure, the terms "initial transmission" or the term "original transmission" are used to refer to a transmission or a corresponding reception before any HARQ retransmission and/or HARQ combining.

Throughout the present disclosure, the terms "DL SPS" and "SPS PDSCH" and "DL SPS PDSCH" are used interchangeably, with details and definitions as discussed below and throughput this disclosure.

Throughout the present disclosure, the terms "UL CG" and "CG PUSCH" and "UL CG PUSCH" are used interchangeably, with details and definitions as discussed below and throughput this disclosure.

In some use cases and scenarios, such as, voice over internet protocol (VoIP), sensor measurements, data collection, and so on, a periodic or semi-persistent data traffic pattern is expected on the DL or the UL. Such a traffic pattern motivates a use of (pre-)configured resources and scheduling for data transmission, to avoid control overhead associated with scheduling a data transmission using a DCI format in a PDCCH transmission. For such periodic or semi-persistent DL or UL data transmissions, SPS and/or CG transmission is preferable.

A CG PUSCH Type-1 configuration pertains purely RRC-based configuration, activation, and release/deactivation of resource allocation and transmission parameters, except possibly for some implicit parameter determinations. A CG PUSCH Type-2 configuration pertains some resource allocation and transmission parameter indications by RRC configuration, while other resource allocation and transmission parameter indications are provided by a DCI format activating the CG-PUSCH Type 2 transmission except possibly for some implicit parameter determinations. A release of resources configured to a UE for CG-PUSCH Type 2 transmission is indicated by a deactivation/releasing DCI format.

For semi-persistent DL data transmission, a DL SPS configuration is defined wherein some resource allocation and transmission parameter indications are provided by RRC configuration, while other remaining resource allocation and transmission parameters as well as activation of the DL SPS transmission are indicated by an activation DCI format, except possibly for some implicit parameter determinations. A release of the resources configured to a UE for DL SPS receptions is indicated by a deactivation/release DCI format. Such operation for DL SPS transmissions is similar to CG PUSCH Type 2 transmissions.

A operation for DL SPS transmissions similar to UL CG Type-1 for DL traffic (which pertains purely semi-statically (i.e., RRC) configuration, activation, and release/deactivation of resource allocation and transmission parameters, except possibly for some implicit parameter determinations) can be considered and referred to as DL SPS Type-1; therefore, the abovementioned DL SPS configuration (which follows a combination of RRC and DCI signalling) can be considered as a DL SPS Type-2 configuration.

For example, RRC signalling can configure the following parameters for DL SPS Type-2: periodicity, number of HARQ processes, PUCCH resource index for HARQ feedback, and MCS. In another example, RRC can configure the following parameters: periodicity, number of HARQ processes, Timer (e.g., for release of DL SPS Type-2 resources in case of inactivity), MCS table, open and closed loop power control parameters, number of repetitions, RV for repetitions. For an DL SPS Type-2 configuration, other transmission parameters are also RRC configured, such as: time/frequency allocation, frequency hopping parameters, MCS, MIMO related parameters such as antenna ports, SRI, PMI, DMRS initialization, and pathloss RS index, while such parameters are indicated by a DCI format for a CG PUSCH Type-2 or for DL SPS Type-2.

For a DL SPS Type-2 and CG PUSCH Type-2 transmission, repetition(s) can be on a slot basis or on a shorter time scale, such as over a number of symbols, and the number of repetitions can be indicated by the activation DCI format (for DL SPS Type-1) or configured by higher layers (for DL SPS Type-2).

HARQ related information for SPS PDSCH/CG PUSCH can be implicitly determined. For example, a HARQ process number for SPS PDSCH/CG PUSCH can be determined based on the timing (e.g., starting symbol/slot) of the SPS PDSCH/CG PUSCH transmission occasion using a predetermined formula in the system specifications, and also possibly based on a configured offset value.

For example, for SPS PDSCH, the HARQ process identifier (ID) associated with the slot where the DL transmission starts is derived as:

HARQ Process ID=[floor(CURRENT_slot×10/(numberOfSlotsPerFrame×periodicity))] modulo nrofHARQ-Processes, where CURRENT_slot=[(SFN×numberOfSlotsPerFrame)+slot number in the frame] and numberOfSlotsPerFrame refers to the number of consecutive slots per frame where SFN is a system frame number.

In another example, for configured uplink grants (i.e., UL CG PUSCH), the HARQ process ID associated with the first symbol of a UL transmission is derived from the following equation:

HARQ Process ID=[floor(CURRENT_symbol/periodicity)] modulo nrofHARQ-Processes, where CURRENT_symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot refer to the number of consecutive slots per frame and the number of consecutive symbols per slot.

In one example, for determining NDI, only initial transmissions may be allowed/supported on SPS PDSCH/CG PUSCH transmissions and any retransmission can be scheduled using a DCI format. Then, there is no need for an NDI field. In another example, a redundancy version for a SPS PDSCH/CG PUSCH transmission can be fixed to RV=0, while for the case of repetitions, an RV for each repetition can be based on a sequential/cyclic selection of RV from a configured set of RVs, e.g., {0, 0, 0, 0} or {0, 3, 0, 3} or {0, 2, 3, 1}.

In yet another example, for certain applications such as for operation with shared spectrum, HARQ related parameters for a CG PUSCH transmission such as a HPN and a RV can be decided by the UE and then multiplexed as configured grant UCI (CG-UCI) with the data information in a CG-PUSCH transmission. In addition, a HARQ retransmission of an initial CG PUSCH transmission using UL CG resources can be allowed by including an NDI field in the CG-UCI.

A UE can be provided by higher layers (RRC signalling) a PUCCH resource index to transmit a PUCCH with HARQ-ACK information in response to a SPS PDSCH reception. In one example, a PUCCH resource can be indicated/updated by a DCI format activating the SPS PDSCH reception. The DCI format can also indicate a PDSCH-to-HARQ feedback timing A TPC command for CG PUSCH or for PUCCH with HARQ-ACK information for SPS PDSCH reception can be provided by respective DCI formats that a UE receives corresponding PDCCHs according to a CSS and provide TPC commands for the UE.

A HARQ-ACK feedback for CG-PUSCH transmissions may or may not be supported. In one example, the HARQ-ACK feedback for CG PUSCH transmissions from a UE is not supported, and the UE monitors the PDCCH in a predetermined/configured time window after a CG PUSCH transmission for detection of a DCI format scheduling a HARQ retransmission for a CG PUSCH If the UE does not detect any DCI format by the end of the time window, the UE assumes that the gNB correctly decoded the transport block in the CG PUSCH transmission.

The UE cannot distinguish the case that the gNB failed to detect the presence of the CG PUSCH transmission from the case that the gNB correctly decoded the transport block in the CG PUSCH transmission. In another example, the HARQ-ACK feedback for CG PUSCH transmission is supported and the UE expects to receive a downlink feedback indication (DFI) format in a predetermined or configured time window after the CG PUSCH transmission. The DFI provides a HARQ-ACK information and may also provide other parameters such as a RV, a number of repetitions, and so on.

If the UE does not detect the DFI by the end of the window after the CG PUSCH transmission, the UE may assume that the gNB either failed to detect the presence of the CG PUSCH transmission or that the gNB failed to transmit the DFI, for example due to listen-before-talk (LBT) failure in operation with shared spectrum.

When receiving PDSCH scheduled by DCI format 1_1 or 1_2 in PDCCH with CRC scrambled by C-RNTI, MCS-C-RNTI, CS-RNTI, or PDSCH scheduled without corresponding PDCCH transmission using sps-Config and activated by DCI format 1_1 or 1_2, if the UE is configured with pdsch-AggregationFactor, the same symbol allocation is applied across the pdsch-AggregationFactor consecutive slots. The UE may expect that the TB is repeated within each symbol allocation among each of the pdsch-Aggregation-Factor consecutive slots and the PDSCH is limited to a single transmission layer. The redundancy version to be applied on the $n^{th}$ transmission occasion of the TB, where n=0, 1, . . . pdsch-AggregationFactor−1, is determined according to table below and "$rv_{id}$ indicated by the DCI scheduling the PDSCH" in TABLE 1 below is assumed to be 0 for PDSCH scheduled without corresponding PDCCH transmission using sps-Config and activated by DCI format 1_1 or 1_2. Applied redundancy version when pdsch-AggregationFactor is present.

TABLE 1

| | Applied redundancy version when pdsch-AggregationFactor is present | | | |
|---|---|---|---|---|
| $rv_{id}$ indicated by | $rv_{id}$ to be applied to $n^{th}$ transmission occasion | | | |
| the DCI scheduling the PDSCH | n mod 4 = 0 | n mod 4 = 1 | n mod 4 = 2 | n mod 4 = 3 |
| 0 | 0 | 2 | 3 | 1 |
| 2 | 2 | 3 | 1 | 0 |
| 3 | 3 | 1 | 0 | 2 |
| 1 | 1 | 0 | 2 | 3 |

For PUSCH transmissions with a Type 1 or Type 2 configured grant, the number of (nominal) repetitions K to be applied to the transmitted transport block is provided by the indexed row in the time domain resource allocation table if numberofrepetitions is present in the table; otherwise, K is provided by the higher layer configured parameters repK.

For PUSCH transmissions of PUSCH repetition Type A with a Type 1 or Type 2 configured grant, the higher layer parameter repK-RV defines the redundancy version pattern to be applied to the repetitions. If the parameter repK-RV is not provided in the configuredGrantConfig, the redundancy version for uplink transmissions with a configured grant may be set to 0. Otherwise, for the nth transmission occasion among K repetitions, n=1, 2, . . . , K, it is associated with $(\mathrm{mod}(n-1,4)+1)^{th}$ value in the configured RV sequence. If a configured grant configuration is configured with Configuredgrantconfig−StartingfromRV0 set to "off," the initial transmission of a transport block may only start at the first transmission occasion of the K repetitions.

Otherwise, the initial transmission of a transport block may start at: the first transmission occasion of the K repetitions if the configured RV sequence is {0, 2, 3, 1}; any of the transmission occasions of the K repetitions that are associated with RV=0 if the configured RV sequence is {0, 3, 0, 3}; and/or any of the transmission occasions of the K repetitions if the configured RV sequence is {0, 0, 0, 0}, except the last transmission occasion when K≥8.

For any RV sequence, the repetitions may be terminated after transmitting K repetitions, or at the last transmission occasion among the K repetitions within the period P, or from the starting symbol of the repetition that overlaps with a PUSCH with the same HARQ process scheduled by DCI format 0_0, 0_1, or 0_2, whichever is reached first. The UE is not expected to be configured with the time duration for the transmission of K repetitions larger than the time duration derived by the periodicity P. If the UE determines that, for a transmission occasion, the number of symbols available for the PUSCH transmission in a slot is smaller than transmission duration L, the UE does not transmit the PUSCH in the transmission occasion.

For both Type 1 and Type 2 PUSCH transmissions with a configured grant, when K>1, the UE may repeat the TB across the K consecutive slots applying the same symbol allocation in each slot. A Type 1 or Type 2 PUSCH transmission with a configured grant in a slot is omitted according to semi-statically configured and/or dynamically indicated SFI for uplink and downlink symbols/slots.

For PUSCH transmissions of PUSCH repetition type B with a Type 1 or Type 2 configured grant, the higher layer configured parameters repK-RV defines the redundancy version pattern to be applied to the repetitions. If the parameter repK-RV is not provided in the configuredGrantConfig, the redundancy version for each actual repetition with a configured grant may be set to 0. Otherwise, for the nth transmission occasion among all the actual repetitions (including the actual repetitions that are omitted) of the K nominal repetitions, it is associated with $(mod(n-1,4)+1)^{th}$ value in the configured RV sequence. If a configured grant configuration is configured with ConfiguredgrantconfigStartingfromRV0 set to "off," the initial transmission of a transport block may only start at the first transmission occasion of the actual repetitions.

Otherwise, the initial transmission of a transport block may start at: the first transmission occasion of the actual repetitions if the configured RV sequence is {0, 2, 3, 1}; any of the transmission occasions of the actual repetitions that are associated with RV=0 if the configured RV sequence is {0, 3, 0, 3}; and/or any of the transmission occasions of the actual repetitions if the configured RV sequence is {0, 0, 0, 0}, except the actual repetitions within the last nominal repetition when K≥8.

For any RV sequence, the repetitions may be terminated after transmitting K nominal repetitions, or at the last transmission occasion among the K nominal repetitions within the period P, or from the starting symbol of a repetition that overlaps with a PUSCH with the same HARQ process scheduled by DCI format 0_0, 0_1 or 0_2, whichever is reached first. The UE is not expected to be configured with the time duration for the transmission of K nominal repetitions larger than the time duration derived by the periodicity P.

A configuration for SPS PDSCH/CG PUSCH can be cell-specific or BWP-specific, wherein a UE can be configured with one or multiple SPS PDSCH/CG PUSCH configuration(s) per cell group/cell/BWP. In case of multiple configurations, each configuration can be associated with an index to distinguish a single SPS PDSCH/CG PUSCH configuration or a "state" to indicate a subset (of size>=1) of SPS PDSCH/CG PUSCH configuration(s).

Throughout this disclosure, embodiments are described with respect to SPS PDSCH or CG-PUSCH for brevity, but they are also applicable to PDSCH receptions, PUSCH transmissions scheduled by respective DCI formats, and PUCCH/SRS transmissions.

Throughout this disclosure, embodiments are also applicable to scenarios with gNB(s) operating with multiple transmission and reception points (multiple TRPs), or scenarios with UEs having multiple antenna panels/RF chains.

Throughout this disclosure, a design principle is to achieve a dynamic UE behavior for CG PUSCH or SPS PDSCH transmissions in order to address time variations in the channel/beam as well as UE mobility while maintaining a design principle of CG PUSCH/SPS PDSCH to minimize use of physical layer signaling such as for reconfiguration or re-activation for CG/SPS of for scheduling re-transmissions using DCI formats. Accordingly, the gNB can provide the UE with guideline information regarding some transmission/reception parameters, such as a set of possible beams, or a valid set for numbers of repetitions, and enable the UE to determine transmission/reception parameters within the gNB guidelines, such as a beam from the set of possible beams, or a number of repetitions from the valid set of numbers of repetitions.

In one embodiment for enhanced beam management for UL CG, a set of beam indications (indications for spatial transmission filter) for a CG PUSCH transmission can be separate from a set of beam indications for a PUSCH transmission scheduled by a DCI format.

In one example, CG PUSCH (Type-1 or Type-2) transmissions and dynamic PUSCH transmissions can be separately configured with respective SRS resource sets. In another example, a same SRS resource set is used for both CG PUSCH transmissions and dynamic PUSCH transmissions and first and second subsets of SRS resources are used for CG PUSCH transmission and for dynamic PUSCH transmissions. The first and second subsets of SRS resources may have no common elements. The first and second subsets of SRS resources can be predetermined in the system specifications or configured by UE-common or UE-specific higher layer signalling, or can be determined based on a formula such as using a first half of the set of SRS resources for the first subset and a second half of the set of SRS resources for the second subset. In all examples, when a DCI format that activates a CG PUSCH Type-2 transmission includes a SRI field or when a configuration for a CG PUSCH Type-1 transmission includes a SRI, the UE interprets the SRI indication based on a corresponding SRS resource subset. In one example, a beam indication for a CG PUSCH Type-2 transmission also applies to a first CG PUSCH transmission that follows an activation DCI format.

In another example, for a non-codebook based PUSCH transmission, a CG PUSCH (Type-1 or Type-2) transmission and a dynamic PUSCH transmission can be separately configured with an associated CSI-RS resource or a subset of associated CSI-RS resources.

In yet another example, when beam indication for a PUSCH transmission is based on TCI states and/or DL reference signals and/or corresponding QCL assumptions (such as QCL Type-D), a CG PUSCH (Type-1 or Type-2) transmission and a dynamic PUSCH transmission can be separately configured with a TCI state and/or a DL reference signal and/or a corresponding QCL assumption (or a set of TCI states and/or DL RSs and/or QCL assumptions).

Throughout the present disclosure, the term "beam indication resource" can be defined based on a unified TCI framework for UL and DL beam indication, using a configuration of source/reference RS in the TCI state configuration/definition. A "beam indication resource" is defined as a DL/UL RS resource or a set/group of DL/UL resources that are used to indicate a spatial transmission/reception filter for a signal/channel transmission, or a (DL or UL) TCI state(s) or QCL assumption(s), or an UL TCI state for UL beam indication, or SRS resource(s) or SRS resource set(s), or associated CSI-RS resource(s) such as for non-codebook-based PUSCH. In one example, for aperiodic/semi-persistent beam indication resources, a spatial transmission/reception filter, also referred to as beam, for a UE can be updated/overwritten by a DCI format or a MAC-CE, and the UE can use the most recent updated beam at each time instance or transmission occasion.

In one embodiment for an enhanced timing for beam indication for UL CG, a beam indication resource configured for a CG PUSCH transmission (Type-1 and/or Type-2), such as an SRS resource set or an SRS resource, or an associated CSI-RS resource (or associated CSI-RS resource set), or a TCI state (or a set of TCI states), or (corresponding) QCL assumption(s), such as a QCL assumption Type-D, can include only periodic or semi-persistent resource(s) in time domain and is not expected to include aperiodic resource(s).

In one example, aperiodic resources(s) can be also included for beam indication of a CG PUSCH (Type-1 and/or Type-2) transmission, such as an SRS resource set, or an SRS resource, or an associated CSI-RS resource (or associated CSI-RS resource set), or a TCI state (or a set/subset of TCI states), or (corresponding) QCL assumption(s), such as a QCL assumption Type-D.

According to this enhancement, a beam indication for a CG PUSCH (Type-1 and/or Type-2) transmission in slot n is associated with the most recent transmission/reception of the beam indication (DL or UL) resource, wherein a beam indication resource can be one or more of the examples described above, and wherein the beam indication resource transmission is prior to the CG PUSCH transmission occasion, possibly additionally offset by a UE processing time.

In these embodiments, the time offset can be, for example, an application time for beam switching such as a threshold timeDurationForQCL based on a UE capability, or a default UE processing time for PUSCH such as $T_{proc,2}'$ or T_proc,2 [3GPP TS 38.213 and TS 38.214], or a UE processing time for UCI multiplexing, and so on, or a predetermined or configured time. When a MAC-CE command is used for activation of a CG PUSCH, a UE processing time offset can also include a MAC-CE application latency.

In another example, the beam indication resource transmission/reception is prior to the PDCCH with the DCI format providing the SRI, such as a PDCCH providing a DCI format activating a CG PUSCH Type-2 transmission. In yet another example, the beam indication resource transmission/reception is prior to the CG PUSCH activation, possibly additionally offset by a UE processing time such as one or more of the time offsets described above.

In one example, the indicated SRI value for a CG PUSCH transmission in slot n is associated with the latest transmission of SRS resource identified by the SRI, where the SRS resource transmission is prior to the CG PUSCH transmission occasion, possibly additionally offset by a UE processing time. The indicated SRI value can be by higher layer RRC signalling for Type-1 CG PUSCH or by an SRI field in a DCI format activating a CG PUSCH transmission for Type-2 CG PUSCH. A benefit of such an enhancement is that, if the beam/spatial transmission filter used for transmission of a periodic/semi-persistent SRS changes across different SRS transmission occasions, then the UL beam for CG PUSCH transmissions can be accordingly updated.

In another example, the indicated SRI value in slot n is associated with the most recent transmission of SRS resource identified by the SRI value, where the SRS resource (transmission) is prior to a PDCCH with the DCI format providing the SRI value, that is, a PDCCH with a DCI format activating a CG PUSCH transmission or a PDSCH providing a MAC-CE command activating a CG PUSCH transmission.

In yet another example, an indicated SRI value in slot n is associated with the latest transmission on SRS resource identified by the SRI value, where the SRS resource (transmission) is prior to the CG PUSCH activation, possibly additionally offset by a UE processing time, such as prior to an RRC activation of for a CG PUSCH Type-1 transmission.

For both codebook-based and non-codebook-based transmission, an indicated SRI for a PUSCH transmission occasion that is configured by higher layers (semi-statically configured to operate according to Subclause 6.1.2.3 of [TS 38.214]) in slot n is associated with the most recent transmission of SRS resource(s) identified by the SRI, where the SRS transmission is prior to the PUSCH transmission occasion.

A UE can have different application times for beam determination of different transmission occasions of a CG PUSCH or SPS PDSCH when the UE applies a beam direction of a DL RS associated with the CG PUSCH or SPS PDSCH. Currently, the UE determines the beam direction for a CG PUSCH transmission or SPS PDSCH reception immediately before a reception of a DCI format or RRC configuration that activates the CG PUSCH or SPS PDSCH, and uses the same beam direction for all future CG PUSCH/SPS PDSCH transmission occasions. The present embodiment enables a same configured or activated DL RS to be used for all future transmission occasions, same as current design, but for each CG PUSCH/SPS PDSCH transmission occasion the UE can use an updated beam direction based on a DL RS reception before each transmission occasion (instead of maintaining the same beam direction as used at the time of CG PUSCH/SPS PDSCH activation.

Figure 6A:
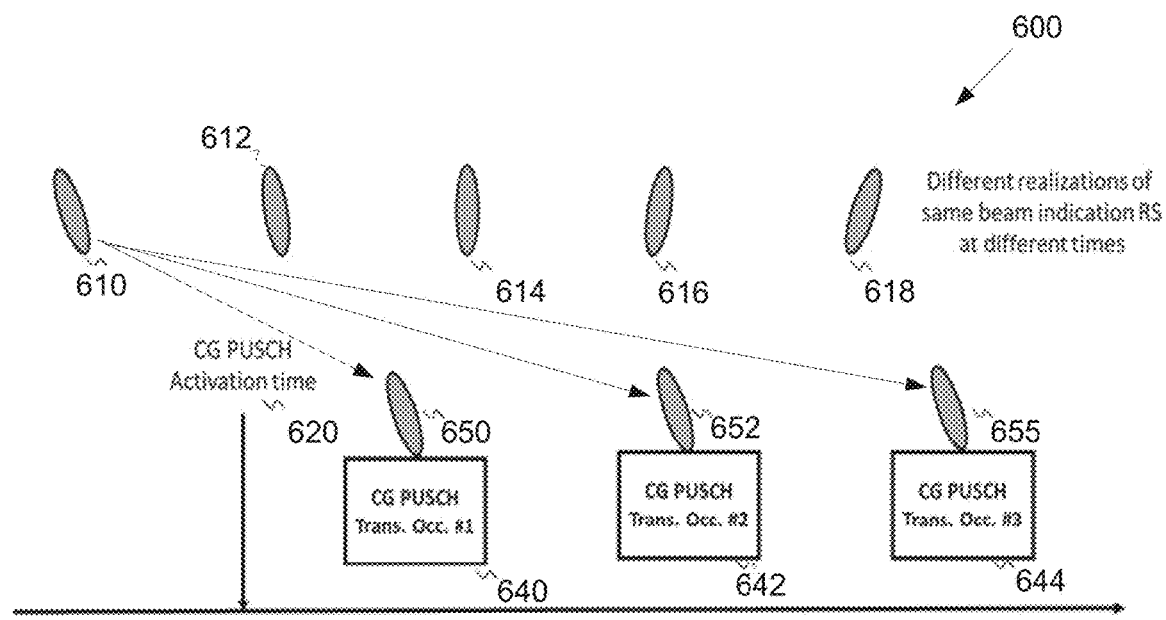
FIGS. 6A and 6B illustrate example beam management operations for UL CG PUSCH according to embodiments of the present disclosure.
Figure 6B:
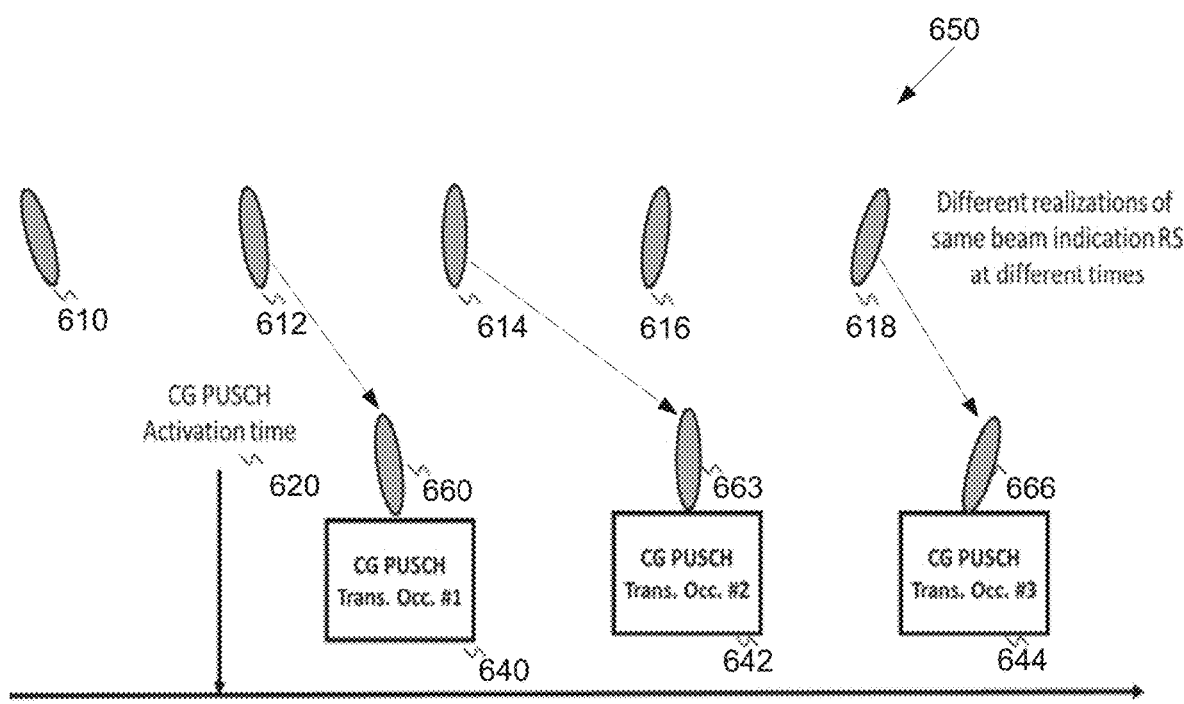

FIG. 6A illustrates examples beam management operation 600 for UL CG PUSCH according to embodiments of the present disclosure. An embodiment of the beam management operation 600 shown in FIG. 6A is for illustration only. FIG. 6B illustrates examples beam management operation 650 for UL CG PUSCH according to embodiments of the present disclosure. An embodiment of the beam management operation 650 shown in FIG. 6B is for illustration only.

Common between FIG. 6A and FIG. 6B are described first. Beam indication for a CG PUSCH transmission is provided by an example beam indication RS resource, such as SRI, TCI state, or QCL assumption, and example realizations in some time instances are shown in 610, 612, 614, 616, and 618. The UE receives at a certain time an indication for an activation of a CG PUSCH transmission 620. The indication can be provided by higher layer signalling or by a DCI format. A configuration for a CG PUSCH transmission includes periodic CG PUSCH transmission occasions 640, 642, 644. The UE transmits on each CG PUSCH transmission occasion using the provided beam indication.

FIG. 6A shows a case in which the UE transmits CG PUSCH with a beam following a realization of the beam indication RS resource that occurred right before the CG PUSCH activation time (as shown in 610) and uses the same realization for all transmission occasions, as shown in 650, 652, 655. In FIG. 6B, the UE transmits a CG PUSCH with a beam following a realization of the latest beam indication RS resource prior to the CG PUSCH activation time (as shown in 610) and uses the same realization for all transmission occasions 650, 652, 655. Conversely, in FIG. 6B, the UE transmits a CG PUSCH with a beam following a realization of the latest beam indication RS resource prior to the CG PUSCH transmission occasion and uses a beam realization 612 for CG PUSCH transmission occasion #1 660, a beam realization 614 for CG PUSCH transmission occasion #2 663, and a beam realization 618 for CG PUSCH transmission occasion #3 666.

In one example, when periodic or semi-persistent resource(s) are configured for beam indication for CG PUSCH Type-1 and/or Type-2 transmissions, a most recent transmission of the resource(s) refers to a most recent transmission occasion of the corresponding periodic or semi-persistent resource(s). In another example, when aperiodic resource(s) are configured for beam indication for CG PUSCH Type-1 and/or Type-2 transmissions, a most recent transmission of the resource(s) refers to a most recent transmission occasion of the corresponding resource(s) following a PDCCH reception providing a DCI format triggering a transmission on the resources, or a reception of a predetermined/configured DL RS, and so on.

In one example, when a spatial transmission/reception filter for a beam indication resource for CG PUSCH Type-1 and/or Type-2 transmissions is updated by a DCI format or a MAC-CE command, a most recent transmission of the beam indication resource(s) before a CG PUSCH transmission occasion or an activation time of a CG PUSCH transmission, possibly additionally offset by a UE processing time offset, refers to a transmission on the beam indication resource(s) using a corresponding latest spatial transmission/reception filter.

In one example, if DCI format 0_0, or DCI format 0_2 with zero bits for SRI field, is used to activate a CG PUSCH Type-2 transmission, the UE needs to use a default beam (spatial filter) for the PUSCH transmission, such as a beam used for PUCCH transmissions or PDCCH receptions in a predetermined or configured CORESET, while considering timing aspects for the default CG PUCCH beam similar to the above solutions for the case when the CG PUSCH beam follows an SRS beam or a beam corresponding to a DL RS or TCI state.

The spatial filter for a PUSCH transmission is associated with the most recent transmission or reception of reference RS(s) identified by the spatial relation, where the reference RS transmission or reception is prior to a PDCCH reception providing DCI format 0_0. The spatial relation at a later PUSCH transmission occasion, for a PUSCH transmission activated by a DCI format 0_0, is associated with the most recent transmission or reception of reference RS(s) identified by the spatial relation, where the reference RS transmission or reception is prior to the PUSCH transmission occasion.

Figure 7:
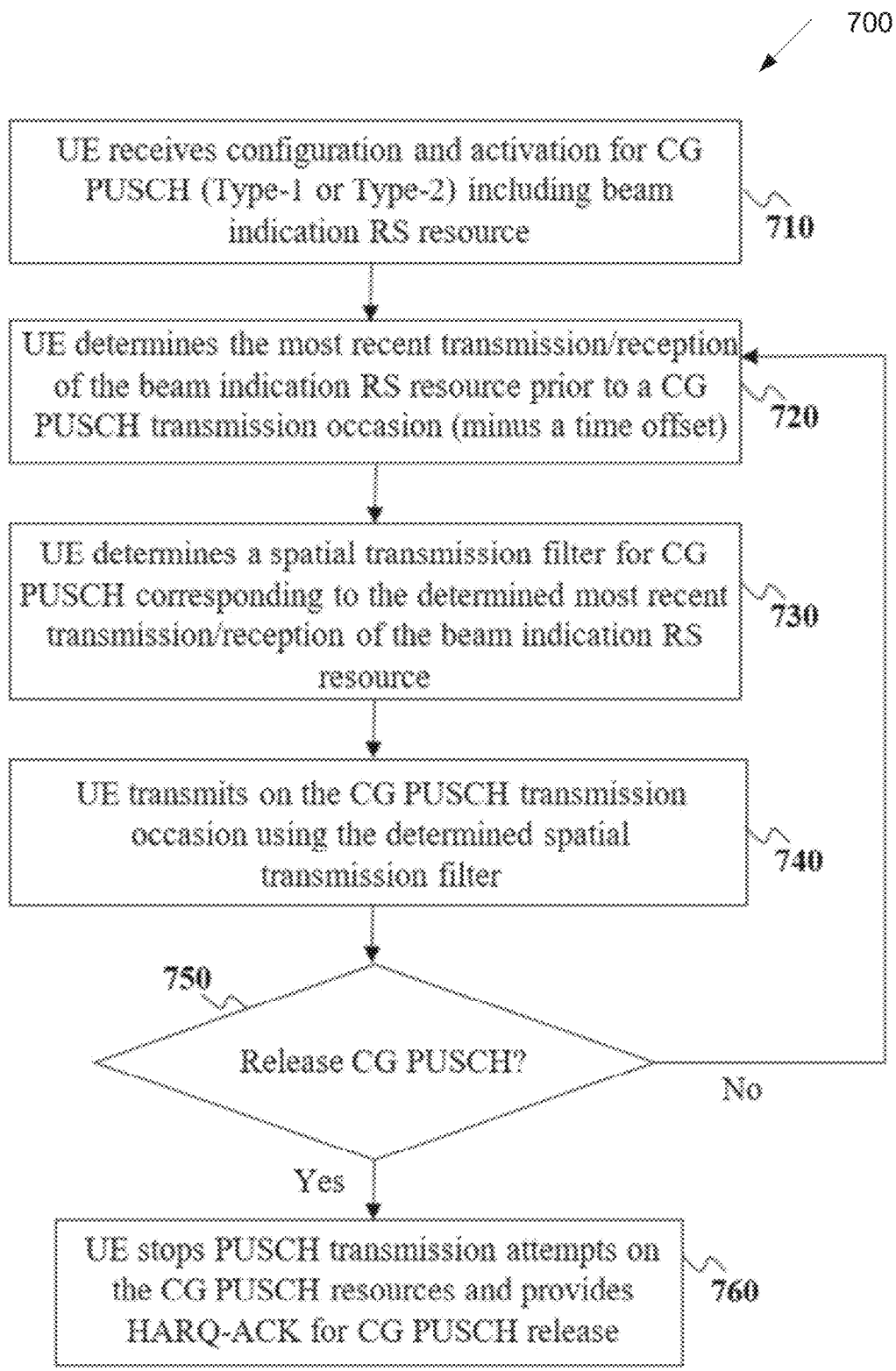
FIG. 7 illustrates a flowchart of a method for a beam determination with enhanced timing for a CG PUSCH transmission according to embodiments of the present disclosure.

FIG. 7 illustrates a flowchart of a method 700 for a beam determination with enhanced timing for a CG PUSCH transmission according to embodiments of the present disclosure. An embodiment of the method 700 shown in FIG. 7 is for illustration only. One or more of the components illustrated in FIG. 7 can be implemented in specialized circuitry configured to perform the noted functions or one or more of the components can be implemented by one or more processors executing instructions to perform the noted functions.

A UE receives a configuration and an activation for a CG PUSCH (Type-1 or Type-2) transmission. The configuration includes a beam indication RS resource, such as a SRI, or TCI state, or QCL assumption 710. Then, for each transmission occasion of the CG PUSCH, the UE determines the latest transmission/reception of the beam indication RS resource prior to the CG PUSCH transmission occasion (possibly additionally offset by a UE processing time) 720. Accordingly, the UE determines a spatial transmission filter for CG PUSCH corresponding to the determined latest transmission/reception of the beam indication RS resource 730. Finally, the UE transmits on the CG PUSCH transmission occasion using the determined spatial transmission filter 740. The UE determines whether the UE has received a release command for a CG PUSCH, such as by a DCI format, or a MAC-CE, or RRC signaling, 750. If the UE has not received a release command, the UE repeats the same behavior at a next CG PUSCH transmission occasion starting from 720. If the UE has received a CG PUSCH release command, the UE stops transmitting CG PUSCH. The UE also provides HARQ-ACK information for the CG PUSCH release 760.

In one embodiment for CG PUSCH with multiple beam indication resources, a CG PUSCH configuration (Type-1 or Type-2) can include multiple beam indication resources, such as one or multiple SRS resource set(s), or one or multiple SRS resource(s), or one or multiple associated CSI-RS resource(s) or associated CSI-RS resource set(s), or one or multiple TCI state(s) (or set(s) of TCI states), or one or multiple (corresponding) QCL assumption(s), such as a QCL assumption Type-D, wherein an actual beam/spatial transmission filter used for a CG PUSCH transmission occasion is based on a selection from the multiple beam indication resources.

In one example, a UE can increase a CG PUSCH reception reliability and coverage by communicating with multiple TRPs. For example, based on UE mobility and orientation, the UE can communicate with one TRP in some transmission occasions, communicate with another TRP in other transmission occasions. In addition, the UE may be operating with multiple antenna panels and can transmit with beams from different panels. To enable such operation, the CG PUSCH beam/SRS/UL-TCI corresponding to different TRPs and/or panels can be reconfigured. A set of beams/SRSs/UL-TCIs can be configured to the UE and the UE can select one of the beams as the beam for CG PUSCH transmission for a period of time such as one or a number of transmission occasions.

In one embodiment, for a UE selection method, the actual UL beam/spatial transmission filter is selected based on UE measurements on the configured group of beam indication resources such as, for example, the set of resources corresponding to SRIs/TCI states. A benefit is that the UE can autonomously change a spatial filter for a CG PUSCH transmission and typically improve a link quality. Herein, a measurement refers to a measurement of one or more of: layer 1/layer 3-reference signal received power (L1-/L3-RSRP), reference signal received quality (RSRQ), received signal strength indicator (RSSI), signal to noise ratio (SNR), signal to interference ratio (SINR), capacity, throughout, and so on.

The UE can report to a serving gNB an index for the selected beam indication resource/SRI/TCI state, for example, using a CG-UCI element multiplexed on the CG PUSCH or by selecting corresponding CG PUSCH transmission parameters, such as DMRS patterns/sequences/ports/cyclic shifts/scrambling/cover codes and so on, based on a predetermined, or configured by higher layers, mapping of such CG PUSCH transmission parameters to beam indexes.

In another example, a default beam indication resource, such as a default SRI/TCI state having the lowest/highest SRI/TCI state index or a configured default beam indication resource, can be used for a CG PUSCH transmission, when there is no transmission/reception/measurement of the beam indication resources over a time interval that is larger than a configured or predetermined value, so that old measurements are considered as inaccurate, or when the UE does not multiplex CG-UCI on the CG PUSCH.

In one embodiment, for a gNB selection method, the activation DCI or MAC-CE command for a UL CG Type-2 and/or a re-activation/modification DCI or MAC-CE command for a UL CG Type-1 or Type-2 indicates one of the multiple SRIs/TCIs as the actual beam/spatial transmission filter to be used for the UL CG PUSCH.

In one example, in case the gNB decides to change the beam for UL CG, a DCI is sent to the UE to release the UL CG, and then (later) a follow-up/next activation DCI is sent to the activate the UL CG with another beam indication resource/SRI/TCI from the set of multiple configured beam indication resources/SRIs/TCIs.

In another example, a DCI format or a MAC-CE command activating a CG PUSCH Type-2 transmission indicates one of the multiple SRIs/TCI states as an actual beam/spatial transmission filter for the CG PUSCH transmission. In one example, when the gNB changes the spatial filter for the CG PUSCH transmission, the gNB can provide a DCI format to the UE to release the CG PUSCH configuration and subsequently provide an activation DCI format to the UE to activate the CG PUSCH with another beam indication resource/SRI/TCI state from a set of configured beam indication resources/SRIs/TCI states. In another example, a DCI format or a MAC-CE command indicates an update in the beam indication resource/SRI/TCI state while the UE continues to use the CG PUSCH configuration without a prior release. In yet another example, for a CG PUSCH Type-1 configured with multiple beam indication resources, an initial beam indication resource such as an initial SRI/TCI state, that can correspond to a lowest/highest index SRI/TCI state or a configured initial beam indication resource, is used for a CG PUSCH transmission prior to receiving a DCI format or a MAC-CE command that indicates an update in the beam indication resource/SRI/TCI state. In a further example, the gNB can indicate a beam/spatial filter for a CG PUSCH transmission by indicating one of the multiple SRIs/TCI states as the beam/spatial transmission filter for the CG PUSCH transmission. The indication can be based on a preferred beam reported by the UE. A preferred beam can be derived based on multiple CSI reports from the UE for respective multiple configured beam indication resources that indicate a received beam quality, or on an indication by the UE of a preferred reception beam for example by a CG-UCI multiplexed on the CG PUSCH.

In one embodiment, for a combination of UE and gNB methods, a UE transmits on CG PUSCH resources using a spatial transmission filter/beam indicated by a gNB, for example via a default beam indication resource or a beam indication resource indicated by an activation DCI format or MAC-CE command. When, based on UE measurements, a quality of the gNB-indicated beam indication resource is lower than a predetermined/configured threshold, the UE can switch to another beam from the multiple configured beam indication resources, for example based on the UE measurements of alternative beam indication resource(s) and choosing the strongest beam. According to this method, if the UE switches from a gNB-indicated beam to a new beam, the UE can indicate the new beam to the gNB, for example using options provided in the first method above. In a related example, a UE configured with multiple beam indication resources can operate using a method as described in embodiments discussed below.

Figure 8:
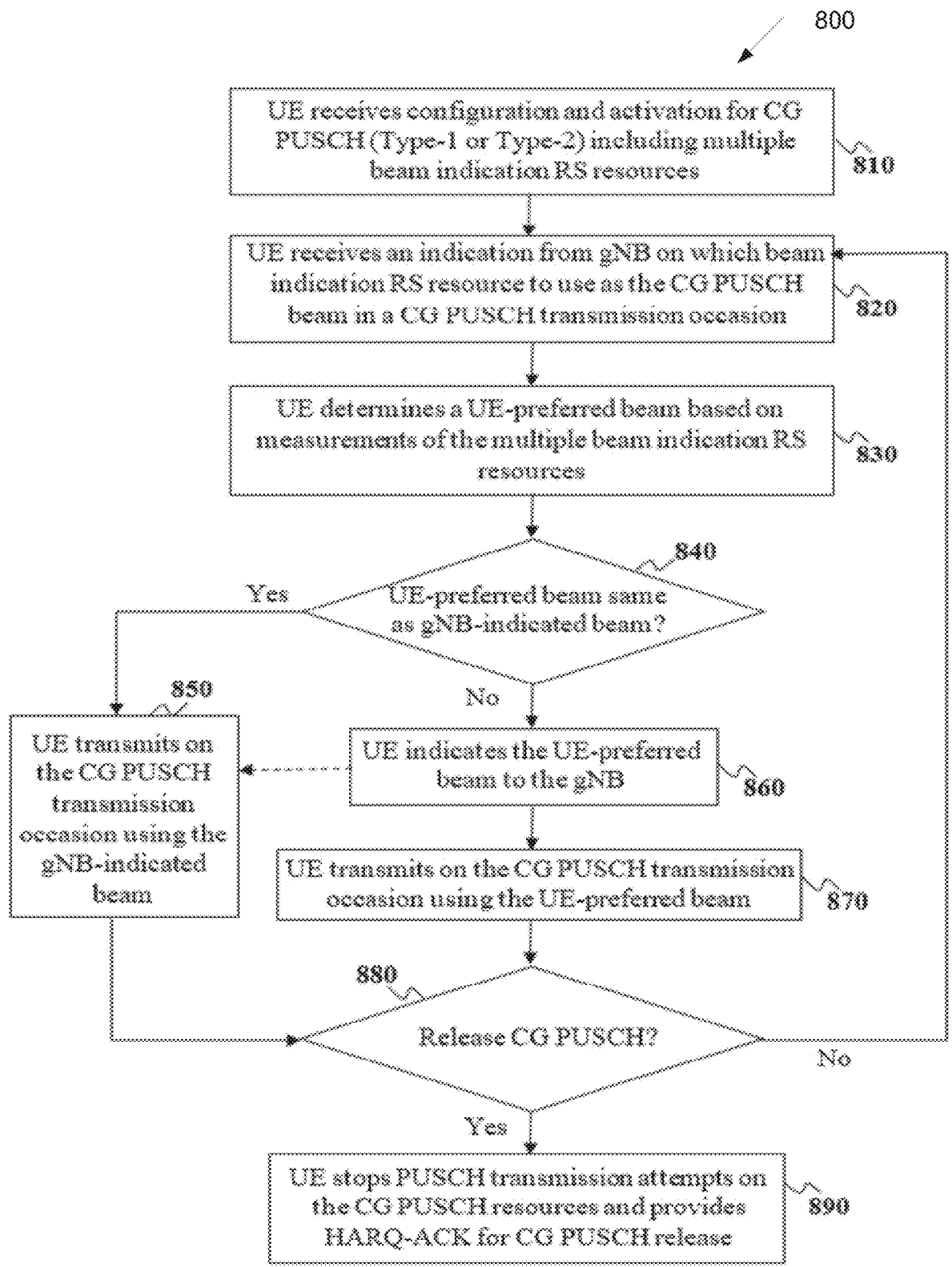
FIG. 8 illustrates a flowchart of a method for an enhanced beam determination using multiple beams for a CG PUSCH transmission according to embodiments of the present disclosure.

FIG. 8 illustrates a flowchart of a method 800 for an enhanced beam determination using multiple beams for a CG PUSCH transmission according to embodiments of the present disclosure. An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

The UE receives a configuration and an activation for a CG PUSCH (Type-1 or Type-2) transmission including multiple beam indication RS resources 810. Then, the UE receives an indication from a serving gNB for a beam indication RS resource, from the multiple beam indication RS resources, to use as the CG PUSCH beam/spatial filter in a CG PUSCH transmission occasion 820. The UE applies the beam indication RS resource to determine the spatial filter for the CG PUSCH transmission on every CG PUSCH transmission occasion until the UE receives a new by the serving gNB. Then, for each CG PUSCH transmission occasion, the UE determines a UE-preferred beam based on measurements of the multiple beam indication RS resources 830. The UE determines whether or not the UE-preferred beam is same as the beam indicated by the gNB 840. If the UE-preferred beam is same as the gNB-indicated beam, the UE transmits on the CG PUSCH transmission occasion using the gNB-indicated beam 850. If the UE-preferred beam is different from the gNB-indicated beam, the UE indicates to the gNB the UE-preferred beam 860. In a first option, the UE transmits on the CG PUSCH transmission occasion using the gNB-indicated beam 850. In a second option, the UE transmits on the CG PUSCH transmission occasion using the UE-preferred beam 870. The UE determined whether the UE has received a release command from the gNB for CG PUSCH 880. If the UE has not received a release command, the UE repeats the same behavior at a next CG PUSCH transmission occasion starting from 820. If the UE has received a CG PUSCH release command, the UE stops CG PUSCH transmission attempts on the CG PUSCH resources 890. In one example, HARQ-ACK is provided even when the UE does not receive the release based on DAIs of previous and future DCIs that the UE detects.

Similar enhancements for beam management and beam indication as for a CG PUSCH transmission can apply for a PUCCH transmission from a UE. For example, the UE can be provided multiple beam indication resources for a PUCCH resource. In a first option, a beam/spatial filter for the PUCCH transmission can be indicated by the gNB, for example using a MAC-CE or a DCI format. In a second option, the UE can determine the spatial filter for the PUCCH transmission, for example based on UE measurements for different PUCCH beam indication resources that can be provided by higher layer parameter PUCCH-Spatial-Relation-Info, and the UE can then transmit the PUCCH with the selected PUCCH beam. In a third option, the UE uses a spatial filter for a PUCCH transmission that is indicated by the gNB, through a DCI format or a MAC-CE command, unless the link quality the UE measures for a corresponding beam indication RS resource is below a configured or predetermined threshold, and then the UE can select a spatial filter for the PUCCH transmission among the configured beam indication resources.

In one example, regardless of which method to follow for an UL CG configured with multiple beam indication resources (e.g., first or second or third method described above), if a UE is operating with multiple UE antenna panels/RF chains/port groups/transmission entity, and so on, for an overlapping/simultaneous multi-panel transmission, then the UE may be configured, for each UL CG configuration Type-1 and/or Type-2, with multiple beams/beam indication resources associated with each UE panel/transmission entity. For example, one or multiple beam groups or beam indication resource groups can be configured, each beam group corresponds to beams for a single UE panel/transmission entity, and/or corresponds to beams for a combination of multiple UE panels/transmission entities, and/or a combination thereof. In such a case, the operation for selecting the actual beam for UL CG transmission (e.g., one or more of first and second and third method described above) on each UE panel/transmission entity is performed either individually and/or separately per UE panel/transmission entity, or is performed jointly across all UE panels/transmission entities.

In one example, if a UE is capable of simultaneously transmitting from multiple antenna panels or groups of antenna ports, the above methods are applicable per antenna panel or group of antenna ports. Alternatively, the UE can determine a single spatial filter for a CG PUSCH transmission jointly across all UE panels.

In one embodiment for enhanced beam management and indication for DL SPS, enhanced beam management and indication methods, for example as in embodiments E-1, E-1-1, E-1-2 for a CG PUSCH transmission, can also apply to a SPS PDSCH transmission. Some examples are provided below, while more examples can be constructed based on the analogy between SPS PDSCH and CG PUSCH. Herein, a SPS PDSCH can be a legacy SPS PDSCH, also referred to as SPS PDSCH Type-2, having an activation DCI format provide an indication for reception parameters, or a new type of SPS PDSCH, referred to as SPS PDSCH Type-1 as described earlier in this disclosure, having higher layer (RRC) signalling provide an indication for corresponding reception parameters.

In one example, a set of beam indication resources for SPS PDSCH can be separate from a set of beam indication resources for a PDSCH scheduled by a DCI format. In a related example, a beam indication resource for SPS PDSCH can be a TCI state or a (corresponding) QCL assumption, such as a QCL assumption Type-D, or a DL RS such as an SSB or a CSI-RS resource or a PRS resource, or an UL RS such as an SRS that is provided by RRC configuration or by an activation DCI format, or a MAC-CE command.

In one embodiment for enhanced timing for beam indication for DL SPS, a beam indication resource configured for a SPS PDSCH (Type-1 or Type-2) can include only periodic or semi-persistent resource(s) in time domain according to a first option and can additionally include aperiodic beam indication resources(s) according to a second option. A beam indication for a SPS PDSCH (Type-1 or Type-2) reception in slot n is associated with the most recent transmission/reception of the beam indication (DL or UL) resource. In a first option, the beam indication resource transmission/reception is prior to a SPS PDSCH reception occasion, possibly additionally offset by a UE processing time. In a second option, the beam indication resource transmission/reception is prior to a reception time for the PDCCH/PDSCH providing the beam indication, such as an activation DCI format or a MAC-CE command. In a second option, the beam indication resource transmission/reception is prior to the CG PUSCH activation, possibly additionally offset by a UE processing time. A UE processing time offset can be, for example, an application time for beam switching such as a threshold timeDurationForQCL based on a UE capability, or a default UE processing time for PUSCH, $T_{proc,2}'$ [3GPP TS 38.213 and TS 38.214], and so on, or a predetermined/configured time. Furthermore, in the case of using a MAC-CE command for beam indication, there can be a (higher-layer) UE processing latency and application time before the MAC-CE command is applied.

In one example, when periodic or semi-persistent resource(s) are used for beam indication for SPS PDSCH Type-1 and/or Type-2, a most recent transmission of the resource(s) refer to a most recent transmission occasion of the corresponding periodic or semi-persistent resource(s). In another example, when aperiodic resource(s) are configured for beam indication for SPS PDSCH Type-1 and/or Type-2, a most recent transmission/reception of the resource(s) refers to a most recent transmission/reception occasion of the corresponding resource(s) following a dynamic trigger of the resource(s) such as by a DCI format, or a reception of a predetermined/configured DL RS, and so on.

In one example, when a spatial transmission/reception filter for a beam indication resource (e.g., semi-persistent or aperiodic resource(s)) for DL SPS Type-1 and/or Type-2 is (semi-) dynamically updated/overwritten based on a DCI or MAC-CE command, a most recent transmission/reception of the beam indication resource(s) before a certain cut-off time, such as a DL SPS reception occasion and/or a DL SPS activation time, possibly minus a UE processing time offset, refers to a transmission/reception of the beam indication resource(s) using the corresponding most recently updated/overwritten spatial transmission/reception filter before the cut-off time, wherein any applicable UE processing time offset can be possibly also considered, e.g., as described in the examples above.

Figure 9:
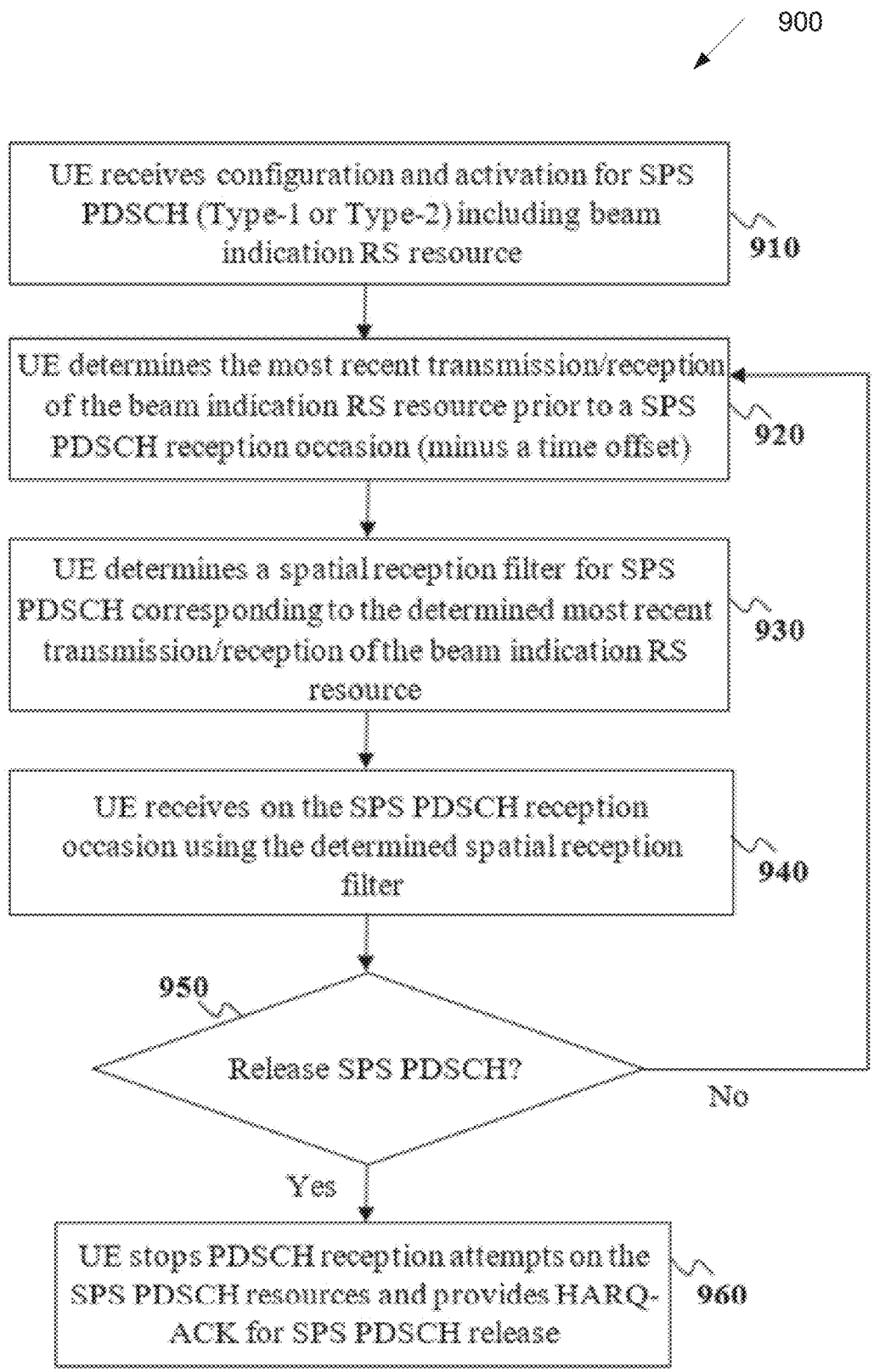
FIG. 9 illustrates a flowchart of a method for a beam determination with enhanced timing for SPS PDSCH according to embodiments of the present disclosure.

FIG. 9 illustrates a flowchart of a method 900 for a beam determination with enhanced timing for SPS PDSCH according to embodiments of the present disclosure. An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

A UE receives configuration and activation for SPS PDSCH (Type-1 or Type-2) including a configuration and/or indication for a beam indication RS resource (such as SRI, TCI, QCL assumption) 910. Then, for each reception occasion of the SPS PDSCH, the UE determines the most recent transmission/reception of the beam indication RS resource prior to the SPS PDSCH reception occasion (possibly additionally offset by a UE processing time) 920. Accordingly, the UE determines a spatial reception filter for SPS PDSCH corresponding to the determined most recent transmission/reception of the beam indication RS resource 930. Finally, the UE receives on the SPS PDSCH reception occasion using the determined spatial reception filter 940. The UE determines whether the UE received a release command for SPS PDSCH 950. If the UE has not received a release command, the UE repeats the procedure starting from 920 for a next SPS PDSCH reception occasion. If the UE has received a SPS PDSCH release command, the UE stops SPS PDSCH reception attempts on the SPS PDSCH resources and provides HARQ-ACK for SPS PDSCH release 960.

In one embodiment for DL SPS PDSCH with multiple beam indication resources, a SPS PDSCH configuration (Type-1 or Type-2) can include multiple beam indication resources, wherein a beam/spatial reception filter used for a SPS PDSCH reception occasion is based on a selection from the multiple beam indication resources. In one example, an activation DCI format or MAC-CE command for a SPS PDSCH Type-1 or Type-2 indicates one of the multiple beam indication resources as the beam/spatial reception filter for a SPS PDSCH reception.

In another example, for a SPS Type-1 configured with multiple beam indication resources, an initial beam indication resource such as an initial TCI state or QCL assumption, such as the one with a lowest/highest index TCI state or a configured initial beam indication resource, is used for SPS PDSCH reception after an RRC-based activation of the SPS PDSCH Type-1 configuration, and before the UE receives a first DCI format or MAC-CE command that indicates an update in the beam indication resource/TCI state/QCL assumption.

In a further example, a serving gNB can indicate a selection of a beam for SPS PDSCH via explicit or implicit indication of the SPS PDSCH beam, such as via multiplexing the selected beam as a control information element with data information in the SPS PDSCH, via a configured or predetermined link of the SPS PDSCH beam to other SPS PDSCH reception parameters, such as DMRS patterns/ sequences/ports/cyclic shifts/scrambling/cover codes and so on. A link of the multiple SPS PDSCH beam indication resource(s) and the multiple DMRS features can be predetermined in the system specifications or can be based on a predetermined rule/formula such as mapping a first configured DMRS feature to a first beam indication resource, a second configured DMRS feature to a second beam indication resource, and so on, and/or can be configured by RRC.

In yet another example, the UE can provide the gNB with its preferred reception beam for SPS PDSCH, for example based on UE measurements of the multiple configured beam indication resources, wherein the UE indication of the preferred beam can be either implicit, such as by providing a CSI report for the multiple configured beam indication resources that indicate the received beam quality at the UE, or explicit, such as by providing an indication of the preferred reception beam, for example by multiplexing the indication in a PUCCH transmission together with HARQ-ACK information or a CSI report.

In a further example, the UE receives a SPS PDSCH using a spatial reception filter/beam as indicated by a gNB-indicated beam indication resource, such as by an activation DCI format or a MAC-CE command. The UE can provide the gNB with a preferred reception beam when a link quality for the beam indicated by the gNB is below a configured threshold based on a measurement such as one or more of: L1-/L3-RSRP, RSRQ, RSSI, SNR, SINR, capacity, throughout, and so on. In a related example, a UE configured with multiple beam indication resources can operate using a beam-failure-recovery method as described embodiments discussed below.

Figure 10:
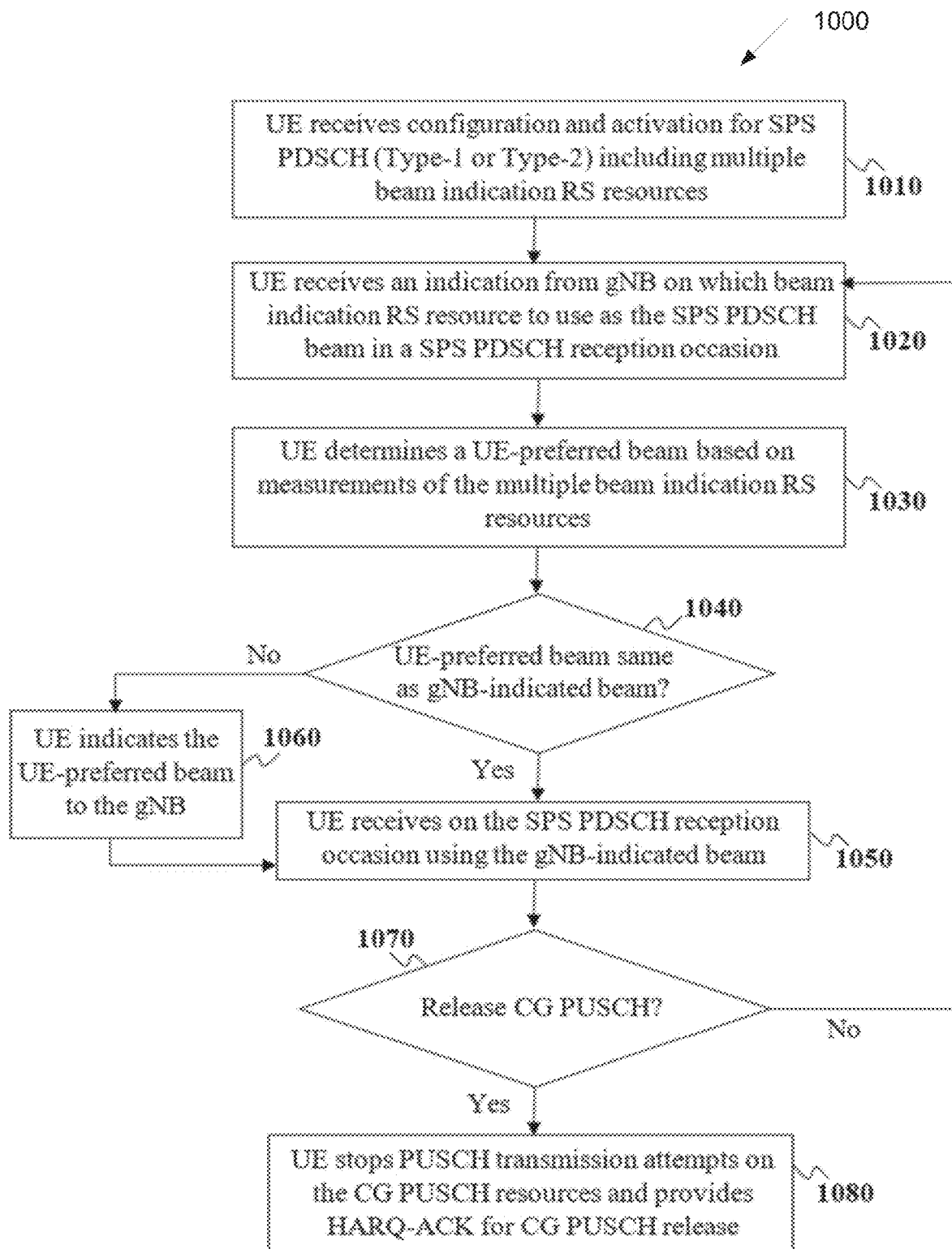
FIG. 10 illustrates a flowchart of a method for an enhanced beam determination using multiple beams for SPS PDSCH according to embodiments of the present disclosure.

FIG. 10 illustrates a flowchart of a method 1000 for an enhanced beam determination using multiple beams for SPS PDSCH according to embodiments of the present disclosure. An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

The UE receives configuration and activation from a serving gNB for a SPS PDSCH (Type-1 or Type-2) including multiple beam indication RS resources 1010. Then, the UE receives an indication from the gNB for a beam indication RS resource, from the multiple beam indication resources, to use as the SPS PDSCH beam in a SPS PDSCH reception occasion 1020. The UE can use a beam indication RS resource for more than one SPS PDSCH reception occasions until the UE receives a new beam indication RS resource by the gNB.

Then, for each SPS PDSCH reception occasion, the UE determines a UE-preferred beam based on measurements of the multiple beam indication RS resources 1030. The UE determines whether a UE-preferred beam is a same as the gNB-indicated beam 1040. If the UE-preferred beam is a same as the gNB-indicated beam, the UE receives on the SPS PDSCH reception occasion using the gNB-indicated beam 1050. If the UE-preferred beam is different from the gNB-indicated beam, the UE indicates to the gNB the UE-preferred beam 1060, and the UE receives on the SPS PDSCH reception occasion using the gNB-indicated beam 1050. The UE determines whether the UE has received a release command for SPS PDSCH 1070. If the UE has not received a release command, the UE repeats the same behavior starting from 1020 at the next SPS reception occasion. If the UE has received a SPS PDSCH release command, the UE stops PDSCH reception attempts on the SPS PDSCH resources and provides HARQ-ACK for SPS PDSCH release 1080.

In one example, similar enhancements for beam management and beam indication as for SPS PDSCH reception can apply to PUCCH transmissions. For example, a selection of a beam/spatial filter for PUCCH transmission can be indicated by a serving gNB via a MAC-CE or a DCI format. For example, a selection of a PUCCH transmission beam/spatial filter can be determined by the UE, for example based on UE measurement of different PUCCH beam indication resources, as configured by higher layers. For example, a PUCCH beam/spatial filter selection can be indicated in a DCI format triggering the PUCCH transmission or by a MAC-CE command from the gNB as baseline, unless the quality of the gNB-indicated beam/spatial filter is below a threshold and then the UE can select a PUCCH beam based measurements of the PUCCH beam indication resources.

In one example, if a UE is capable of simultaneously receiving from multiple antenna panels or groups of antenna ports, the above methods are applicable per antenna panel or group of antenna ports. Alternatively, the UE can determine a single spatial filter for a SPS PDSCH transmission jointly across all UE panels.

In one embodiment for a UE configured for CG PUSCH/SPS PDSCH transmission/reception with a current spatial transmission/reception spatial filter (beam) that the UE determines to have a link quality that is smaller than a predetermined or configured threshold, the UE can replace the current spatial filter with a new spatial filter, when any, that the UE determines as having a link quality that is larger than or equal to the threshold. A benefit is for the UE to be able to continue using the CG PUSCH/SPS PDSCH resources even after a failure of a current spatial filter. According to solutions provided below, the benefit can be achieved with reduced overhead, such as without associated gNB signalling.

According to this embodiment, when a UE is provided a CG PUSCH/SPS PDSCH configuration that includes one or multiple beam indication resources, and (a) a subset of beam indication resource(s) are determined to have radio link quality smaller than a predetermined/configured threshold, or (b) a subset beam indication resource(s) have same QCL properties, such as QCL Type-D, or have same RS index with DL RSs or UL RSs that the UE monitors for a link failure recovery procedure and are determined to have radio link quality smaller than a predetermined/configured threshold, the UE does not expect to use the subset of beam indication resource(s) for CG PUSCH transmission/SPS PDSCH reception. In one option the UE uses other remaining beam indication resources, if any. In another option, the UE determines a new beam indication resource based on a link failure recovery procedure or based on a new link failure procedure for CG PUSCH/SPS PDSCH. In a related example, a new beam indication resource is a new candidate beam from the multiple beam indication resources with radio link quality that is smaller than or equal to the predetermined/configured threshold. In one example, separate Q_in/Q_out thresholds or separate CSI-RS for measurements can be configured, compared to the legacy BFR operation.

In the present disclosure, a beam indication resource for CG PUSCH/SPS PDSCH can be one or more of the following: SRS resource set(s), SRS resource(s), (associated) CSI-RS resource(s) or (associated) CSI-RS resource set(s), TCI state(s) or set(s) of TCI states, (corresponding) QCL assumption(s), such as a QCL assumption Type-D, DL RS such as SSB resource(s) or CSI-RS resource(s) or PRS resource(s). A spatial transmission/reception filter for a beam indication resource can be provided by RRC signalling and can be updated by an activation DCI format or a MAC-CE command. Additionally, herein, a measurement refers to a measurement of one or more of: L1-/L3-RSRP, RSRQ, RSSI, SNR, SINR, capacity, throughout, and so on.

In another example, a UE expects an =activation DCI or a MAC-CE command to indicate new beams when the UE determines that some beam indication resource(s) for CG PUSCH/SPS PDSCH is detected to have failed (or, to be failing or have link quality that is smaller than a predetermined/configured threshold or when some beam indication resource(s) have same QCL properties, such as QCL Type-D, or have same RS index with DL RSs or UL RSs that the UE monitors for a link failure recovery procedure.

In another example, a UE does not expect to transmit CG PUSCH/receive SPS PDSCH using a subset of beams with a link quality that is smaller than a predetermined threshold until the UE receives an activation DCI format or a MAC-CE command, or completes a link failure recovery (procedure that replaces the subset of beams with new beams having link quality that is larger than or equal to the predetermined/configured threshold. In one example, a UE is not expected to transmit CG PUSCH/receive SPS PDSCH using beam indication resource(s) that the UE determines to have link quality that is smaller than the predetermined/configured threshold or have same QCL properties, such as QCL Type-D, or same RS index with DL RS(s) or UL RS(s) that the UE monitors for a link failure recovery procedure and the UE determines to have link quality that is smaller than the predetermined/configured threshold. In yet another example, the UE is expected to stop transmitting CG PUSCH/receiving SPS PDSCH using beams with link quality that is smaller than the predetermined/configured threshold after a predetermined/configured [N] number of symbols, such as N=0 or N=14 or N=28, after a time when the UE determines the beams to have link quality that is smaller than the predetermined/configured threshold, wherein the SCS configuration for the [N] symbols is the smallest of the SCS configurations of the active DL BWP for a PDCCH reception within/following a link recovery procedure and of the active DL BWP(s) of serving cell(s).

Figure 11:
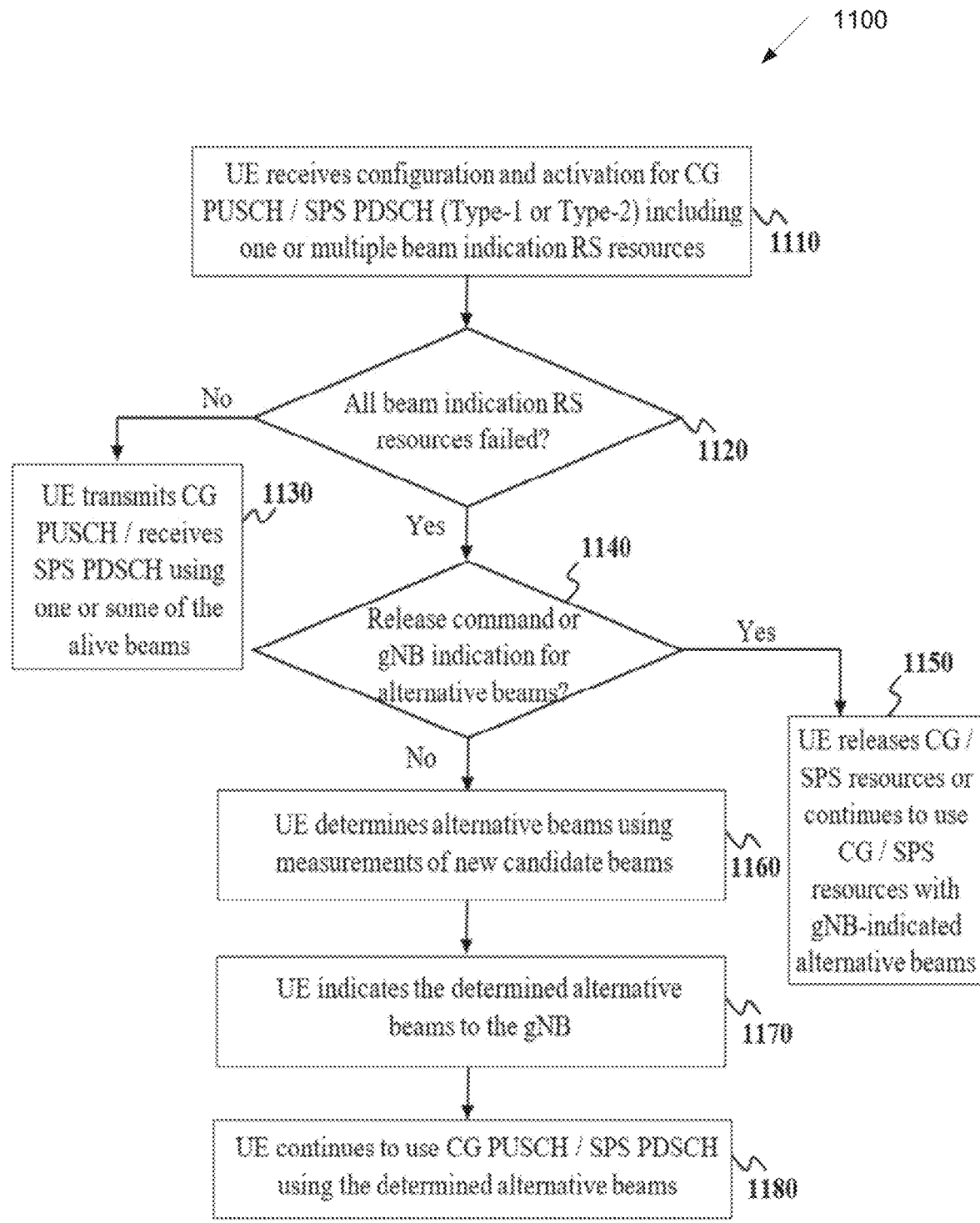
FIG. 11 illustrates a flowchart of a method for a beam failure recovery like procedure for CG PUSCH/SPS PDSCH according to embodiments of the present disclosure.

FIG. 11 illustrates a flowchart of a method 1100 for a beam failure recovery like procedure for CG PUSCH/SPS PDSCH according to embodiments of the present disclosure. An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

The UE receives configuration and activation for a CG PUSCH or an SPS PDSCH (Type-1 or Type-2) including one or multiple beam indication RS resources, 1110. Then, the UE checks whether all beam indication RS resource(s) are failed (according to a predetermined metric, e.g., L1-RSRP), 1120. If no, the UE continues to use the CG PUSCH/SPS PDSCH resources using one or some of the alive beams (e.g., as per gNB indication and/or UE selection), 1130. But, if all beam indication RS resource(s) are failed, then the UE checks whether a release command for CG PUSCH/SPS PDSCH is received (possibly after a certain time offset) or whether a gNB-indication is received regarding alternative beams, 1140.

If yes, the UE releases the CG PUSCH/SPS PDSCH resource, or the UE continues to use CG PUSCH/SPS PDSCH resources with gNB-indicated alternative beams, respectively, 1150. But, if the UE has received neither a release command for CG PUSCH/SPS PDSCH nor a gNB-indication regarding alternative beams, then the UE determines alternative beams using measurements of new candidate beams, 1160. Next, the UE indicates the determined alternative beams to the gNB, 1170. And finally, the UE continues to use CG PUSCH/SPS PDSCH using the determined alternative beams, 1180. (Note that, operations 1170 and 1180 can be performed in a single step/action).

In one example, when all beam indication resource(s) for an UL CG/DL SPS configuration for a UE are failed (or failing) and/or QCL'ed (e.g., QCL Type-D) with and/or have same RS index with DL or UL RS(s) that are monitored for a link failure recovery (a.k.a., BFR) procedure and are detected to have failed (or to be failing), then the UE is expected to (autonomously) release the UL CG/DL SPS configuration, even without receiving a DCI or MAC-CE command indicating UL CG/DL SPS release (or if the UE does not receive a DCI or MAC-CE command indicating UL CG/DL SPS release after [N'] symbols or time units from the aforementioned beam failure detection, where N'≥0), possibly unless the UE receives a re-activation/modification DCI or MAC-CE command indicating new alternative beams after [N"] symbols or time units from the aforementioned beam failure detection, where N"≥0 and N"≤N'). In a related example, the UE provides an indication to the gNB when the UE (autonomously) releases the UL CG/DL SPS configuration due to failure of all configured beam indication resources.

In one example, at least some of the above procedures apply at least when beam indication resources for UL/DL SPS are periodic in time.

In one example, when a "failed" CG PUSCH beam is not among the beams that the UE is configured to measure for BFR detection, but is QCL with a beam monitored for BFR detection that is already failed, for example when a CG PUSCH beam is narrow and a BFR detection beam is wide and covers the CG PUSCH beam, then the UE replaces any beam including any CG PUSCH beam that is QCL with a failed BFR beam with the new candidate BFR beam q_0 until the gNB provides an indication for new beams, including beams for CG PUSCH.

In one example, when a "failed" CG PUSCH beam is not among the beams monitored for BFR detection, but is QCL with a beam monitored for BFR detection that is not failed, for example when a CG PUSCH beam is narrow and failed but the BFR detection beam is wide and has not failed, or if the "failed" CG PUSCH beam is not QCL with any beams monitored for BFR detection, then the UE does not transmit CG PUSCH on the failed beam until gNB provides an indication of new beams for CG PUSCH. The UE can also be allowed, for example by configuration from the gNB, to autonomously release the CG PUSCH if the gNB does not provide new beams for CG PUSCH within a configured time window or the UE can be allowed to initiate a BFR procedure for the CG PUSCH beams.

In one embodiment for an enhanced repetition mechanism for UL CG, a UE performs an UL CG transmission with a number [K] of repetitions, wherein the UE can determine a different number [K] of repetitions for different transmission occasions of an UL CG, e.g., based on UE measurements of corresponding reference signals and possibly within a gNB-indicated range of valid numbers for the number [K] of repetitions.

In the legacy UL CG repetition approach, the number of repetitions is either semi-statically RRC configured for UL CG Type-1 or is indicated in the activating DCI for UL CG Type-2; and either way once indicated, either way may apply to all transmission occasions of the UL CG (until the UL CG is released by a releasing/deactivating DCI or MAC-CE command and/or until the UL CG transmission parameters are updated by a re-activation/modification DCI or MAC-CE command).

Further, according to legacy UL CG repetition method(s), in the typical case that the beam/channel condition is changing over time, it is of course possible to keep deactivating/releasing/modifying an UL CG with an inappropriate/outdated value for number of repetitions and then (re-)activating the UL CG again with an appropriate updated/modified value for the number of repetitions. In addition, in the case that an UL CG transmission is detected by the gNB (e.g., DMRS is detected), but the gNB is not able to successfully decode the TB(s) in the CG PUSCH, even with the configured number of repetitions, the gNB can schedule a retransmission for sending a DCI, or can send a HARQ-NACK e.g. in a DFI, which may additionally include an adjustment to the number of repetitions. Therefore, such legacy approach to UL CG repetition entails (potentially significant) overhead to schedule retransmissions or provide HARQ feedback or even release the UL CG configuration.

In one example, the first and second number of repetitions corresponding to the first and second spatial transmission filters or beams are provided by the gNB, such as for example by one or two fields in a DCI format that activates the CG PUSCH Type-2 or the RRC configuration for CG PUSCH Type-1.

A benefit of this embodiment is to have varying/dynamic change—with little/no extra control overhead and even with saving signalling overhead—to the number of repetitions for UL CG PUSCH similar to dynamic (DCI-based) PUSCH, where each dynamically scheduled transmission follows a scheduling DCI to determine the number of repetitions. Therefore, this is an enhancement over the legacy approach to UL CG repetition. The provided enhancement avoids most of aforementioned signalling/control overhead for updating the number of UL CG repetitions based on the beam/link/channel condition, by allowing the UE to autonomously determine the number of repetitions for UL CG.

Additionally, this embodiment provides the gNB with a flexibility to use any already reserved resources for UL CG transmission, that are now indicated free and available based on this embodiment, to be used for scheduling other UL/DL transmissions for the same UE and/or other UE(s), thereby increasing the resource efficiency.

According to this embodiment, a UE is RRC configured with a maximum number [K_max] of repetitions and a minimum/typical number [K_min] of repetitions for an UL CG configuration, wherein the maximum number [K_max] of repetitions corresponds to a maximum resource reservation by the gNB for the UL CG transmissions of the UE, so that collisions with other DL/UL transmissions can be avoided, while minimum/typical number [K_min] of repetitions corresponds to a minimum resource reservation to ensure a minimum/nominal/typical reliability performance (e.g., initial BLER before HARQ retransmissions).

In one example, a set of values (possibly from a predetermined super-set of values) are RRC configured separately for each of [K_max] and [K_min] and then an activation/re-activation/modification DCI or MAC-CE command provides the actual selection of the values from the set of RRC configured sets. In another example, the UE can be configured with a step size parameter [step_K] for the allowed set of UE-selected number of repetitions for an UL CG transmission occasion, e.g., with K_min=2 and K_max=8 and step_K=2, the allowed set of UE-selected number of repetitions is {2, 4, 6, 8}, while with a step_K=1, the allowed set of UE-selected number of repetitions is {2, 3, 4, 5, 6, 7, 8}. These parameters provide a guidance from the gNB on how the UE is allowed to select the actual number of UL CG repetitions.

In one example, instead of two RRC configuration parameters [K_max] and [K_min], the UE is only configured with a single RRC configuration parameter [K] along with a scaling factor, say [scale_K], wherein in one option, the RRC configured [K] actually captures a minimum/typical number of UL CG repetitions and the scaling factor provides a factor by which the UE is allowed to increase the number of UL CG repetitions, e.g., [scale_K] is RRC configured from a predetermined set such as {1, 1.2, 1.25, 1.5, 1.75, 1.8, 2, 2.5, 3, 4} or a subset/variation thereof, while in another option, the RRC configured [K] actually captures a maximum number of UL CG repetitions and the scaling factor provides a ratio or percentage by which the UE is allowed to decrease the number of UL CG repetitions, e.g., [scale_K] is RRC configured from a predetermined set such as {1, 0.9, 0.8, 0.75, 0.6, 0.5, 0.4, 0.3, 0.25} or a subset/variation thereof.

In both options of the aforementioned example, it is always assumed that the multiplication of [K] and [scale_K] results in an integer value, otherwise a rounding/floor/ceiling operation is used. In one example, a set of values (possibly from a predetermined super-set of values) are RRC configured separately for each of [K] and [scale_K] and then an activation/re-activation/modification DCI or MAC-CE command provides the actual selection of the values from the set of RRC configured sets. The scaling factor parameter provides a guidance from the gNB on how the UE is allowed to select the actual number of UL CG repetitions.

Figure 12:
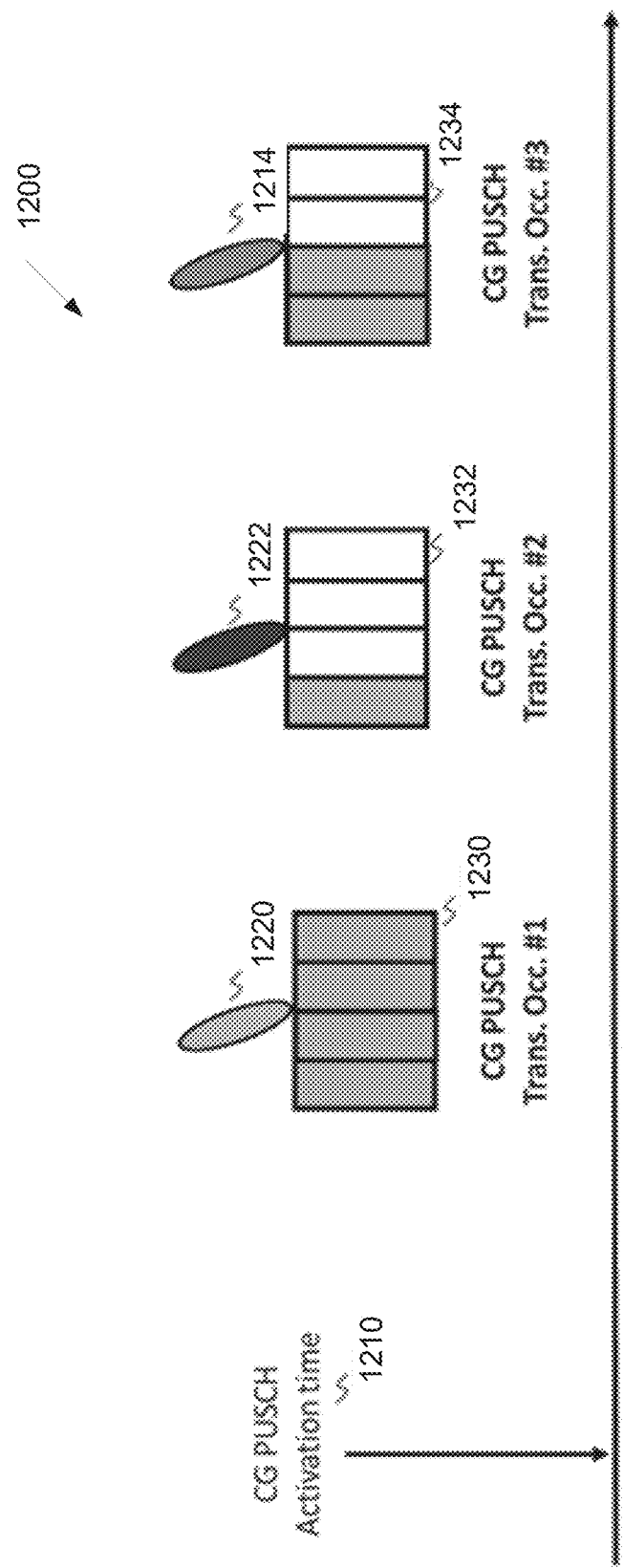
FIG. 12 illustrates an example operation of an enhanced repetition scheme for CG PUSCH according to embodiments of the present disclosure.

FIG. 12 illustrates an example operation 1200 of enhanced repetition scheme for CG PUSCH according to embodiments of the present disclosure. An embodiment of the operation 1200 shown in FIG. 12 is for illustration only.

In this embodiment, the UE receives an activation command (via, e.g., DCI or MAC-CE or RRC) for a CG PUSCH configuration, 1210, along with a configuration/indication for allowed number of repetitions e.g., {1, 2, 4}. Each CG transmission occasion corresponds to a (same or different) beam/beam indication RS resource with a corresponding channel/beam quality measurement (e.g., L1-RSRP). For example, the CG PUSCH beam has a low quality for transmission occasion #1, as shown with light grey in 1220, has a high quality for transmission occasion #2, as shown with dark grey in 1222, and has a medium quality for transmission occasion #3, as shown with medium grey in 1224. Correspondingly, the UE determines a large number of repetitions (=4) for transmission occasion #1, as shown in 1230, a small number of repetitions (=1) for transmission occasion #2, as shown in 1232, and a medium number of repetitions (=2) for transmission occasion #3, as shown in 1234.

Figure 13:
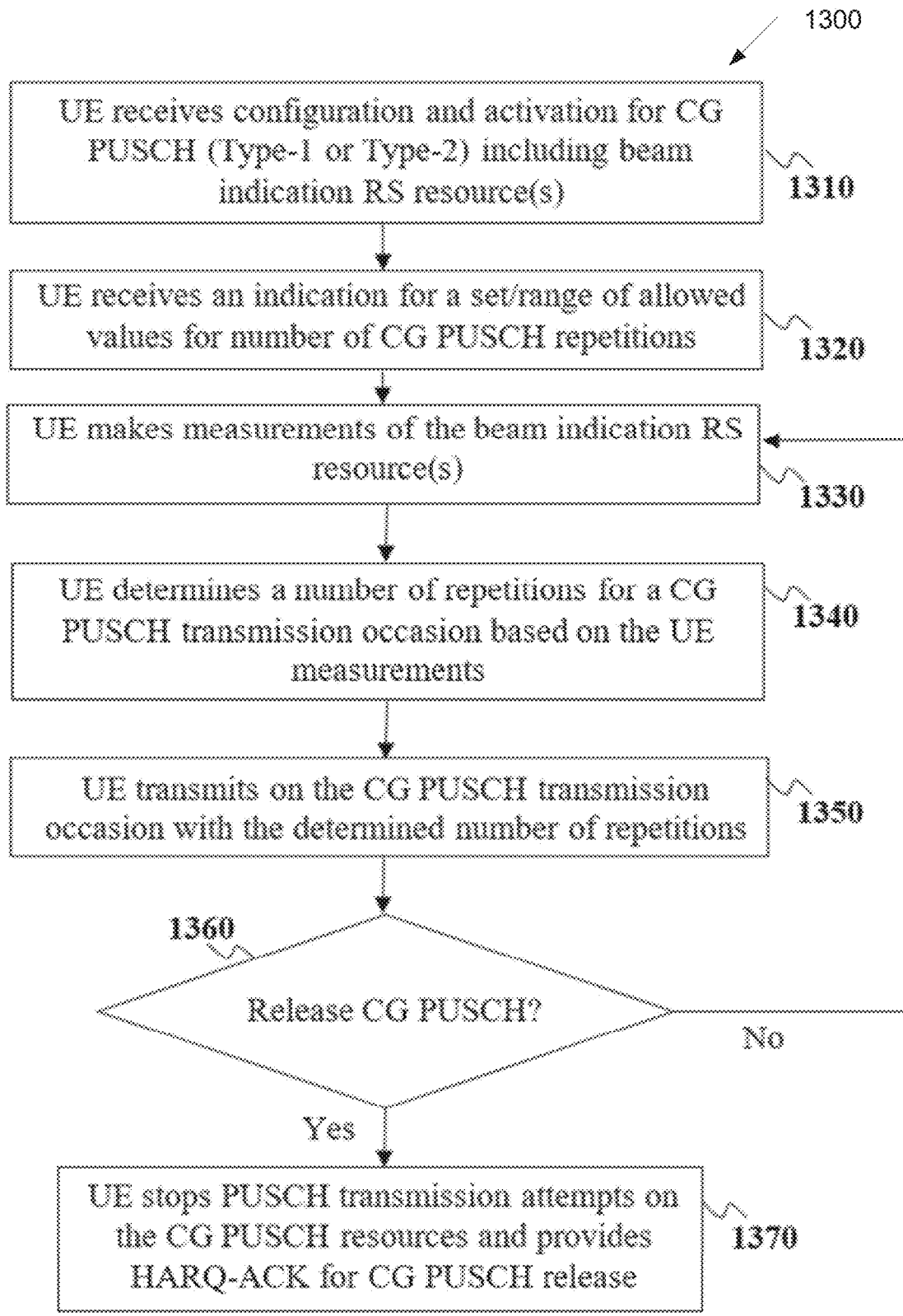
FIG. 13 illustrates a flowchart of a method for an enhanced repetition scheme for CG PUSCH according to embodiments of the present disclosure.

FIG. 13 illustrates a flowchart of a method 1300 for an enhanced repetition scheme for CG PUSCH according to embodiments of the present disclosure. An embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

The UE receives configuration and activation (e.g., via DCI or MAC-CE or RRC) for CG PUSCH (Type-1 or Type-2) including beam indication RS resource(s), 1310. The UE receives an indication (e.g., RRC or DCI signaling) for a set/range of allowed values for number of CG PUSCH repetitions, 1320. Then, the UE makes measurements of the beam indication RS resource(s), 1330. Next, the UE determines a number of repetitions for a CG PUSCH transmission occasion based on the UE measurements, 1340. Accordingly, the UE transmits on the CG PUSCH transmission occasion with the determined number of repetitions, 1350. The UE checks whether the UE has received a release command for CG PUSCH (e.g., DCI or MAC-CE or RRC), 1360. If not, the UE moves to the next CG PUSCH transmission occasion and repeats the same behavior starting from 1330. If the UE has received a CG PUSCH release command, then the UE stops PUSCH transmission attempts on the CG PUSCH resources and provides HARQ-ACK for CG PUSCH release, 1370.

In one example, the UE is only configured with a single RRC parameter for the number [K] of UL CG repetitions, or is configured with a list of values (possibly from a determined set of values) for a single RRC parameter for the number [K] of UL CG repetitions and a single number [K] of UL CG repetitions from the list of configured values is indicated via an activation/re-activation/modification DCI or MAC-CE command. According to this example, the parameter [K] either captures the maximum number of UL CG repetitions or the minimum/typical number of UL CG repetitions, the choice of which is either explicitly predetermined in the system specifications, or by an indication in the UL CG configuration in RRC and/or via a MAC-CE command and/or in an activation/re-activation/modification DCI.

According to this example, there is no indication of a scaling factor such as [scale-K] that provides an explicit guidance from the gNB to the UE on how to select the actual number of UL CG repetitions. Therefore, the resource reservation/allocation for the UL CG repetitions is transparent to the UE and based on gNB implementation.

In one example, when the configured parameter [K] captures the maximum number of UL CG repetitions, it can imply that the gNB has reserved corresponding many resources for UL CG repetitions, and while is allowed for the UE to select any number of repetitions not exceeding the configured value, a very aggressive decrease of the number of UL CG repetitions compared to the configured value increases the risk of an UL CG missed to be (detected and/or) decoded by the gNB, especially if the UL CG resources are shared with other UEs—in which case the gNB can indicate the failure of UL CG transmission and/or request for a retransmission of the failed UL CG transmission using e.g., a re-scheduling DCI possibly along with an indication of the actual/minimum/maximum number of repetitions for the retransmission, or a DFI which provides a HARQ ACK/NACK feedback possibly along with an indication of the actual/minimum/maximum number of repetitions for the retransmission.

In another example, when the configured parameter [K] captures the minimum/typical number of UL CG repetitions, it can imply that the gNB has reserved at least corresponding many resources for UL CG repetitions (the maximum number of resources may be a gNB implementation issue and transparent to the UE), and while the UE is allowed to select any number of repetitions that does not fall below/short of the configured value, any (significant) increase of the number of UL CG repetitions compared to the configured value increases the chance of collision with other (scheduled/configured) UL transmissions and/or DL receptions from other UEs at the gNB, thereby discarding the colliding transmissions from that UE and rendering the collided repetitions useless. Although this is not in general harmful from the UE perspective (except possibly for power saving/consumption considerations)—and can be potentially useful in case of no/few collision(s)— but the colliding transmission can be harmful from the gNB perspective since the colliding transmission generates undesired interference. In one example, the UE can be configured with a (maximum/minimum) number of slots for CG transmission, and the UE can determine a number of nominal or actual repetitions (such as Type-A or Type-B repetitions) based on the configured number of slots.

In one example, a UE may be configured with a coverage recovery or coverage enhancement (CE) mode or level, such as CE mode {A, B} or CE levels {0, 1} or CE levels {0, 1, 2, 3}, e.g., for NR-Light applications or for coverage enhancements use cases, in which case, a CE level/mode can be configured or indicated to the UE, a mapping between the measurement ranges (e.g., L1-RSRP range) and the configured parameter [K] of repetitions (and/or parameters [K_min], [K_max], [scale_K], [step_K]) can be same or different for different CE modes/levels. In a related example, if a UE is in a lower power class, measurement results need to be adjusted w.r.t. the UE power class, and modified measurements (such as modified L1-RSRP ranges) need to be used for determining configured number [K] of repetitions (and/or parameters [K_min], [K_max], [scale_K], [step_K]) and to determine UE-selected number [K_occ] of repetitions for an UL CG transmission occasion. In another example, when more than one CE mode or level is defined, a number of repetitions for a CE mode can be a multiple of a value for a number of repetitions in a baseline or normal coverage mode/level, wherein the multiple can be a predetermined factor in the system specifications or a value provided to the UE by higher layers. In yet another example, the UE can be provided a default number of repetitions for each CE mode/level.

In one example, any UE-selected increase/decrease in the number of repetitions of an UL CG transmission occasion compared to the gNB-indicated maximum/minimum/typical number of UL CG repetitions is not expected to collide with dynamically scheduled and/or configured UL transmissions and/or DL receptions for the same UE on the same serving cell/carrier/BWP and/or different serving cell/carrier/BWP. For example, the UE is not expected to select a number of repetitions for an UL CG transmission occasion that would cause a collision to another UL CG transmission and/or DL SPS reception.

In another example, when the UE receives scheduling indication such as a DCI format for an UL transmission and/or DL reception (at least on the same serving cell/carrier/BWP) that would overlap with an UL CG transmission occasion when transmitting based on the previously UE-selected (e.g., larger) number of UL CG repetitions, then the UE is expected to stop/drop/cancel any overlapping/colliding repetitions of the UL CG transmission occasion. In yet another example, if priority levels are associated with UL transmissions and/or DL receptions (either explicit priority configuration/indication in RRC or DCI and/or implicit priority assignment such as a predetermined priority list in the system specifications, e.g., prioritizations for transmission power reductions with respect to UL carrier aggregation power control and/or priority levels for UCI multiplexing and/or any predetermined/configured priority linkage with UE transmission settings such as the RNTI), then the UE is allowed to continue transmission with a previously UE-selected number of repetitions for an UL CG transmission occasion when a (potentially) overlapping/colliding UL transmission and/or DL reception has a lower (or same) priority level.

In one example, when some repetition(s) of an UL CG transmission occasion, including e.g. any (extra) number of UL CG repetitions (as selected by the UE) compared to a configured minimum/typical number of UL CG repetitions, (potentially) overlap/collide with other UL transmissions, then in one option, the UE is expected to keep the same uplink transmission power for all repetitions of the UL CG transmission occasion, including any number of (extra) repetitions of an UL CG transmission occasion that (potentially) overlap/collide with other UL transmissions, while in another option, the UE can apply different uplink transmission powers for different repetitions of the UL CG transmission occasion, at least for any number of (extra) repetitions (as selected by the UE) of the UL CG transmission occasion that (potentially) overlap/collide with other UL transmissions, wherein the power change can follow prioritization rules for transmission power reductions with respect to UL carrier aggregation power control, e.g., as developed in [3GPP TS 38.213 Clause 7.5]. In the latter option, to handle/resolve phase continuity issues, either additional/separate DMRS is used for the (extra) repetitions (as selected by the UE) of the UL CG transmission occasion and/or handling is left to UE implementation and/or gNB implementation.

In one example, repetitions of an UL CG transmission occasion occur in (valid) UL slots/symbols either consecutively in time or with predetermined or configured gaps in time domain. The UL CG repetitions can be slot based (a.k.a., repetition Type-A) or can be with shorter durations/periodicities (a.k.a., repetition Type-B) e.g., only a number of symbols in part of a slot, e.g., in the form of "mini-slots," "multi-segments" and/or across slot boundary.

In one example, a UE can receive an indication for valid slots (and/or symbols), such as NR-Light-valid slots and so on, where repetitions (and transmissions/receptions) are only allowed in the indicated valid slots. An indication for valid slots/symbols can be cell-specific and indicated via SIB or can be UE-specific and provided via RRC configuration or dynamic DCI indication (such as a group DCI format).

In one example, for a TDD operation, a configured or indicated maximum/minimum/typical number of UL CG repetitions and/or a UE-selected number of repetitions for an UL CG transmission occasion can represent a nominal or an actual number of repetitions. For example, when a potential UL CG repetition collides/overlaps with a semi-statically configured and/or dynamically indicated DL (and/or flexible) slots/symbols or invalid slots/symbols, then in one option, the UE is expected to skip the corresponding UL CG repetition but count the UL CG repetition towards the number of UL CG repetitions (i.e., the actual number of transmitted repetitions for an UL CG transmission occasion can be strictly smaller than the UE-selected number for repetitions), while in another option, the UE is expected to skip the corresponding UL CG repetition but does not count the UL CG repetition towards the number of UL CG repetitions and makes further attempts until the actual number of transmitted repetitions for an UL CG transmission occasion is equal to the UE-selected number for repetitions (unless certain UL CG repetitions is expected to be dropped/stopped/cancelled due to other reasons, e.g., collision with other DL/UL transmission as was previously described).

In one embodiment for methods for UE-determination of number of UL CG repetitions, the UE can use reference signal measurements to select/determine a different number [K_occ] of repetitions for different transmission occasions of an UL CG.

According to this embodiment, when a UE is configured/indicated a single beam indication RS (such as an SRI or TCI) for UL CG transmission, and at least when the beam indication RS is periodic (and/or semi-persistent), then the UE can determine a number [K_occ] of repetitions for an UL CG transmission occasion as an adjustment to a configured maximum/minimum/typical number [K] of repetitions for UL CG, wherein the adjustment level is based on the measurements of the beam indication RS.

In one example, there is a mapping between the measurement ranges (e.g., L1-RSRP ranges) with the adjustment level, e.g., a first RSRP range maps to a first ratio/factor of the configured number [K] of repetitions, while a second RSRP range maps to a second ratio/factor of the configured number [K] of repetitions. Herein, the measurement can be based on L1-/L3-RSRP, RSRQ, RSSI, SNR, SINR, capacity, throughput, and so on. Herein, when a beam indication RS is an uplink RS, then a corresponding downlink RS is used for measurement, e.g., a DL RS which is provided as the spatial transmission relation information for that uplink beam indication RS and/or is QCL (e.g., QCL Type-D) with the uplink beam indication RS. Herein, measurement ranges (such as the L1-RSRP ranges) can be predetermined in the system specifications, or can be RRC configured, or can be derived based on a certain rule/formula, e.g., with a predetermined format and based on a RRC-configured and/or DCI-indicated initial value and/or step size, while in another option, some or all details of measurement ranges and/or adjustment levels can be left to UE implementation.

In one example, a gNB can indicate a TCI state/an RS different from the UL CG beam indication RS to be used for measurements and determination of number [K_occ] of repetitions for UL CG transmission occasions. In one example, a UE may be configured with a coverage recovery or CE mode or level, such as CE mode {A, B} or CE levels {0, 1} or CE levels {0, 1, 2, 3}, e.g., for NR-Light applications or for coverage enhancements use cases, in which case, a CE level/mode can be configured or indicated to the UE, a mapping between the measurement ranges (e.g., L1-RSRP range) and the adjustment level to the configured number [K] of repetitions can be same or different for different CE modes/levels. In a related example, if a UE is in a lower power class, measurement results need to be adjusted w.r.t. the UE power class, and modified measurements (such as modified L1-RSRP ranges) need to be used for determining the adjustment level to the configured number [K] of repetitions and to determine number [K_occ] of repetitions for an UL CG transmission occasion.

According to this embodiment, when a UE is configured with multiple beam indication RS (such as multiple SRIs and/or TCIs) for UL CG transmission, or when the UE is configured with one or multiple beam indication RS as well as additional DL RS(s) (such as TCI state(s)) for measurement, then the UE can determine a number [K_occ] of repetitions for an UL CG transmission occasion as an adjustment to a configured maximum/minimum/typical number [K] of repetitions for UL CG, wherein the adjustment level is based on the measurements of beam indication RS(s) and/or additional measurement DL RS(s)/TCI state(s).

In one example, the UE determines the number [K_occ] of repetitions for an UL CG transmission occasion based on only a single beam indication/measurement RS, e.g., using L1-RSRP ranges as discussed above, wherein the single RS is selected e.g., using methods as described in aforementioned embodiments. In another example, the UE determines an aggregate measurement, e.g., from an average/minimum/maximum (or other function/combination thereof) of some/all measurements of some/all beam indication/measurement RS(s), and then determines an adjustment level using the aggregate measurement to determine a number [K_occ] of repetitions for an UL CG transmission occasion.

In yet another example, the UE determines the number [K_occ] of repetitions for an UL CG transmission occasion based on an average/minimum/maximum (or other function/combination thereof) of corresponding numbers [K_occ] of repetitions when each beam indication/measurement RS is considered separately/individually. In a further example, the UE transmits all repetitions of an UL CG transmission occasion with a same beam/spatial transmission filter or with different beams/spatial transmission filters.

In one example, when a UE transmits repetitions of an UL CG transmission occasion with different beams (e.g., 2 or 4 beams), then in one option, the UE can transmit with each beam a same number of repetitions (e.g., [K_occ]/2 or [K_occ]/4 where a single [K_occ] is determined e.g., using one of the methods described earlier), or in another option, the UE can transmit with each beam a different number of repetitions (e.g., a first [K_occ] for a first transmit beam and a second [K_occ] for a second transmit beam, and so on, wherein each [K_occ] corresponds to one or multiple beam indication/measurement RS(s)), e.g., transmit a larger number of repetitions using a stronger beam and a fewer number of repetitions using a weaker beam.

In another example, a first transmit beam can correspond to a first CE level/mode (e.g., since measurement/L1-RSRP for the first beam falls in a first range) and a second transmit beam can be in a second CE level/mode (e.g., since measurement/L1-RSRP for the second beam falls in a second range), therefore, the first and second transmit beams can follow different rules/tables to determine the corresponding adjustments levels for number of repetitions. When transmitting an UL CG transmission occasion with multiple beams, an order of beams for transmission of different repetitions can be predetermined (e.g., beam cycling, e.g., from lowest beam/RS index to highest beam/RS index or vice versa, e.g., based on beam quality, e.g., from strongest beam to weakest beam, and so on) or can be RRC configured or can be indicated by an activation/re-activation/modification DCI or MAC-CE command.

Figure 14:
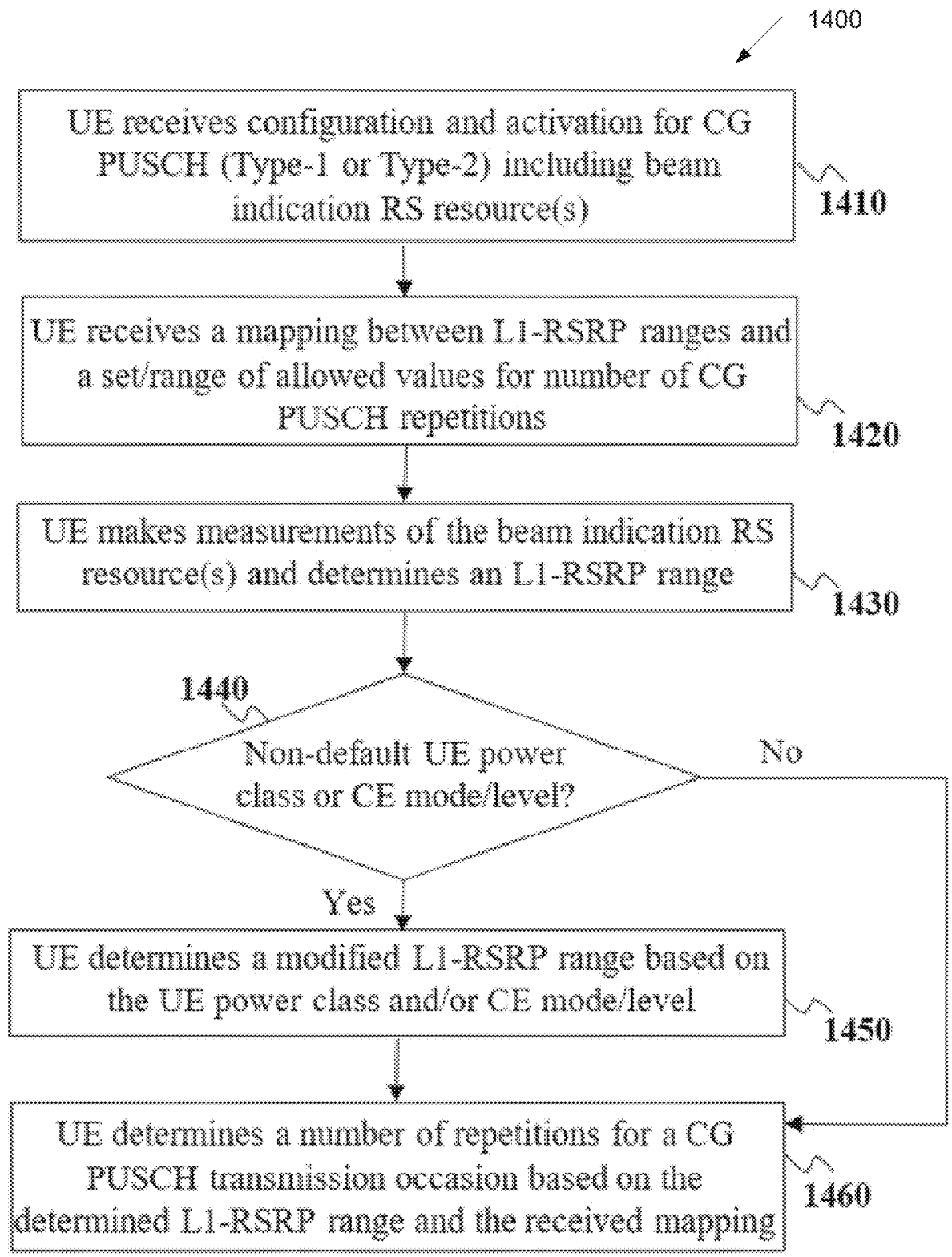
FIG. 14 illustrates a flowchart of a method for a UE-determination of number of repetitions for CG PUSCH according to embodiments of the present disclosure.

FIG. 14 illustrates a flowchart of a method 1400 for a UE-determination of number of repetitions for CG PUSCH according to embodiments of the present disclosure. An embodiment of the method 1400 shown in FIG. 14 is for illustration only. One or more of the components illustrated in FIG. 14 can be implemented in specialized circuitry configured to perform the noted functions or one or more of the components can be implemented by one or more processors executing instructions to perform the noted functions.

The UE receives configuration and activation for CG PUSCH (Type-1 or Type-2) including beam indication RS resource(s), 1410. The UE also receives a mapping between L1-RSRP ranges and a set/range of allowed values for number of CG PUSCH repetitions, 1420. Then, for each CG transmission occasion, the UE makes measurements of the beam indication RS resource(s) and determines an L1-RSRP range (e.g., by combining measurements corresponding to multiple beam indication RS resources), 1430. Then, the UE checks whether the UE has a non-default UE power class (e.g., lower than 23 dBm) and/or whether the UE is operated in a CE mode/level, 1440. If not, the UE determines a number of repetitions for a CG PUSCH transmission occasion based on the determined L1-RSRP range and the received mapping, 1460. But, if the UE has a non-default UE power class (e.g., lower than 23 dBm) and/or is operated in a CE mode/level, then the UE determines a modified L1-RSRP range based on the UE power class and/or CE mode/level, 1450, and then moves on to step 1460 to determine a number of repetitions for a CG PUSCH transmission.

In one example, autonomous UE actions for selection of beam, or number of repetitions, and so on can be restricted. For example, the UE can be configured using timer(s) or counter(s) with limits on how often the UE can change a selection for a beam or for a number of repetitions, or the UE can be configured with a threshold for minimum RSRP change before the UE can change the gNB configuration of corresponding parameters. The UE can also inform the gNB of the preferred change.

In one example, the UE transmits a second number of repetitions corresponding to a second spatial transmission filter (or beam) with a time offset after a first number of repetitions corresponding to a first spatial transmission filter or beam, wherein the time offset can be configured/indicated by the network or can be determined by the UE based on a UE processing time such as an application time for beam switching such as a threshold timeDurationForQCL based on a UE capability, or a default UE processing time for PUSCH as used for PHR type determination, T'_proc,2 (e.g., as in 3GPP TS 38.213 and TS 38.214), or a UE processing time for UCI multiplexing, and so on, or a predetermined/configured fraction thereof. In another example, the UE can alternate between transmissions corresponding to the first spatial filter and transmissions corresponding to the second spatial filter.

In one embodiment for methods for UE-indication to the gNB regarding a UE-selected number of UL CG repetitions, when a UE can select different number of repetitions for different UL CG transmission occasions, then the UE is expected to indicate to the gNB the UE-selected number of repetitions for each UL CG transmission occasion.

In one example, the UE is expected to indicate the UE-selected number of repetitions when two absolute parameters are configured/indicated to the UE for the number of UL CG repetitions, such as [K_max] and [K_min] as described in the aforementioned embodiments above.

In another example, when the UE is configured/gNB-indicated with a single absolute parameter [K] for number of UL CG repetitions (perhaps along with a scale parameter and/or step size parameter), the UE is expected to indicate the UE-selected number of repetitions for an UL CG transmission occasion only when the UE selects a number of repetitions different from the configured/gNB-indicated value, otherwise no indication is necessary.

In one example, there can be a flag to indicate whether the UE followed/selected the configured/gNB-indicated value or whether the UE selected a different value. In one example, when the UE selects and indicates a number of repetitions for an UL CG transmission occasion, the UE is not expected to revert the indication and is expected to transmit the indicated number of repetitions (e.g., as per rules in the aforementioned embodiments), unless the UE receives an indication for (early) termination/cancellation of the repetitions, such as a HARQ ACK or another downlink feedback indicator or a rescheduling DCI.

In one example, the UE indication of the UE-selected number of repetitions for an UL CG transmission occasion can be explicit. For example, the can UE indicate a UE-selected number of repetitions for an UL CG transmission occasion as a UCI multiplexed on the UL CG transmission itself, i.e., as a CG-UCI which is multiplexed on CG PUSCH. Such IE can be 2-3 bits of information, possibly among other IEs contained in CG-UCI. The indication can be a to an index within a table of predetermined/configured absolute numbers of repetitions or predetermined/configured table of adjustment levels to baseline repetition number(s), and so on.

Figure 15:
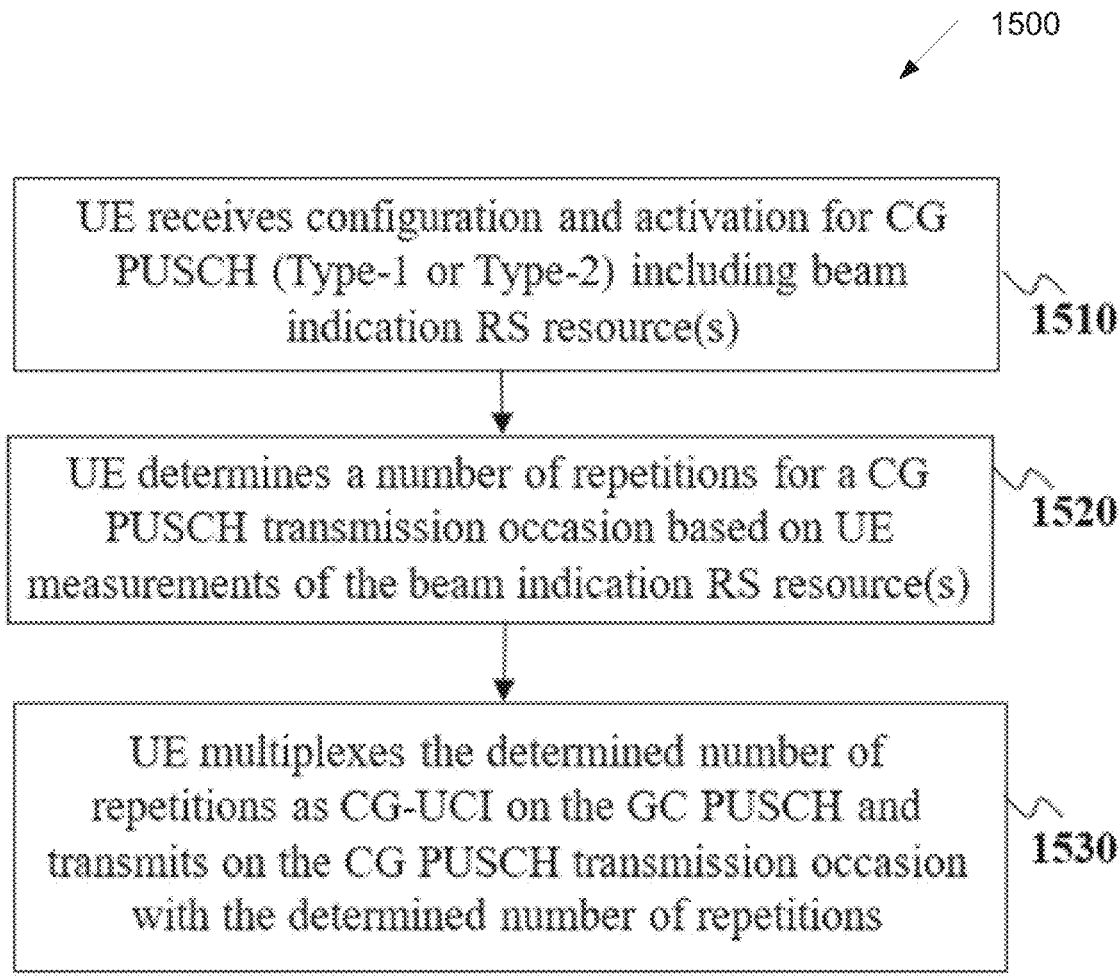
FIG. 15 illustrates a flowchart of a method for an explicit indication of a UE-determined number of repetitions for CG PUSCH according to embodiments of the present disclosure.

FIG. 15 illustrates a flowchart of a method 1500 for an explicit indication of a UE-determined number of repetitions for CG PUSCH according to embodiments of the present disclosure. An embodiment of the method 1500 shown in FIG. 15 is for illustration only. One or more of the components illustrated in FIG. 15 can be implemented in specialized circuitry configured to perform the noted functions or one or more of the components can be implemented by one or more processors executing instructions to perform the noted functions.

The UE receives configuration and activation for CG PUSCH (Type-1 or Type-2) including beam indication RS resource(s), 1510. Then, for each CG PUSCH transmission occasion, the UE determines a number of repetitions for a CG PUSCH transmission occasion based on UE measurements of the beam indication RS resource(s), 1520. Finally, the UE multiplexes the determined number of repetitions as CG-UCI on the GC PUSCH and transmits on the CG PUSCH transmission occasion with the determined number of repetitions, 1530.

In another example, the UE indication of the UE-selected number of repetitions for an UL CG transmission occasion can be implicit. For example, each UL CG configuration includes multiple configurations for UL CG transmission parameters, such as configuration of multiple DMRS patterns/sequences/ports/cyclic shifts/scrambling/cover codes, and so on, and then there is a predetermined/configured mapping between the UE-selected number of repetitions for an UL CG transmission occasion with the multiple configurations for UL CG transmission parameters such as the multiple configurations for DMRS, e.g., a first number of repetitions (e.g., K_occ=2) maps to a first cyclic shift for DMRS and a second number of repetitions (e.g., K_occ=4) maps to a second cyclic shift for DMRS.

In such a case, when the UE selects a value for the number of repetitions for an UL CG transmission occasion, then the UE selects the corresponding configuration for the UL CG transmission parameters such the corresponding DMRS configuration based on the mapping, e.g., when the UE selects K_occ=4 for an UL CG transmission occasion, then the UE performs that UL CG transmission occasion using the second value of cyclic shift for UL CG DMRS.

Figure 16:
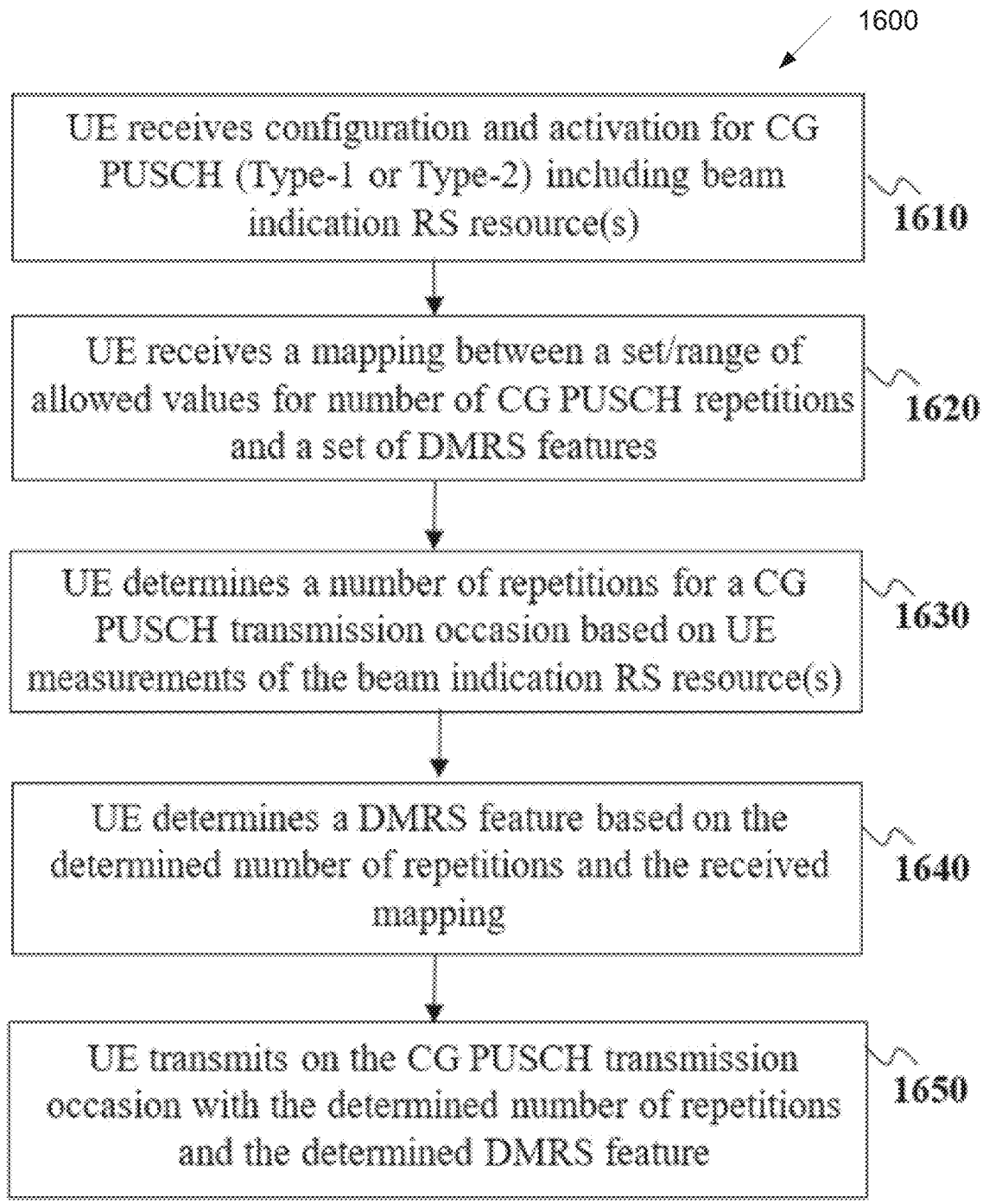
FIG. 16 illustrates a flowchart of a method for an implicit indication of a UE-determined number of repetitions for CG PUSCH according to embodiments of the present disclosure.

FIG. 16 illustrates a flowchart of a method 1600 for an implicit indication of a UE-determined number of repetitions for CG PUSCH according to embodiments of the present disclosure. An embodiment of the method 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions.

The UE receives configuration and activation for CG PUSCH (Type-1 or Type-2) including beam indication RS resource(s), 1610. The UE also receives a mapping between a set/range of allowed values for number of CG PUSCH repetitions and a set of DMRS features (e.g., DMRS patterns/sequences/ports/cyclic shifts/scrambling/cover codes, and so on), 1620. Then, for each CG PUSCH transmission occasion, the UE determines a number of repetitions for a CG PUSCH transmission occasion based on UE measurements of the beam indication RS resource(s), 1630. Accordingly, the UE determines a DMRS feature based on the determined number of repetitions and the received mapping, 1640. Finally, the UE transmits on the CG PUSCH transmission occasion with the determined number of repetitions and the determined DMRS feature, 1650.

In one embodiment for an enhanced repetition mechanism for DL SPS, a UE receives a DL SPS with a number [K] of repetitions, wherein a number [K] of repetitions can be different for different reception occasions of the DL SPS (i.e., the gNB can transmit the DL SPS PDSCH with a different number of repetitions for different occasions of DL SPS). At least most of the methods and examples developed in the aforementioned embodiments for enhanced repetition of UL CG can be applicable to enhanced repetition of DL SPS, when appropriate changes are applied, such as changing the communication direction from UL to DL and so on.

This embodiment is an enhancement over the legacy approach to DL SPS repetition, in which the number of repetitions is either semi-statically RRC configured and/or is indicated in the activation/re-activation DCI or MAC-CE command; and either way once indicated, it may apply to all reception occasions of the DL SPS (until the DL SPS is released by a releasing/deactivating DCI or MAC-CE command and/or until the DL SPS transmission parameters are updated by a re-activation/modification DCI or MAC-CE command).

In one example, a UE can be provided by a baseline number of repetitions and/or a possible set of number of repetitions for a DL SPS reception occasion, using one or more of the parameters: [K], [K_max], [K_min], [scale_K], [step_K], and so on, e.g., as described in in the aforementioned embodiments. In another example, a UE may not be provided with any information on the possible number of DL SPS repetitions, and the actual number can be explicitly indicated to the UE for each DL SPS reception occasion (see some further details below).

In one example, a UE may be configured with a coverage recovery or CE mode or level, such as CE mode {A,B} or CE levels {0, 1} or CE levels {0, 1, 2, 3}, e.g., for NR-Light applications or for coverage enhancements use cases and so on, in which case, a CE level/mode can be configured or indicated to the UE, or a mapping between the measurement ranges (e.g., L1-RSRP range) and the possible number of repetitions (e.g., parameters [K], [K_min], [K_max], [scale_K], [step_K]) can be same or different for different CE modes/levels. In a related example, if a UE is in a lower power class, measurement results need to be adjusted w.r.t. the UE power class, and modified measurements (such as modified L1-RSRP ranges) need to be used for determining the possible number of repetitions (e.g., parameters [K], [K_min], [K_max], [scale_K], [step_K]) for a DL SPS reception occasion.

In one example, repetitions of a DL SPS reception occasion occur in (valid) DL slots/symbols either consecutively in time or with predetermined or configured gaps in time domain. The DL SPS repetitions can be slot based (a.k.a., repetition Type-A) or can be with shorter durations/periodicities (a.k.a., repetition Type-B) e.g., only a number of symbols in part of a slot, e.g., in the form of "mini-slots", "multi-segments" and/or across slot boundary. In one example, a UE can receive an indication for valid slots (and/or symbols), such as NR-Light-valid slots and so on, where repetitions (and receptions) are only allowed in the indicated valid slots. An indication for valid slots/symbols can be cell-specific and indicated via SIB or can be UE-specific and provided via an RRC configuration or a dynamic DCI indication (such as a group DCI format).

In one example, a UE can provide the gNB with a preferred number of repetitions for a DL SPS reception. For example, when a UE is configured/indicated one or multiple beam indication RS resource(s), such as TCI state(s), for DL SPS reception, and/or one or multiple (additional) DL RS resource(s), such as TCI state(s), for measurement, then the UE can use measurements of those beam indication/measurement RS resource(s) to determine a preferred number of repetitions for DL SPS, wherein a determination can be based on predetermined procedures in the system specifications and/or per UE implementation.

In one example, when a UE receives DL SPS with different number of repetitions for different DL SPS reception occasions, then the UE expects to receive indication from the gNB for the gNB-selected number of repetitions for each DL SPS reception occasion.

In one example, when the UE receives an indication for a number of repetitions for a DL SPS reception occasion, the UE does not expect the indication to be reverted and expects to receive the indicated number of repetitions, unless the UE transmits an indication for (early) termination/cancellation of the repetitions, such as a HARQ ACK or another UCI to indicate that the DL SPS is already corrected decoded by the UE.

In one example, the indication for the gNB-selected number of repetitions for a DL SPS reception occasion can be explicit. For example, the can UE is indicated a gNB-selected number of repetitions for a DL SPS reception occasion as a DCI multiplexed on the DL SPS PDSCH itself, i.e., as a SPS-DCI which is multiplexed on SPS PDSCH. Such IE can be 2-3 bits of information, possibly among other IEs contained in SPS-DCI. The indication can be to an index within a table of predetermined/configured absolute numbers of repetitions or predetermined/configured table of adjustment levels to baseline repetition number(s), and so on.

Figure 17:
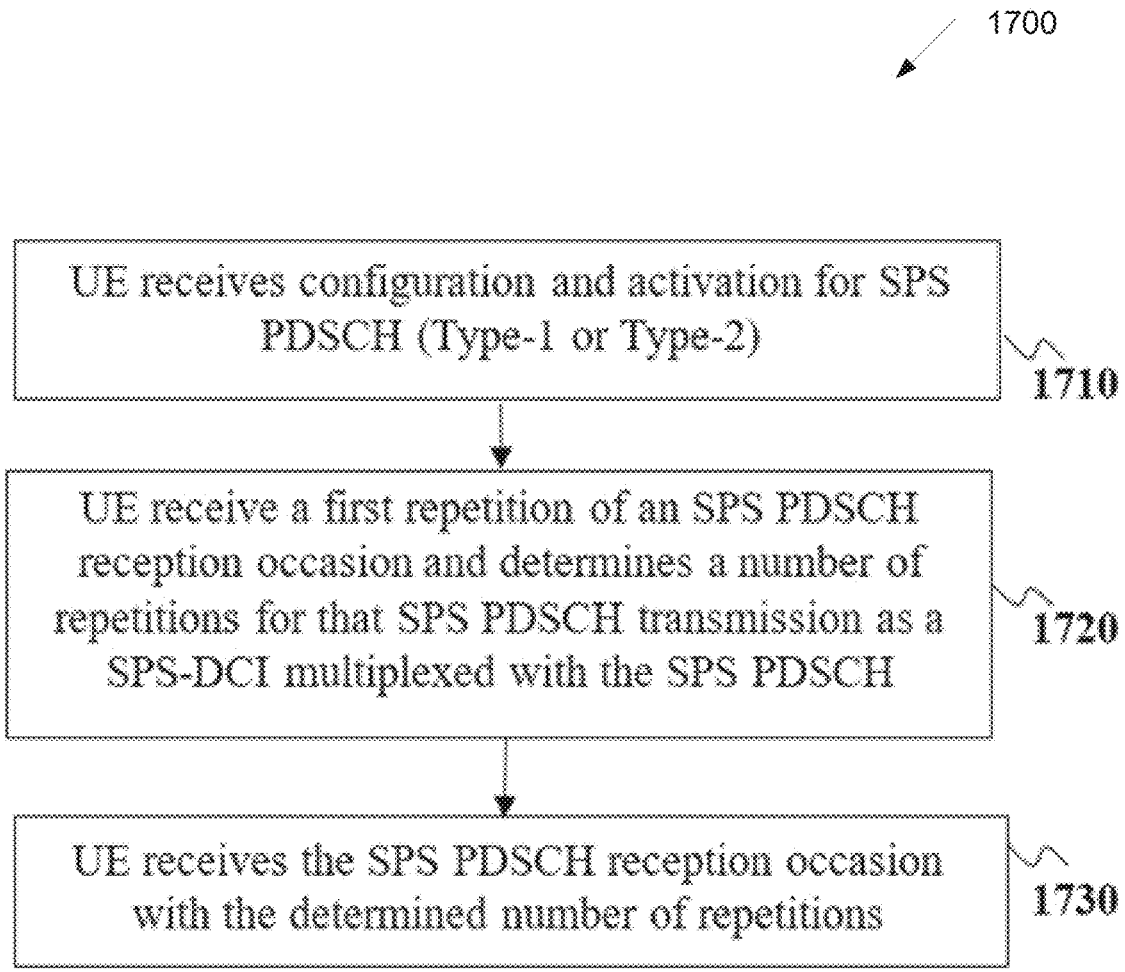
FIG. 17 illustrates a flowchart of a method for an explicit indication of the number of repetitions for SPS PDSCH according to embodiments of the present disclosure.

FIG. 17 illustrates a flowchart of a method 1700 for an explicit indication of the number of repetitions for SPS PDSCH according to embodiments of the present disclosure. An embodiment of the method 1700 shown in FIG. 17 is for illustration only. One or more of the components illustrated in FIG. 17 can be implemented in specialized circuitry configured to perform the noted functions or one or more of the components can be implemented by one or more processors executing instructions to perform the noted functions.

The UE receives configuration and activation for SPS PDSCH (Type-1 or Type-2), 1710. Then, for each SPS PDSCH reception occasion, the UE receive a first repetition of the SPS PDSCH reception occasion and determines a number of repetitions for that SPS PDSCH transmission as a SPS-DCI multiplexed with the SPS PDSCH, 1720. Finally, the UE receives the SPS PDSCH reception occasion with the determined number of repetitions, 1730.

In another example, the indication for the gNB-selected number of repetitions for a DL SPS reception occasion can be implicit. For example, each DL SPS configuration includes multiple configurations for DL SPS reception parameters, such as configuration of multiple DMRS patterns/sequences/ports/cyclic shifts/scrambling/cover codes, and so on, and then there is a predetermined/configured mapping between the gNB-selected number of repetitions for a DL SPS reception occasion with the multiple configurations for DL SPS reception parameters such as the multiple configurations for DMRS, e.g., a first number of repetitions (e.g., $K\_occ=2$) maps to a first cyclic shift for DMRS and a second number of repetitions (e.g., $K\_occ=4$) maps to a second cyclic shift for DMRS.

In such a case, when the UE receives a certain configuration for the DL SPS reception parameters such a certain DMRS configuration, then the UE expects a corresponding number of repetitions for the DL SPS reception occasion based on the mapping, e.g., when the UE detects a second value of cyclic shift for DL SPS DMRS, then the UE expects $K\_occ=4$ for a DL SPS reception occasion.

Figure 18:
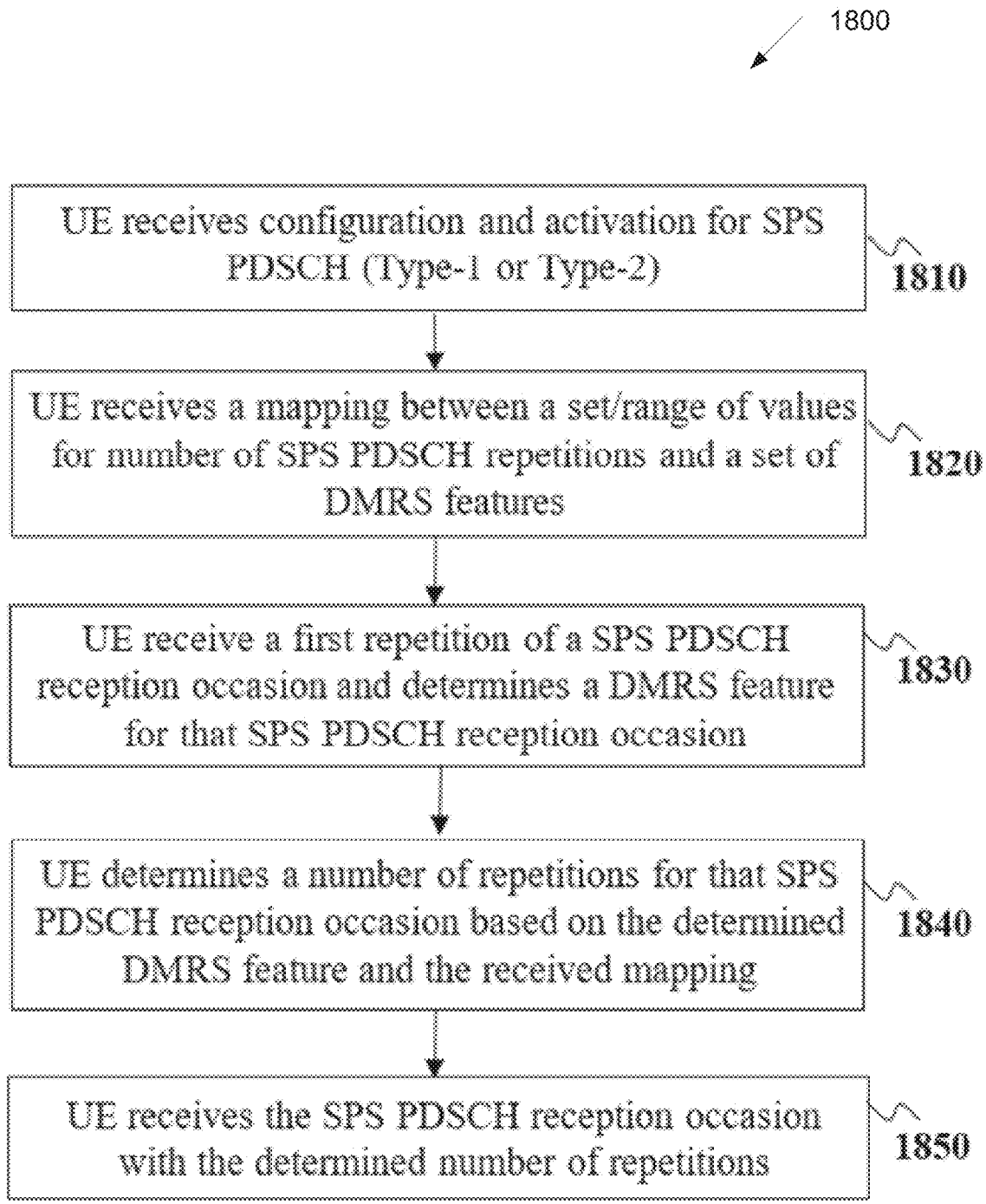
FIG. 18 illustrates a flowchart of a method for an implicit indication of number of repetitions for SPS PDSCH according to embodiments of the present disclosure.

FIG. 18 illustrates a flowchart of a method 1800 for an implicit indication of number of repetitions for SPS PDSCH according to embodiments of the present disclosure. An embodiment of the method 1800 shown in FIG. 18 is for illustration only. One or more of the components illustrated in FIG. 18 can be implemented in specialized circuitry configured to perform the noted functions or one or more of the components can be implemented by one or more processors executing instructions to perform the noted functions.

The UE receives configuration and activation for SPS PDSCH (Type-1 or Type-2), 1810. The UE also receives a mapping between a set/range of values for number of SPS PDSCH repetitions and a set of DMRS features (e.g., DMRS patterns/sequences/ports/cyclic shifts/scrambling/cover codes, and so on), 1820. Then, for each SPS PDSCH reception occasion, the UE receive a first repetition of a SPS PDSCH reception occasion and determines a DMRS feature for that SPS PDSCH reception occasion, 1830. Accordingly, the UE determines a number of repetitions for that SPS PDSCH reception occasion based on the determined DMRS feature and the received mapping, 1840. Finally, the UE receives the SPS PDSCH reception occasion with the determined number of repetitions, 1850.

In one embodiment for a beam selection and beam cycling for repetitions of UL CG configured with multiple beams, when a UE is configured with multiple beams or beam indication RSs for an UL CG configuration, and when the UE performs multiple repetitions of an UL CG transmission occasion, the UE can use a same beam for all repetitions or can use different beams for different repetitions of the UL CG transmission occasion. According to this example, a number of repetition can be (as usual) configured/indicated by the gNB or can be selected by the UE perhaps based on gNB guidance e.g., as discussed in the aforementioned embodiments.

In one example, a beam indication RS resource for UL CG can be one or more of the following: SRS resource set(s)/subset(s), SRS resource(s), (associated) CSI-RS resource(s) or (associated) CSI-RS resource set(s)/subset(s), TCI state(s) or set(s)/subset(s) of TCI states, (corresponding) QCL assumption(s), such as a QCL assumption Type-D, DL RS such as SSB resource(s) or CSI-RS resource(s) or PRS resource(s), wherein a spatial transmission/reception filter for a beam indication resource can be provided by RRC configuration and/or can be provided/updated/overwritten by an activation/re-activation/modification DCI or MAC-CE command.

In one example, a single beam/beam indication RS resource can be selected from among multiple beams/beam indication RS resources to transmit all repetitions of an UL CG transmission occasion. For example, a beam/RS can be selected by the gNB or UE or jointly/collaboratively by both UE and gNB, e.g., as in examples described in the aforementioned embodiments. In one example, a selection of a beam/RS for transmitting all repetitions of a first UL CG transmission occasion can be independent of a selection of a beam/RS for transmitting all repetitions of a second UL CG transmission occasion. In another example, a first beam/beam indication RS resource selected for transmitting all repetitions of a first UL CG transmission occasion can be same or different from a second beam/beam indication RS resource selected for transmitting all repetitions of a second UL CG transmission occasion.

In one example, there can be a predetermined/configured pattern in selecting the beams/beam indication RS resources for different UL CG transmission occasions. For example, there can be a predetermined beam cycling pattern, such from lowest beam/RS index to highest beam/RS index or vice versa, to use for different UL CG transmission occasions. In another example, a beam selection/cycling pattern can be provided by RRC configuration and/or can be provided/updated/overwritten by an activation/re-activation/modification DCI or MAC-CE command.

In one example, when different beams are used for different repetitions of the UL CG transmission occasion, the total number of repetitions for that UL CG transmission occasion can be grouped in multiple repetition groups, wherein each group corresponds to a different beam/beam indication RS resource. According to this example, the UE transmits a first group of repetitions of an UL CG transmission occasion using a first beam/beam indication RS resource, and transmits a second group of repetitions of an UL CG transmission occasion using a second beam/beam indication RS resource.

In one example, the mapping between repetition groups and the beams/beam indication RS resources can be predetermined, e.g., beam cycling, e.g., from lowest beam/RS index to highest beam/RS index or vice versa, or can be based on beam quality, e.g., from strongest beam (e.g., largest L1-RSRP) to weakest beam (e.g., smallest L1-RSRP), and so on. In another example, the mapping between repetition groups and the beams/beam indication RS resources can be RRC configured and/or can be indicated/overwritten by an activation/re-activation/modification DCI or MAC-CE command.

In yet another example, the size of the repetition groups of an UL CG transmission occasion can be same, or different repetition groups can have different sizes. For example, the total number of repetitions can be equality divided/split among different beams/beam indication RS resources, or each beam/beam indication RS resource can correspond to a different subset/number from the total number of repetitions, e.g., transmit a larger number of repetitions using a stronger beam and a fewer number of repetitions using a weaker beam.

Figure 19:
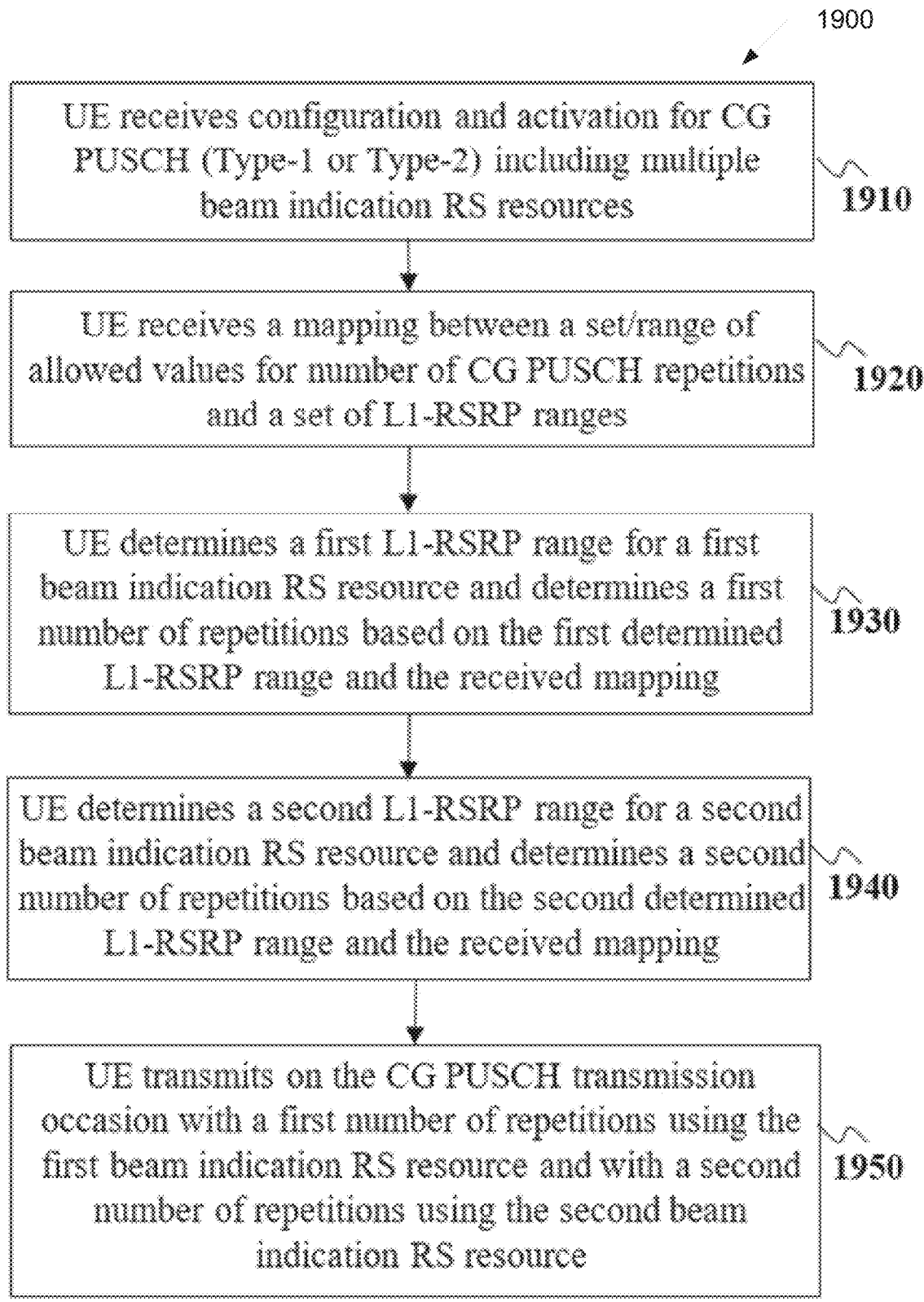
FIG. 19 illustrates a flowchart of a method for a repetition with beam cycling for CG PUSCH according to embodiments of the present disclosure.

FIG. 19 illustrates a flowchart of a method 1900 for a repetition with beam cycling for CG PUSCH according to embodiments of the present disclosure. An embodiment of the method 1900 shown in FIG. 19 is for illustration only. One or more of the components illustrated in FIG. 19 can be implemented in specialized circuitry configured to perform the noted functions or one or more of the components can be implemented by one or more processors executing instructions to perform the noted functions.

The UE receives configuration and activation for CG PUSCH (Type-1 or Type-2) including multiple beam indication RS resources, 1910. The UE also receives a mapping between a set/range of allowed values for number of CG PUSCH repetitions and a set of L1-RSRP ranges, 1920. Then, the UE determines a first L1-RSRP range for a first beam indication RS resource and determines a first number of repetitions based on the first determined L1-RSRP range and the received mapping, 1930. Similarly, the UE determines a second L1-RSRP range for a second beam indication RS resource and determines a second number of repetitions based on the second determined L1-RSRP range and the received mapping, 1940. Finally, the UE transmits on the CG PUSCH transmission occasion with a first number of repetitions using the first beam indication RS resource and with a second number of repetitions using the second beam indication RS resource, 1950. Note that, the ordering of first beam and second beam can be a predetermined order, e.g., based on RS resource index, or can be based on beam quality, e.g., first beam corresponds to higher L1-RSRP and second beam corresponds to lower L1-RSRP.

In one embodiment for a beam selection and beam cycling for repetitions of DL SPS configured with multiple beams, when a UE is configured/indicated with multiple beams or beam indication RSs for a DL SPS configuration, and when the UE receives multiple repetitions of a DL SPS reception occasion, the UE expects to receive all repetitions of the DL SPS reception occasion with a same beam or can expect to receive different repetitions of the DL SPS reception occasion using different beams. According to this example, a number of repetition can be (as usual) configured/indicated by the gNB for all DL SPS reception occasions, or can be selected/changed by the gNB for different DL SPS reception occasions e.g. as discussed in the aforementioned embodiments.

In one example, a beam indication RS resource for DL SPS can be one or more of the following: TCI state(s) or set(s)/subset(s) of TCI states, (corresponding) QCL assumption(s), such as a QCL assumption Type-D, DL RS such as SSB resource(s) or CSI-RS resource(s) or PRS resource(s), wherein a spatial transmission/reception filter for a beam indication resource can be provided by RRC configuration and/or can be provided/updated/overwritten by an activation/re-activation/modification DCI or MAC-CE command.

In one example, a single beam/beam indication RS resource can be selected from among multiple beams/beam indication RS resources to transmit all repetitions of a DL SPS reception occasion. For example, a beam/RS can be selected by the gNB or jointly/collaboratively by both UE and gNB, e.g., as in examples described in the aforementioned embodiments. In one example, a selection of a beam/RS for receiving all repetitions of a first DL SPS reception occasion can be independent (same or different) of a selection of a beam/RS for receiving all repetitions of a second DL SPS reception occasion.

In another example, there can be a predetermined/configured pattern in selecting the beams/beam indication RS resources for different DL SPS reception occasions. For example, there can be a predetermined beam cycling pattern, such from lowest beam/RS index to highest beam/RS index or vice versa, to use for different DL SPS reception occasions. In another example, a beam selection/cycling pattern can be provided by RRC configuration and/or can be provided/updated/overwritten by an activation/re-activation/modification DCI or MAC-CE command.

In one example, when different beams are used for different repetitions of the DL SPS reception occasion, the total number of repetitions for that DL SPS reception occasion can be grouped in multiple repetition groups, wherein each group corresponds to a different beam/beam indication RS resource. According to this example, the UE receives a first group of repetitions of a DL SPS reception occasion using a first beam/beam indication RS resource, and receives a second group of repetitions of a DL SPS reception occasion using a second beam/beam indication RS resource.

In one example, the mapping between repetition groups and the beams/beam indication RS resources can be predetermined, e.g., beam cycling, e.g., from lowest beam/RS index to highest beam/RS index or vice versa, and so on. In another example, the mapping between repetition groups and the beams/beam indication RS resources can be RRC configured and/or can be indicated/overwritten by an activation/re-activation/modification DCI or MAC-CE command. In yet another example, the size of the repetition groups of a DL SPS reception occasion can be same, or different repetition groups can have different sizes. For example, the total number of repetitions can be equality divided/split among different beams/beam indication RS resources, or each beam/beam indication RS resource can correspond to a different subset/number from the total number of repetitions.

In one embodiment for an enhanced UL CG repetitions for high priority traffic, when a UE is configured for UL CG repetition, and when a UE has (high priority such as URLLC) traffic to transmit, the UE is allowed to start the (high priority) traffic in a symbol/slot that corresponds to a repetition of an UL CG transmission occasion which is different from the first repletion of the UL CG transmission occasion. According to this embodiment, the UE can transmit a (high priority) traffic with fewer number of repetitions compared to the configured/gNB-indicated number of repetitions.

The motivation for this enhancement is to allow ULRRC or any other high priority traffic to use an UL CG transmission occasion even if the traffic arrives/originates not at the beginning of an UL CG transmission occasion, rather in a second or later slot/sub-slot/mini-slot that corresponds to a second or later repetition of that UL CG transmission occasion (i.e., "in the middle of repetitions"), so that the UE does not need to wait for the start of another UL CG transmission occasion (or for making a scheduling request and waiting to get scheduled for dynamic PUSCH) to be able to transmit a late-arrived urgent traffic.

In one example, the UE can start transmission (of a high priority traffic) in any symbol/slot/repetition of an UL CG transmission occasion, per UE selection and implementation.

In one example, the gNB provides an indication of a threshold on how late a UE can start transmission in an UL CG transmission occasion, wherein the indication can be in terms of a slot/symbol number and/or a repetition number (e.g., no later than a second repetition, or 4th repetition). In another example, the threshold is predetermined or is RRC configuration and/or can be provided/updated/overwritten by an activation/re-activation/modification DCI or MAC-CE command. In another example, a threshold for late start of an UL CG transmission occasion can be linked to a priority indication for the UE traffic, e.g., a predetermined or configured or indicated linkage/mapping between priority levels and the threshold for late start of the UL CG transmission occasion, e.g., a traffic with a first priority level can start no later than a first threshold (e.g., second repetition) of an UL CG transmission occasion, while a traffic with a second priority level can start no later than a second threshold (e.g., 4th repetition) of an UL CG transmission occasion.

In one example, a priority level can be either explicit priority configuration/indication in RRC or DCI and/or implicit priority assignment such as a predetermined priority list in the system specifications, e.g., prioritizations for transmission power reductions with respect to UL carrier aggregation power control and/or priority levels for UCI multiplexing and/or any predetermined/configured priority linkage with UE transmission settings such as the RNTI.

In on example, when determining how late a UE can start transmission on an UL CG transmission occasion, a UE processing offset is (additionally) taken into account, wherein the UE processing offset time can be (a combination/variation/function/faction of) one or more of the following: a PUSCH processing time, e.g., T_proc,2 as defined in [3GPP TS 38.214], a PHR type determination time such as T'_proc,2 as defined e.g., in [3GPP TS 38.213 and TS 38.214], a UCI multiplexing time as defined e.g. in [TS 38.213], and so on. For example, the UE is expected to start transmission on an UL CG transmission occasion no later than a symbol/slot/repetition that is at least K symbols/slots/repetitions before the end of the UL CG transmission occasion, where K is given by the UE processing offset time.

In principle, the proposed method can work without any indication from the UE to the gNB regarding the actual starting repetition index n≥1, from the total configured number of repetitions N, but such operation would require a blind decoding type operation by the gNB to determine the actual starting repetition.

In one example, when a UE starts transmitting on an UL CG transmission occasion after the beginning of that UL CG transmission occasion, then the UE is expected to indicate to the gNB the actual starting symbol/slot/repetition within the UL CG transmission occasion. For example, the UE needs to indicate that it started transmitting from the second repetition of an UL CG transmission occasion.

In one example, a UE indication of a start time of transmitting on an UL CG transmission occasion can be explicit. For example, the can UE indicate the start time of transmitting on an UL CG transmission occasion as a UCI multiplexed on the UL CG transmission itself, i.e., as a CG-UCI which is multiplexed on CG PUSCH. Such IE can be 2-3 bits of information, possibly among other IEs contained in CG-UCI. The indication can be a to an index within a table of predetermined/configured absolute numbers of symbols/slots/repetitions or predetermined/configured table of coded version of symbols/slots/repetitions such as an SLIV-based joint coding and/or a TDRA-like table, and so on. Such indication can be an assistance information provided by the UE to the gNB, and blind decoding by the gNB for detection of the starting/first actual repetition from the UE can be avoided as the gNB can then know the actual repetition occasions.

In another example, a UE indication of a start time of transmitting on an UL CG transmission occasion can be implicit. For example, when each UL CG configuration includes multiple configurations for UL CG transmission parameters, such as configuration of multiple DMRS patterns/sequences/ports/cyclic shifts/scrambling/cover codes, and so on, then there can be a predetermined/configured mapping between the start time of transmitting on an UL CG transmission occasion with the multiple configurations for UL CG transmission parameters such as the multiple configurations for DMRS, e.g., a first start time of transmitting (e.g., start at $2^{nd}$ repetition) maps to a first cyclic shift for DMRS and a second start time of transmitting (e.g., start at 4$^{th}$ repetition) maps to a second cyclic shift for DMRS.

In such a case, when the UE intends to start at a certain starting time within an UL CG transmission occasion, then the UE selects the corresponding configuration for the UL CG transmission parameters such the corresponding DMRS configuration based on the mapping, e.g., when the UE selects to start at the 4$^{th}$ repetition within an UL CG transmission occasion, then the UE performs that UL CG transmission occasion using the second value of cyclic shift for UL CG DMRS.

In one example, the UE can start a late CG transmission only at certain predetermined or configured symbols in the first repetition occasion, or in a predetermined set of repetition occasions, or in any configured repetition occasion for a CG PUSCH, whenever the has data and is allowed to use the configured number of repetitions. According to this example, the UE can transmit an indication to the gNB regarding the actual starting symbol or repetition occasion, or the gNB may "blindly decode" the starting symbol or repetition occasion without any UE indication.

In one example, when a UE starts transmitting on a symbols/slot/repetition which is different from the first symbol/slot/repetition, then in one option, the UE uses the RV same way as when the UE would have started in the first symbols/slot/repetition (i.e., considering and counting all missed symbols/slots/repetitions)—so that a corresponding RV can be any value e.g., an RV different from RV=0 is possible—, while in another option, the UE uses the RV as if that repetition/transmission occasion corresponds to the first symbols/slot/repetition (i.e., not considering and not counting any missed symbols/slots/repetitions)—so that a corresponding RV is always set to RV=0.

Figure 20:
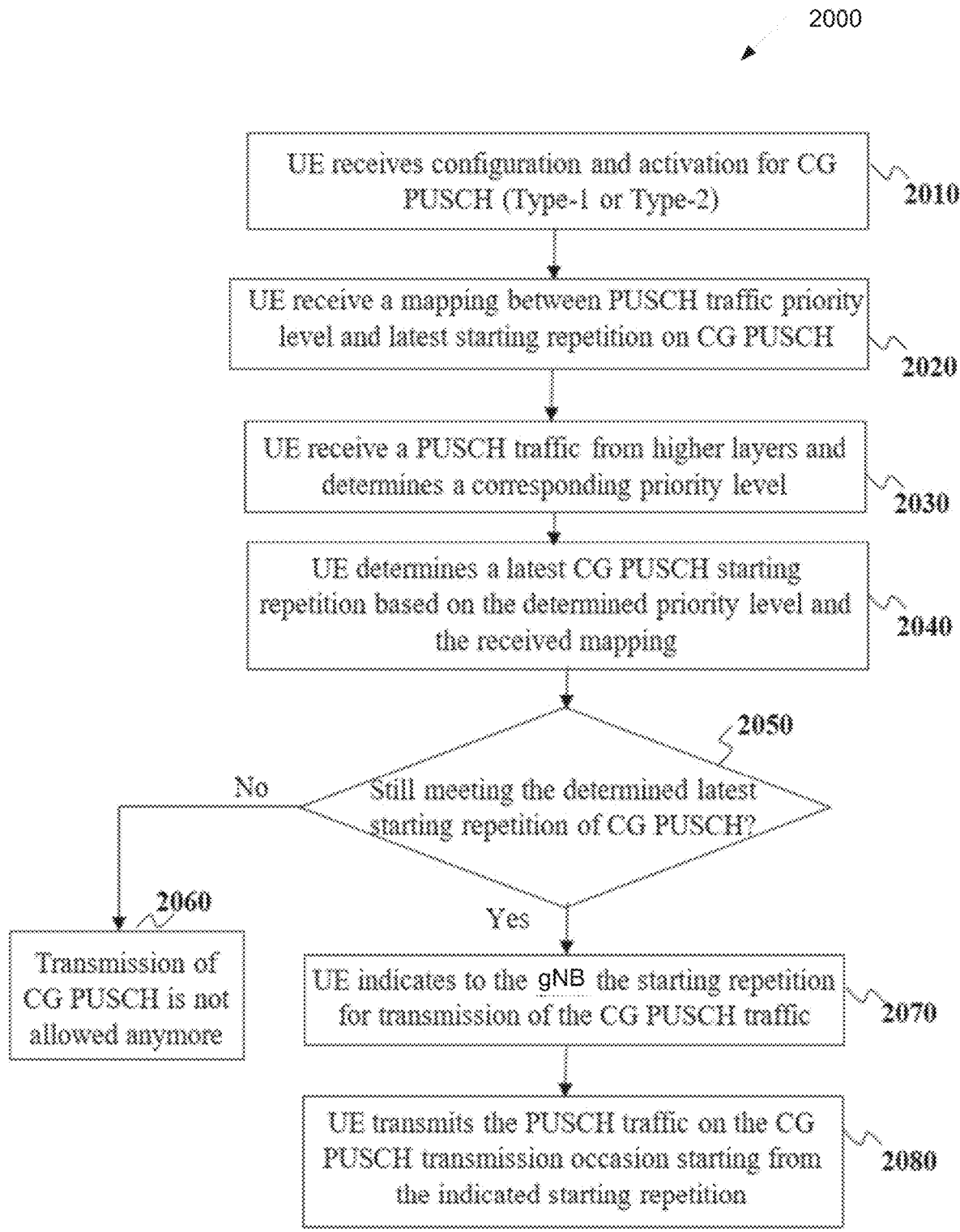
FIG. 20 illustrates a flowchart of a method for a late start for transmission of high priority traffic on a CG PUSCH according to embodiments of the present disclosure.

FIG. 20 illustrates a flowchart of a method 2000 for a late start for transmission of high priority traffic on a CG PUSCH according to embodiments of the present disclosure. An embodiment of the method 2000 shown in FIG. 20 is for illustration only. One or more of the components illustrated in FIG. 20 can be implemented in specialized circuitry configured to perform the noted functions or one or more of the components can be implemented by one or more processors executing instructions to perform the noted functions.

The UE receives configuration and activation for CG PUSCH (Type-1 or Type-2), 2010. The UE also receive a mapping between PUSCH traffic priority level and latest starting repetition on CG PUSCH, 2020. Then, the UE receive a PUSCH traffic from higher layers and determines a corresponding priority level, 2030. Accordingly, the UE determines a latest CG PUSCH starting repetition based on the determined priority level and the received mapping, 2040. Then, the UE checks whether the UE can still meet the determined latest starting time on CG PUSCH for transmitting this PUSCH traffic, 2050.

If the UE determines that the UE cannot meet the determined latest allowed starting repetition for transmitting on this CG PUSCH transmission occasion (e.g., if the UE has passed the latest allowed repetition, possibly also considering any UE processing time offset), then the UE determines that transmission on the CG PUSCH transmission occasion is not allowed anymore, 2060. However, if the UE determines that the UE can still meet the determined latest allowed starting repetition for transmitting on this CG PUSCH transmission occasion (e.g., if the UE can transmit before or at the latest allowed repetition, possibly also considering any UE processing time offset), then the UE indicates to the gNB the starting repetition on that CG PUSCH transmission occasion for transmitting the CG PUSCH traffic, 2070, and transmits the PUSCH traffic on the CG PUSCH transmission occasion starting from the indicated starting repetition, 2080.

Figure 21:
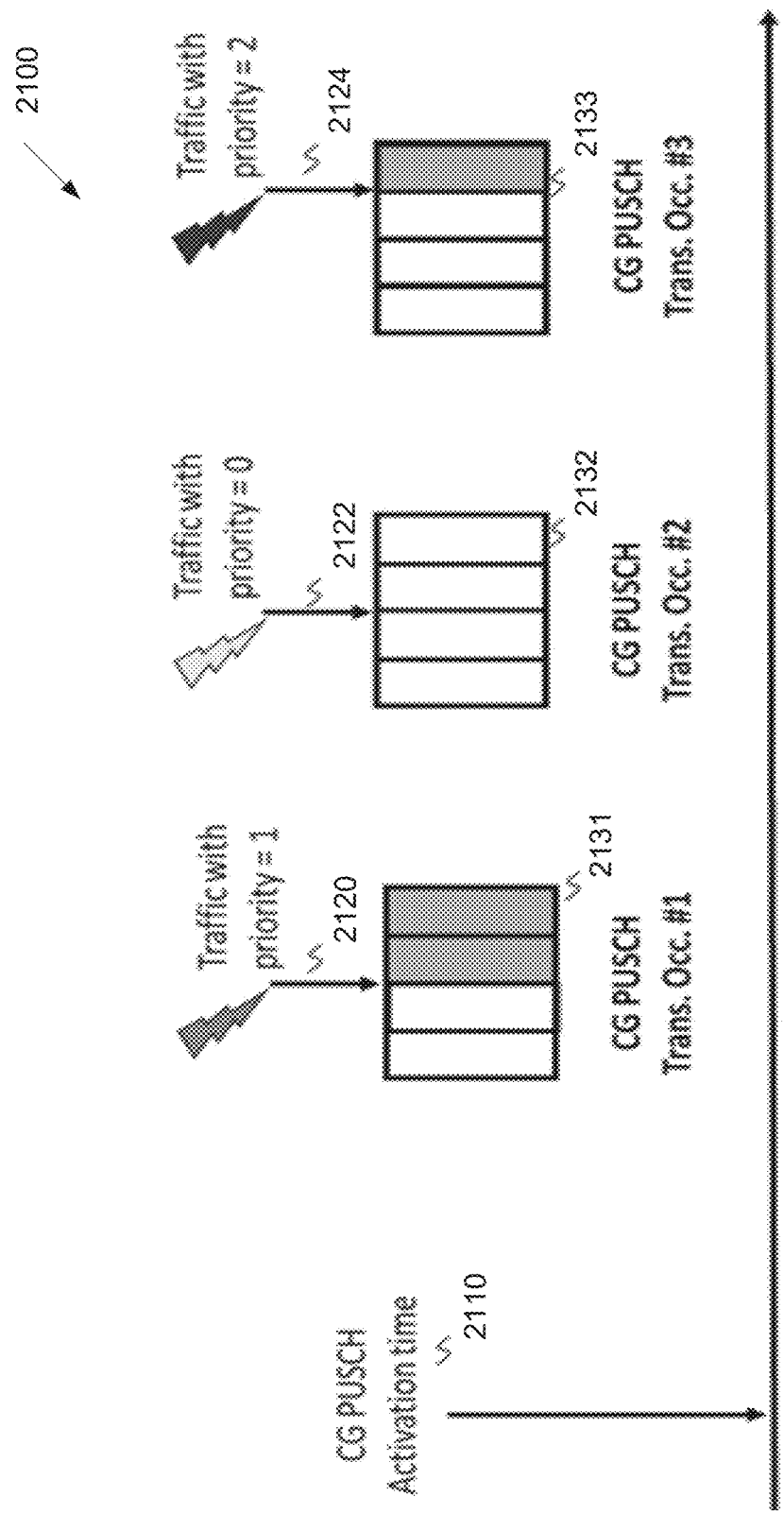
FIG. 21 illustrates an example operation for an enhanced/flexible repetition for CG PUSCH carrying high priority traffic according to embodiments of the present disclosure.

FIG. 21 illustrates an example operation 2100 for an enhanced/flexible repetition for CG PUSCH carrying high priority traffic according to embodiments of the present disclosure. An embodiment of the operation 2100 shown in FIG. 21 is for illustration only.

In this embodiment, the UE receives an activation command (via, e.g., DCI or MAC-CE or RRC) for a CG PUSCH configuration, 2110, along with an indication of the (maximum) number of repetitions e.g., 4. Each CG transmission occasion can be potentially used for transmitting a traffic with a corresponding priority level at arrives possibly in the middle of configured CG PUSCH repetitions. For example, a traffic with a priority level=1 (high priority) arrives at the third repetition of CG transmission occasion #1, as shown in 2120; and due to a priority, a transmission is allowed using the last two repetitions of CG PUSCH transmission occasion #1, as shown in 1931. In the second example, a traffic with a priority level=0 (low priority) arrives at the third repetition of CG transmission occasion #2, as shown in 2122; but since the traffic arrival time is considered too late for such low priority traffic, then transmission is not allowed, so no transmission is made. In the last example, a traffic with a priority level=2 (very high priority) arrives at the fourth/last repetition of CG transmission occasion #3, as shown in 2124, and since this is considered very urgent, a transmission is allowed even at the very last configured repetition.

In one embodiment for a location-based configuration of UL CG/DL SPS, a configuration of transmission resources and/or parameters for UL CG/DL SPS is based on geographical location parameters. According to this embodiment, a first UL CG/DL SPS configuration in a first location uses a first set of resource and/or parameters, while a second UL CG/DL SPS configuration in a second location uses a second set of resource and/or parameters.

One example motivation for this embodiment is that configuration of UL CG/DL SPS can be location-specific, instead of UE-specific, and is therefore invariant to UE movement, i.e., as long as a UE is in a certain location/ zone/area, then the UE can use the corresponding UL CG/DL SPS configuration, but as soon as the UE moves out of that certain location/zone/area, then the UE cannot use the UL CG/DL SPS configuration any more. An additional benefit of location-based configuration of UL CG/DL SPS is control overhead saving in terms of avoiding UE-specific signalling of the configuration.

In one example, the geographical location parameters are based on some predefined categorization of the geographical area within a serving cell, such as the universal V2X zones or any predefined/predetermined sub-zones thereof. In another example, a UE uses any positioning resource and/or method to determine the UE's geographical location parameters such as a current zone (e.g., V2X zone/sub-zone such as V2X zone ID), e.g., using a GPS signal or based on measurements of a DL/SL PRS.

In one example, a location-based configuration of UL CG/DL SPS is provided as a cell-specific system information (SIB). For example, the cell-specific SIB can be an on-demand SIB, which can be transmitted when requested by a UE or a group of UEs, e.g., when entering a zone. In another example, there can be a baseline zone-common/cell-specific configuration for all location-based UL CG/DL SPS configurations within a serving cell, which can be periodically broadcasted, and then there is supplementary zone-specific configuration(s) that contain the adjustment compared to the baseline zone-common configuration, e.g., how to adjust the MCS, beam index, and so on from the baseline MCS, beam index, and so on based on the zone ID. In yet another example, only a predetermined set of UL CG/DL SPS transmission parameters (such as MCS and beam index) can be configured in a location-/zone-specific configuration, while other transmission parameters (e.g., DMRS) need to be UE-specific. In a further example, zone ID is used as scrambling parameter e.g., for CRC of the activation/re-activation/modification DCI or MAC-CE command, or e.g., for DMRS, and so on.

The supplementary zone-specific configuration(s) can include a single configuration that includes all adjustments for all zones within the serving cell (which can be a periodically broadcasted SIB), or can be separate/groups of configurations for different zones (which can be on-demand SIB(s) and transmitted per UE request).

A location-based configuration of UL CG/DL SPS needs to take into account the payload and number of involved SIB(s). When there is a location-based UL CG/DL SPS configuration for a zone, in one option, a UE within that zone is expected to operate with that UL CG and/or DL SPS configuration, while in another option, it is up to the UE to decide whether to operate with that UL CG and/or DL SPS, e.g., receiving on a zone-specific DL SPS can be mandatory, while transmitting on a zone-specific UL CG can be optional. In another example, when a UE is configured with location-/zone-specific UL CG and/or DL SPS configuration, the UE can be (additionally) configured with UE-specific UL CG and/or DL SPS configuration(s).

Figure 22:
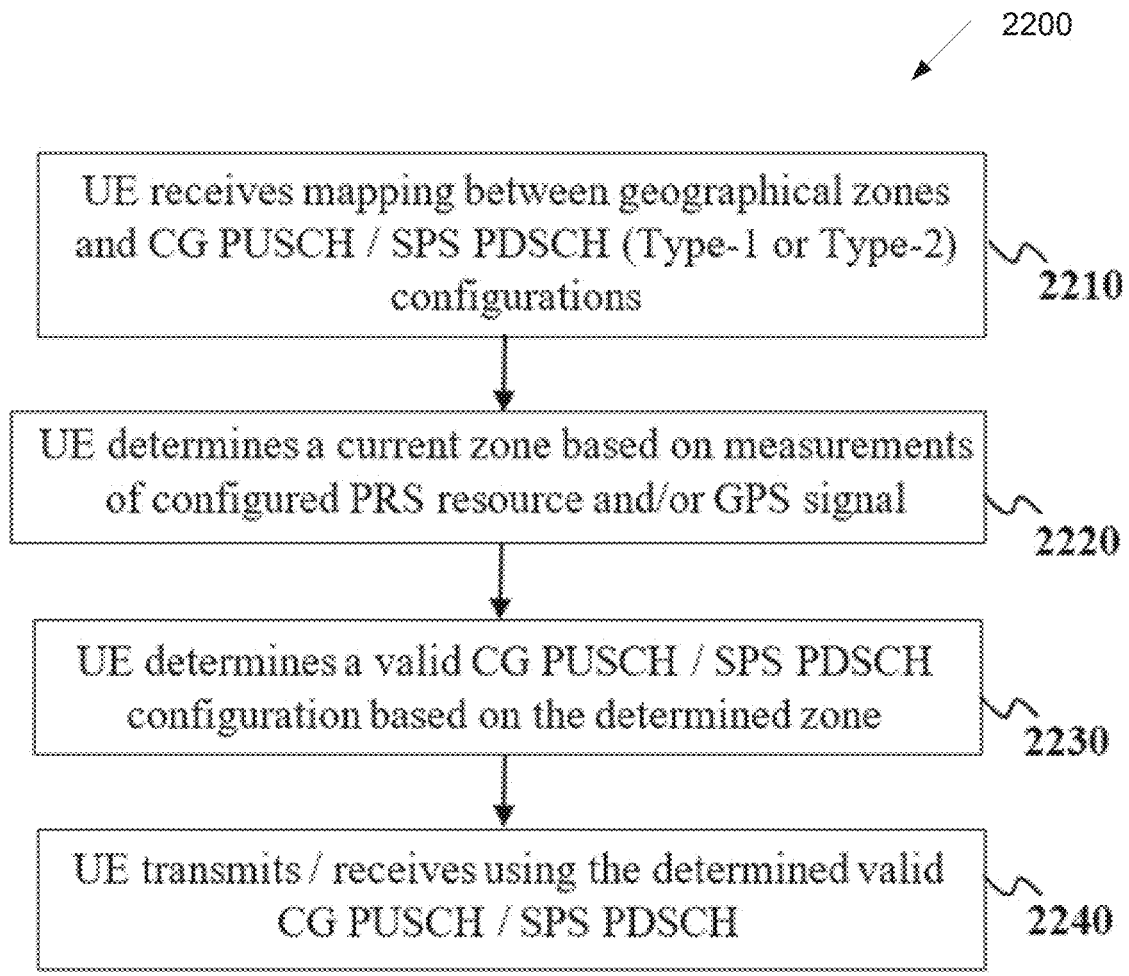
FIG. 22 illustrates a flowchart of a method for a location/zone-specific configuration of CG PUSCH/SPS PDSCH according to embodiments of the present disclosure.

FIG. 22 illustrates a flowchart of a method 2200 for a location/zone-specific configuration of CG PUSCH/SPS PDSCH according to embodiments of the present disclosure. An embodiment of the method 2200 shown in FIG. 22 is for illustration only. One or more of the components illustrated in FIG. 22 can be implemented in specialized circuitry configured to perform the noted functions or one or more of the components can be implemented by one or more processors executing instructions to perform the noted functions.

The UE receives mapping (e.g., via SIB or RRC) between geographical zones and CG PUSCH/SPS PDSCH (Type-1 or Type-2) configurations, 2210. Then, the UE determines the current zone based on measurements of configured PRS resource and/or GPS signal (and using predetermined zones, e.g., V2X zones), 2220. Accordingly, the UE determines a valid CG PUSCH/SPS PDSCH configuration based on the determined zone, 2230. Finally, the UE transmits/receives using the determined valid CG PUSCH/SPS PDSCH, 2240.

The present disclosure can be applicable to Rel-17 NR specifications for NR-Light/NR-mMTC, URLLC and V2X enhancements, low overhead transmissions, and generally any area that pertains DL SPS PDSCH and/or UL CG PUSCH.

This disclosure pertains to a UE or a group of UEs with reduced cost and/or complexity or, in general, reduced capability (REDCAP) UEs. For example, a REDCAP UE can have one or more of the following reduced bandwidth, reduced number of Rx and/or Tx RF chain, reduced power class compared to a legacy/baseline UE or UE group/category such as the one defined by 3GPP 5G NR Rel-15. A REDCAP UE or UE group may be recognized as a UE category (or multiple UE categories) satisfying certain predetermined/specified radio and/or service requirements and/or certain predetermined/specified UE capabilities. A REDCAP UE or UE group/category can also support certain features, such as for coverage recovery or coverage enhancement. Examples of such a REDCAP UE can include smart wearables/watches, surveillance cameras, and (mid-tier) wireless sensors. In certain scenarios and deployments, there may be a large number (e.g., tens or hundreds or more) of REDCAP UEs within a serving cell.

This disclosure also pertains any UE that benefits from/requires coverage enhancement, for example due to deployment situations that can experience large propagation loss, such as deep in building use cases, or due to a reduced number of receiver antennas, or due to a reduced power class for an amplifier of the UE transmitter.

This disclosure also pertains any UE that benefits from reduced overhead for transmissions and decreased receiver complexity, such as transmission with reduced control information, reduced PDCCH monitoring requirements, transmissions with configured grant (CG), or transmissions with semi-persistent scheduling (SPS).

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A user equipment (UE) comprising:
   a transceiver configured to:
   receive, from a base station (BS), a radio resource control (RRC) message including configuration information related to sounding reference signal (SRS) resource sets and information related to repetitions of an uplink transmission; and
   receive, from the BS, downlink control information (DCI) including information indicating the SRS resource sets; and
   a processor operably coupled to the transceiver, the processor configured to identify, based on the information indicating the SRS resource sets, an association between the SRS resource sets and the repetitions of the uplink transmission on a physical uplink shared channel (PUSCH),
   wherein the transceiver is further configured to transmit the repetitions of the uplink transmission on the PUSCH, to the BS, based on the association.

2. The UE of claim 1, wherein:
   the SRS resource sets include a first SRS resource set and a second SRS resource set, and
   at least one of the first SRS resource set or the second SRS resource set is associated with the repetitions of the uplink transmission, based on the information indicating the SRS resource sets.

3. The UE of claim 2, wherein the information indicating the SRS resource sets indicates one of: the first SRS resource set is associated with the repetitions of the uplink transmission or the second SRS resource set is associated with the repetitions of the uplink transmission.

4. The UE of claim 2, wherein:
the first SRS resource set is applied to a first repetition, and
the second SRS resource set is applied to a second repetition.

5. The UE of claim 2, wherein:
the PUSCH is scheduled by the DCI or a configured-grant PUSCH, and
the DCI further includes a first indicator associated the first SRS resource set and a second indicator associated the second SRS resource set.

6. The UE of claim 1, wherein:
the transceiver is further configured to receive, from the BS, a RRC message including information related to mapping pattern; and
the SRS resource sets are associated to the repetitions of the uplink transmission based on the information related to mapping pattern.

7. The UE of claim 6, wherein:
based on the information indicating the SRS resource sets and the information related to mapping pattern, a first SRS resource set is applied to a first repetitions and a second SRS resource set is applied to a second repetitions or the first SRS resource set is applied to the second repetitions and the second SRS resource set is applied to the first repetitions, and
a SRS resource set mapping pattern corresponding to the information related to mapping pattern continues to a remaining repetitions of all repetitions.

8. A base station (BS) comprising:
a transceiver configured to:
transmit, to a user equipment (UE), a radio resource control (RRC) message including configuration information related to sounding reference signal (SRS) resource sets and information related to repetitions of uplink transmission; and
transmit, to the UE, downlink control information DCI) including information indicating the SRS resource sets; and
a processor operably coupled to the transceiver, the processor configured to identify, based on the information indicating the SRS resource sets, an association between the SRS resource sets and the repetitions of the uplink transmission on a physical uplink shared channel (PUSCH),
wherein the transceiver is further configured to receive, from the UE, the repetitions of the uplink transmission on the PUSCH, based on the association.

9. The BS of claim 8, wherein:
the SRS resource sets include a first SRS resource set and a second SRS resource set, and
at least one of the first SRS resource set or the second SRS resource set is associated with the repetitions of the uplink transmission, based on the information indicating the SRS resource sets.

10. The BS of claim 9, wherein the information indicating the SRS resource sets indicates one of: the first SRS resource set is associated with the repetitions of the uplink transmission, or the second RS resource set is associated with the repetitions of the uplink transmission.

11. The BS of claim 9, wherein:
the first SRS resource set is applied to a first repetition, and
the second SRS resource set is applied to a second repetition.

12. The BS of claim 9, wherein:
the PUSCH is scheduled by the DCI or a configured-grant PUSCH, and
the DCI further includes a first indicator associated the first SRS resource set and a second indicator associated the second SRS resource set.

13. The BS of claim 8, wherein:
the transceiver is further configured to transmit, to the UE, a RRC message including information related to mapping pattern; and
the SRS resource sets are associated to the repetitions of the uplink transmission, based on the information related to mapping pattern.

14. The BS of claim 13, wherein:
based on the information indicating the SRS resource sets and the information related to mapping pattern, a first SRS resource set is applied to a first repetitions and a second SRS resource set is applied to a second repetitions, or the first SRS resource set is applied to the second repetitions and the second SRS resource set is applied to the first repetitions, and
a SRS resource set mapping pattern corresponding to the information related to mapping pattern continues to a remaining repetitions of all repetitions.

15. A method for operating a user equipment (UE) in a wireless communication system, the method comprising:
receiving, from a base station (BS), a radio resource control (RRC) message including configuration information related to sounding reference signal (SRS) resource sets and information related to repetitions of uplink transmission;
receiving, from the BS, downlink control information (DCI) including information indicating the SRS resource sets;
identifying, based on the information indicating the SRS resource sets, association between the SRS resource sets and repetitions of the uplink transmission on physical uplink shared channel (PUSCH); and
transmitting the repetitions of the uplink transmission on the PUSCH, to the BS, based on the association.

16. The method of claim 15, wherein:
the SRS resource sets include a first SRS resource set and a second SRS resource set, and
at least one of the first SRS resource set or the second SRS resource set is associated with the repetitions of the uplink transmission, based on the information indicating the SRS resource sets.

17. The method of claim 16, wherein the information indicating the SRS resource sets indicates one of: the first SRS resource set is associated with the repetitions of the uplink transmission or the second SRS resource set is associated with the repetitions of the uplink transmission.

18. The method of claim 16, wherein:
the first SRS resource set is applied to a first repetition, and
the second SRS resource set is applied to a second repetition.

19. The method of claim 15, further comprising:
receiving, from the BS, a RRC message including information related to mapping pattern,
wherein the SRS resource sets are associated to the repetitions of the uplink transmission based on the information related to mapping pattern.

20. The method of claim 19, wherein:
based on the information indicating the SRS resource sets and the information related to mapping pattern, a first SRS resource set is applied to a first repetitions and a second SRS resource set is applied to a second repetitions or the first SRS resource set is applied to the second repetitions and the second SRS resource set is applied to the first repetitions, and
a SRS resource set mapping pattern corresponding to the information related to mapping pattern continues to remaining repetitions of all repetitions.

* * * * *